(12) United States Patent
Chui

(10) Patent No.: US 6,600,838 B2
(45) Date of Patent: Jul. 29, 2003

(54) SYSTEM AND METHOD FOR PERFORMING WAVELET AND INVERSE WAVELET TRANSFORMATIONS OF DIGITAL DATA USING SEMI-ORTHOGONAL WAVELETS

(75) Inventor: Charles K. Chui, Menlo Park, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/878,986

(22) Filed: Jun. 11, 2001

(65) Prior Publication Data

US 2001/0036323 A1 Nov. 1, 2001

Related U.S. Application Data

(60) Division of application No. 09/595,341, filed on Jun. 15, 2000, which is a continuation-in-part of application No. 08/921,141, filed on Aug. 29, 1997, now abandoned.

(51) Int. Cl.[7] .................................................. G06K 3/36
(52) U.S. Cl. .................................. 382/249; 375/240.19
(58) Field of Search .................................. 382/232–250; 375/240.18–240.2

(56) References Cited

U.S. PATENT DOCUMENTS

| | | | |
|---|---|---|---|
| 5,262,958 A | 11/1993 | Chui et al. | |
| 5,600,373 A | 2/1997 | Chui et al. | |
| 5,802,369 A | 9/1998 | Ganesh et al. | |
| 5,828,849 A | 10/1998 | Lempel et al. | |
| 5,838,377 A | 11/1998 | Greene | |
| 5,841,473 A | 11/1998 | Chui et al. | |
| 5,867,602 A | 2/1999 | Zandi et al. | |
| 5,870,502 A | * 2/1999 | Bonneau et al. | ............ 382/249 |
| 5,889,559 A | 3/1999 | Yang | |
| 5,909,518 A | 6/1999 | Chui | |
| 5,966,465 A | 10/1999 | Keith et al. | |
| 6,141,446 A | * 10/2000 | Boliek et al. | ................ 382/233 |
| 6,225,803 B1 | * 5/2001 | Chen | ........................... 324/403 |
| 6,275,619 B1 | 8/2001 | Chui | |

* cited by examiner

*Primary Examiner*—Jingge Wu
(74) *Attorney, Agent, or Firm*—Gary S. Williams; Pennie & Edmonds LLP

(57) ABSTRACT

A wavelet transform system and an inverse wavelet transform system are disclosed that respectively implement a wavelet transform and an inverse wavelet transform. Semi-orthogonal standard wavelets are used as the basic wavelets in the wavelet transform and the inverse wavelet transform. As a result, two finite sequences of decomposition coefficients are used for decomposition in the wavelet transform. Furthermore, two finite sequences of reconstruction coefficients that are derived from the two finite sequences of decomposition coefficients are used for reconstruction in the inverse wavelet transform. The finite sequences of decomposition and reconstruction coefficients are not infinite sequences of coefficients that have been truncated. Furthermore, in one embodiment, downsampling is not used in the wavelet transform and upsampling is not used in the inverse wavelet transform.

12 Claims, 19 Drawing Sheets

SYSTEM AND METHOD FOR PERFORMING WAVELET AND INVERSE WAVELET TRANSFORMATIONS OF DIGITAL DATA USING SEMI-ORTHOGONAL WAVELETS

This is division of appln. Ser. No. 09/595,341 filed Jun. 15, 2000 which is a continuation-in-part of U.S. patent application Ser. No. 08/921,141, filed Aug. 29, 1997, now abandoned.

The present invention relates generally to systems and methods for processing digital data. In particular, it pertains to a system and method for performing wavelet and inverse wavelet transformations of digital data using semi-orthogonal wavelets.

BACKGROUND OF THE INVENTION

The use of IWTs (integral wavelet transforms) and inverse IWTs is well established in MRA (multi-resolution analysis) processing of 1-D (one dimensional) digital data, such as audio signals, and/or 2-D (two dimensional) digital data, such as image data. A special feature of IWTs and inverse IWTs is that they provide narrow windowing of short duration high frequency data while also providing wide windowing of long duration low frequency data. This is generally described in Chui, C. K., "An Introduction to Wavelets", Academic Press, Boston, Mass., 1992, which is hereby incorporated by reference. The following discussion provides examples of how IWTs and inverse IWTs have been implemented in the past.

Wavelet Transform System using Dual Wavelets $\{\overline{\Psi}_{m,k_m}(x)\}$ as Basic Wavelets FIG. 1 shows a 1-D wavelet transform system 100, which is an improved version of the wavelet transform system shown in An Introduction to Wavelets. This system 100 incorporates some aspects of the present invention, but first we will first explain the conventional aspects of this system. The wavelet transform system 100 implements a 1-D IWT that, for each resolution level m at which a decomposition is made, uses dual wavelets $\{\overline{\Psi}_{m,k_m}(x)\}$ to corresponding standard wavelets $\{\Psi_{m,k_m}(x)\}$ as the basic wavelets in the 1-D IWT and uses dual scaling functions $\{\overline{\phi}_{m,k_m}(x)\}$ to corresponding standard scaling functions $\{\phi_{m,k_m}(x)\}$ as the basic scaling functions in the 1-D IWT. Each standard wavelet $\Psi_{m,k_m}(x)$ and standard scaling function $\phi_{m,k_m}(x)$ is given by:

$$\Psi_{m,k_m}(x) = 2^{m/2}\Psi(2^m x - k_m) \qquad (1)$$

$$\phi_{m,k_m}(x) = 2^{m/2}\phi(2^m x - k_m)$$

where $k_m$ is a corresponding index for the resolution level m and the normalization factor $2^{m/2}$ will be suppressed hereafter for computational efficiency.

In performing the 1-D IWT, the wavelet transform system 100 decomposes a 1-D set of original data samples $f_M$ at an original resolution level m=M into a 1-D set of standard scaling function coefficients $C_N$ in an L (low) frequency band at the resolution level m=N and 1-D sets of standard wavelet coefficients $d_{M-1}$ to $d_N$ in H (high) frequency bands at respectively the resolution levels m=M-1 to N.

The set of original data samples $f_M = \{f_{M,n}\} = f_M(2^{-M}n)$ is given by a 1-D function $f_M(x)$, where $x=2^{-M}n$. The 1-D function $f_M(x)$ approximates another 1-D function f(x) at the original resolution level M. The set of original data samples $f_M$ extends in one spatial dimension, namely the x direction, and is first pre-processed by a pre-decomposition filter 102 of the 1-D wavelet transform system 100. The pre-decomposition filter has a transfer function $\phi(z)^{-1}$ for mapping (i.e., converts) the 1-D set of original data samples $f_M$ into a 1-D set of standard scaling function coefficients $C_M$ in an L frequency band at the original resolution level M.

The transfer function $\phi(z)^{-1}$ is obtained from the following relationship at the resolution level m between a 1-D function $f_m(x)$, the standard scaling functions $\{\phi_{m,k_m}(x)\}$ and the set of standard scaling function coefficients $c_m = \{c_{m,k_m}\}$:

$$f_m(x) = \sum_{k_m} c_{m,k_m} \phi_{m,k_m}(x) \qquad (2)$$

where the 1-D function $f_m(x)$ approximates the function f(x) at the resolution level m. The transfer function $\phi(z)^{-1}$ is the inverse of a transfer function $\phi(z)$. The transfer function $\phi(z)$ is a polynomial that has the sequence of mapping coefficients $\{\phi_n\} = \{\phi_{0,0}(n)\}$ as its coefficients while the transfer function $\phi(z)^{-1}$ is a rational function that has a corresponding sequence of mapping coefficients $\{\Theta_n\}$ as its poles. Thus, the pre-decomposition filter 102 comprises a 1-D IIR (infinite impulse response) filter that applies the sequence of mapping coefficients $\{\Theta_n\}$ to the set of original data samples $f_M = \{f_{M,n}\}$ to generate the set of standard scaling function coefficients $C_M = \{C_{M,k_m}\}$.

Then, the decomposition filter 104 of the 1-D wavelet transform system 100 decomposes the set of standard scaling function coefficients $C_M$ into the sets of standard scaling function and wavelet coefficients $C_N$ and $d_{M-1}$ to $d_N$. To do this, in the present invention the decomposition filter 104 has a corresponding decomposition filter stage 106 for each resolution level m=M to N+1 at which a decomposition is made. The decomposition filter stage 106 for each resolution level m decomposes a 1-D set of standard scaling function coefficients cm in an L frequency band at the higher resolution level m into a 1-D set of standard scaling function coefficients $c_{m-1}$ in an L frequency band and a 1-D set of wavelet coefficients $d_{m-1}$ in an H frequency band at the next lower resolution level m-1.

This is done by the decomposition filter stage 106 according to the function $f_m(x)$ given in Eq. (2). Here, for each resolution level m, the function $f_m(x)$ further provides the following relationship between the set of standard scaling function coefficients cm at each resolution level m and the sets of standard scaling function and wavelet coefficients $c_{m-1} = \{c_{m-1,k_{m-1}}\}$ and $d_{m-1} = \{d_{m-1,k_{m-1}}\}$ at the next lower resolution level m-1:

$$\sum_{k_m} c_{m,k_m} \phi_{m,k_m}(x) = \sum_{k_{m-1}} d_{m-1,k_{m-1}}(x) + \qquad (3)$$

$$c_{m-1,k_{m-1}} \phi_{m-1,k_{m-1}}(x).$$

In Eq. (3), the set of standard scaling function coefficients $\{c_{m-1,k_{m-1}}\}$ has the indexes $\{k_{m-1}\} = \{(k_m-1)/2\}$ for odd indexes $\{k_m\}$ and the set of standard wavelet coefficients $\{d_{m-1,k_{m-1}}\}$ has the indexes $\{k_{m-1}\} = \{k_m/2\}$ for even indexes $\{k_m\}$.

Furthermore, there exists two 1-D sequence of decomposition coefficients $\{a_n\}$ and $\{b_n\}$ such that each standard scaling function $\phi_{m,k_m}(x)$ at a higher resolution level m is related to and can be decomposed into the standard wavelets and scaling functions $\{\Psi_{m,k_m}(x)\}$ and $\{\phi_{m,k_m}(x)\}$ at the next lower resolution level m-1. This decomposition relation is given as follows:

$$\phi_{m,k_m}(x) = \sum_{k_{m-1}} a_{k_m-2k_{m-1}} \phi_{m-1,k_{m-1}}(x) + \qquad (4)$$

$$b_{k_m-2k_{m-1}} \Psi_{m-1,k_{m-1}}(x).$$

In view of Eqs. (3) and (4), the sets of standard scaling function and wavelet coefficients $\{c_{m-1,k_{m-1}}\}$ and $\{d_{m-1,k_{m-1}}\}$ at the resolution level m−1 are obtained according to the decomposition sequences:

$$c_{m-1,k_{m-1}} = \sum_{k_m} a_{k_m-2k_{m-1}} c_{m,k_m} \qquad (5)$$

$$d_{m-1,k_{m-1}} = \sum_{k_m} b_{k_m-2k_{m-1}} c_{m,k_m}.$$

it must be noted here that the dual wavelets $\{\overline{\Psi}_{m,k_m}(x)\}$ and the dual scaling functions $\{\overline{\phi}_{m,k_m}(x)\}$ are used respectively as the basic wavelets and scaling functions in the 1-D IWT since the 1-D IWT is defined by:

$$c_{m,k_m} = \int_{-\infty}^{\infty} f(x) \overline{\phi}_{m,k_m}(x) dx \qquad (6)$$

$$d_{m,k_m} = \int_{-\infty}^{\infty} f(x) \overline{\Psi}_{m,k_m}(x) dx.$$

Thus, the transfer functions A(z) and B(z) of the decomposition filter stage 106 are polynomials that respectively have the sets of decomposition coefficients $\{a_n\}$ and $\{b_n\}$ as their coefficients.

As is well known, when the standard wavelets $\{\Psi_{m,k_m}(X)\}$ are s.o. wavelets, the dual wavelets $\{\overline{\Psi}_{m,k_m}(x)\}$ are also s.o. wavelets. In this case, the sequences of decomposition coefficients $\{a_n\}$ and $\{b_n\}$ are infinite. This is described in detail for a subset of s.o. wavelets known as spline wavelets in An introduction to Wavelets and in Chui, C. K. et al., "Spline-Wavelet Signal Analyzers and Method for Processing Signals", U.S. Pat. No. 5,262,958, issued Nov. 16, 1993, which is hereby incorporated by reference.

Referring to FIG. 2, when the standard wavelets $\{\Psi_{m,k_m}(x)\}$ are s.o. wavelets, the sequences of coefficients may be truncated $\{a_n\}$ and $\{b_n\}$ in order to use FIR (finite impulse response) filters 108 and 110 in the decomposition filter stage 106 for each resolution level m, as described in U.S. Pat. No. 5,262,958. The filters 108 and 110 respectively perform the transfer functions A(z) and B(z) on the set of standard scaling function coefficients $c_m$ at the resolution level m. This is done by applying the sequences of decomposition coefficients $\{a_n\}$ and $\{b_n\}$ to the set of standard scaling function coefficients $c_m=\{c_{m,k_m}\}$ to respectively generate sets of intermediate coefficients $\{c_{m-1,k_m}\}$ and $\{d_{m-1,k_m}\}$. The sets of intermediate coefficients $\{c_{m-1,k_m}\}$ and $\{d_{m-1,k_m}\}$ are then downsampled by the downsamplers 112 of the decomposition filter stage 106 to respectively generate the sets of standard scaling function and wavelet coefficients $c_{m-1}=\{c_{m-1,k_m}\}$ and $d_{m-1}=\{d_{m-1,k_{m-1}}\}$ at the resolution level m−1.

Inverse Wavelet Transform System using Standard Wavelets $\{\Psi_{m,k_m}(x)\}$ as Basic Wavelets Conversely, FIG. 3 shows an inverse wavelet transform system 120 corresponding to the system shown in FIG. 1. The wavelet transform system 120 implements a corresponding 1-D inverse IWT to the 1-D IWT just described. Thus, the standard scaling functions and wavelets $\{\phi_{m,k_m}(x)\}$ and $\{\Psi_{m,k_m}(x)\}$ are used as the basic scaling functions and wavelets in the 1-D inverse IWT to reconstruct the 1-D sets of standard scaling function and wavelet coefficients $c_N$ and $d_{M-1}$ to $d_N$ into a 1-D set of reconstructed data samples $f_M$.

In order to do so, the reconstruction filter 122 of the inverse wavelet transform system 120 first reconstructs the 1-D set of standard scaling function and wavelet coefficients $c_N$ and $d_{M-1}$ to $d_N$ into the 1-D set of standard scaling function coefficients $c_M$. In particular, for each resolution level m=N to M−1 at which a reconstruction is made, the reconstruction filter 122 has a corresponding reconstruction filter stage 124 that reconstructs the sets of standard scaling function and wavelet coefficients $c_m$ and $d_m$ in the L and H frequency bands at the lower resolution level m into the set of standard scaling function coefficients $c_{m+1}$ in the L frequency band at the next higher resolution level m+1.

This is done by the reconstruction filter stage 124 for each resolution level m with two 1-D sequences of reconstruction coefficients $\{p_n\}$ and $\{q_n\}$. Here, in one two-scale relation, each standard scaling function $\phi_{m,k_m}(x)$ at a lower resolution level m is related to and can be reconstructed into the standard scaling functions $\{\phi_{m+1,k_{m+1}}(x)\}$ at the next higher resolution level m+1 with the sequence of reconstruction coefficients $\{p_n\}$. Similarly, in another two-scale relation, each standard wavelet $\Psi_{m,k_m}(x)$ at a lower resolution level m is related to and can be reconstructed into the standard scaling functions $\{\phi_{m+1,k_{m+1}}\}$ at the next higher resolution level m+1 with the sequence of reconstruction coefficients $\{q_n\}$. These two-scale relations are given by:

$$\phi_{m,k_m}(x) = \sum_{k_{m+1}} p_{k_{m+1}} \phi_{m+1,2k_m+k_{m+1}}(x) \qquad (7)$$

$$\Psi_{m,k_m}(x) = \sum_{k_{m+1}} q_{k_{m+1}} \phi_{m+1,2k_m+k_{m+1}}(x).$$

From Eqs. (3) and (7), each scaling function coefficient $c_{m+1,k_{m+1}}$ is obtained according to the reconstruction sequence:

$$c_{m+1,k_{m+1}} = \sum_{k_m} (p_{k_{m+1}-2k_m} c_{m,k_m} + q_{k_{m+1}-2k_m} d_{m,k_m}). \qquad (8)$$

By combining Eqs. (3) and (8), it can be seen that the standard scaling functions and wavelets $\{\phi_{m,k_m}(x)\}$ and $\{\Psi_{m,k_m}(x)\}$ are used as the basic scaling functions and wavelets in the 1-D inverse IWT.

As described in "An Introduction to Wavelets" and U.S. Pat. No. 5,262,958, the sequences of reconstruction coefficients $\{p_n\}$ and $\{q_n\}$ are finite when the standard wavelets $\{\Psi_{m,k_m}(x)\}$ are the basic wavelets in the 1-D inverse IWT and are spline wavelets. Similar to the corresponding 1-D IWT, this is also true for the more general case where the standard wavelets $\{\Psi_{m,k_k}(x)\}$ are s.o. wavelets.

Therefore, in the case where semi-orthogonal standard wavelets $\{\Psi_{m,k_m}(x)\}$ are used in the 1-D inverse IWT, each reconstruction filter stage 124 has transfer functions P(z) and Q(z). These transfer functions P(z) and Q(z) are polynomials that respectively have the sets of decomposition coefficients $\{p_n\}$ and $\{q_n\}$ as their coefficients.

Referring to FIG. 4, in order to perform the transfer functions P(z) and Q(z), the reconstruction filter stage 124 at each resolution level m has upsamplers 126. The upsamplers 126 respectively upsample the sets of scaling function and wavelet coefficients $c_m=\{c_{m,k_m}\}$ and $d_m=\{d_{m,k_m}\}$ at the resolution level m to respectively generate the sets of intermediate coefficients $\{c_{m,k_{m-1}}\}$ and $\{d_{m,k_{m-1}}\}$.

The reconstruction filter stage 124 at each resolution level m also includes FIR filters 130 and 132. The filters 130 and 132 respectively perform the transfer functions P(z) and Q(z) by applying the sequences of decomposition coefficients $\{p_n\}$ and $\{q_n\}$ respectively to the sets of intermediate coefficients $\{c_{m,k_{m+1}}\}$ and $\{d_{m,k_{m+1}}\}$ to respectively generate the sets of intermediate coefficients $\{y_{m+1,k_m}\}$ and $\{z_{m+1,k_m}\}$. The sets of intermediate coefficients $\{y_{m+1,k_{m+1}}\}$ and $\{z_{m+1,k_{m+1}}\}$ are then component-wise summed (i.e., each intermediate coefficient $y_{m+1,k_{m+1}}$ is summed with the corresponding intermediate coefficient $z_{m+1,k_{m+1}}$) by the summing stage 134 to generate the set of standard scaling function coefficients $c_{m+1}=\{c_{m+1,k_{m+1}}\}$ at the resolution level m+1.

Referring back to FIG. 3, the post-reconstruction filter 136 of the inverse wavelet transform system 120 then maps the set of standard scaling function coefficients $c_M$ into the set of reconstructed data samples $f_M$ in accordance with Eq. (2). The post-reconstruction filter 136 comprises an FIR filter and has a transfer function $\phi(z)$ that is the inverse of the transfer function $\phi(z)^{-1}$ of the pre-decomposition filter 102. Thus, the sequence of coefficients $\{\phi_n\}$ are applied to the set of standard scaling function coefficients $c_M$ to generate the set of reconstructed data samples $f_M$.

Wavelet Transform System using S.O. Standard Wavelets $\{\Psi_{m,k_m}(x)\}$ as Basic Wavelets FIG. 5 shows a 1-D wavelet transform system 140 in which standard scaling function $\{\phi_{m,k_m}(x)\}$ and s.o. standard wavelets $\{\Psi_{m,k_m}(x)\}$ are used as the basic scaling functions and wavelets in the 1-D IWT. As will be explained shortly, this is done in order to take advantage of the fact that the finite sequences of coefficients $\{p_n\}$ and $\{q_n\}$ are used as the sequences of decomposition coefficients in this 1-D IWT instead of the infinite sequences of coefficients $\{a_n\}$ and $\{b_n\}$. This concept is described in Chui, C. K. et al., U.S. Pat. No. 5,600,373, entitled "Method and Apparatus for Video Image Compression and Decompression Using Boundary-Spline-Wavelets", issued Feb. 4, 1997, which is hereby incorporated by reference, for the specific case where the standard wavelets $\{\Psi_{m,k_m}(x)\}$ are boundary spline wavelets in a 2-D IWT which uses banded matrices for the sequences of coefficients $\{p_n\}$ and $\{q_n\}$. However, in accordance with the present invention, it may be extended to the more general case where the standard wavelets $\{\Psi_{m,k_m}(x)\}$ are semi-orthogonal wavelets. For simplicity, this more general case will be described hereafter for the 1-D IWT.

Like the 1 D wavelet transform system 100 described earlier, the 1-D wavelet transform system 140 includes a pre-decomposition filter 142. However, the pre-decomposition filter 142 has a transfer function $\phi(z)^{-1}\alpha(z)$ for mapping the 1-D set of original data samples $f_M$ into a 1-D set of dual scaling function coefficients $\bar{c}_M$ in an L frequency band at the resolution level M.

Referring to FIG. 6, in order to do this, the pre-decomposition filter 142 of the present invention includes as a mapping filter stage 102 the same pre-decomposition filter 102 as that shown in FIG. 1. Thus, with the transfer function $\phi(z)^{-1}$, this mapping filter stage 102 maps the set of original data samples $f_M$ into the set of standard scaling function coefficients $c_M$.

The pre-decomposition filter 142 of the present invention also has a mapping filter stage 144 that maps the set of standard scaling function coefficients $c_M$ to the set of dual scaling function coefficients $\bar{c}_M$. This generates a change of bases so that the standard scaling functions $\{\phi_{m,k_m}(x)\}$ and the semi-orthogonal standard wavelets $\{\Psi_{m,k_m}(x)\}$ are used as the basic scaling functions and wavelets in the 1-D IWT instead of the dual scaling functions and wavelets $\{\bar{\phi}_{m,k_m}(x)\}$ and $\{\bar{\Psi}_{m,k_m}(x)\}$.

In order to do this, it is important to note that the 1-D function $f_m(x)$ given in Eq. (2) is also related to the dual scaling functions $\{\bar{\phi}_{m,k_m}(x)\}$ and a 1-D set of dual scaling function coefficients $\bar{c}_m=\{\bar{c}_{m,k_m}\}$ at the resolution level m according to the following relationship:

$$f_m(x) = \sum_{k_m} \bar{c}_{m,k_m} \bar{\phi}_{m,k_m}(x). \tag{9}$$

Moreover, each dual scaling function coefficient $\bar{c}_{m,k_m}$ and the set of standard scaling function coefficients $\{c_{m,k_m}\}$ are related by a sequence of mapping coefficients $\{\alpha_n\}$ as follows:

$$\bar{c}_{m,k_m} = \sum_n \alpha_n c_{m,k_m-n} \tag{10}$$

where each mapping coefficient $\alpha_n$ is given by the following change of bases formula:

$$\alpha_n = \int_{-\infty}^{\infty} \phi_{m,0}(x)\phi_{m,n}(x)dx. \tag{11}$$

The transfer function $\alpha(z)$ for the mapping filter stage 144 is a polynomial that has the sequence of mapping coefficients $\{\alpha_n\}$ as its coefficients. Thus, for m=M in Eqs. (9) to (11), the mapping filter stage 144 is an FIR filter and performs the transfer function $\alpha(z)$ by applying the sequence of mapping coefficients $\{\alpha_n\}$ to the set of standard scaling function coefficients $c_M=\{c_{M,k_M}\}$ to generate the set of dual scaling function coefficients $\bar{c}_M=\{\bar{c}_{M,k_M}\}$.

Then, referring back to FIG. 5, the decomposition filter 146 of the 1-D wavelet transform system 140 decomposes the 1-D set of dual scaling function coefficients $\bar{c}_M$ in the L frequency band at the original resolution level M into a 1-D set of dual scaling function coefficients $\bar{c}_N$ in an L frequency band at the resolution level N and 1-D sets of dual wavelet coefficients $\bar{d}_{M-1}$ to $\bar{d}_N$ in H frequency bands at respectively the resolution levels M−1 to N. To do so, the decomposition filter 146 has a corresponding decomposition filter stage 148 for each resolution level m=M to N+1 at which a decomposition is made. The decomposition filter stage 148 for each resolution level m decomposes a 1-D set of dual scaling function coefficients $\bar{c}_m$ in an L frequency band at the higher resolution level m into a 1-D set of dual scaling function coefficients $\bar{c}_{m-1}$ in an L frequency band and a 1-D set of dual wavelet coefficients $\bar{d}_{m-1}$ in an H frequency band at the next lower resolution level m−1.

This is done in view of the fact that, when a change of bases is made and the standard scaling functions $\{\phi_{m,k_m}(x)\}$ and the semi-orthogonal standard wavelets $\{\Psi_{m,k_m}(x)\}$ are used as the basic scaling functions and wavelets in the 1-D IWT, the relationships in Eqs. (1) to (8) are switched (i.e., interchanged) with those for when the dual scaling functions and wavelets $\{\bar{\phi}_{m,k_m}(x)\}$ and $\{\bar{\Psi}_{m,k_m}(x)\}$ are the basic wavelets in the 1-D IWT. More specifically, at each resolution level M, the standard scaling functions $\{\phi_{m,k_m}(x)\}$ and the semi-orthogonal standard wavelets $\{\Psi_{m,k_m}(x)\}$ are respectively switched with the corresponding dual scaling functions and wavelets $\{\bar{\phi}_{m,k_m}(x)\}$ and $\{\bar{\Psi}_{m,k_m}(x)\}$, the sets of standard scaling function and wavelet coefficients $c_m$, $c_{m-1}$, and $d_{m-1}$ are respectively switched with the corresponding sets of dual scaling function and wavelet coefficients $\bar{c}_m$, $\bar{c}_{m-1}$, and $\bar{d}_{m-1}$, and the sequences of coefficients $\{a_n\}$ and $\{b_n\}$ are respectively switched with the sequences of coefficients $\{p_n\}$ and $\{q_n\}$. This is further described in An Introduction to Wavelets.

Thus, the decomposition filter stage 148 at each resolution level m has the transfer functions P(z) and Q(z). The decomposition filter stage 148 performs the transfer functions P(z) and Q(z) on the set of dual scaling function coefficients $\bar{c}_m$ to generate the sets of dual wavelet and scaling functions coefficients $\bar{c}_{m-1}$ and $\bar{d}_{m-1}$.

More specifically, as shown in FIG. 7, in accordance with the present invention the decomposition filter stage 148 at each resolution level m has the same filters 130 and 132 as those shown in FIG. 4 for each reconstruction filter stage 124 of the inverse wavelet transform system 120 of FIG. 3. In this case, the filter stages 130 and 132 respectively perform the transfer functions P(z) and Q(z) (which are generally shorter, and thus more computationally efficient, than A(z) and B(z) of the system shown in FIG. 1) by respectively applying the sequences of decomposition coefficients $\{p_n\}$ and $\{q_n\}$ to the set of dual scaling function coefficients $\bar{c}_m = \{\bar{c}_{m,k_m}\}$ to respectively generate the sets of dual wavelet and scaling functions coefficients $\{\bar{d}_{m-1,k_m}\}$ and $\{\bar{c}_{m-1,k_m}\}$ The sets of dual wavelet and scaling functions coefficients $\{\bar{d}_{m-1,k_m}\}$ and $\{\bar{c}_{m-1,k_m}\}$ are then respectively downsampled by the downsamplers 112 of the decomposition filter stage 146 to respectively generate the sets of standard wavelet and scaling functions coefficients $\bar{d}_{m-1} = \{\bar{d}_{m-1,k_{m-1}}\}$ and $\bar{c}_{m-1} = \{\bar{c}_{m-1,k_{m-1}}\}$. The downsamplers 112 are the same as those shown in FIG. 2 for each decomposition filter stage 106 of the wavelet transform system 100 of FIG. 1.

Inverse Wavelet Transform System using Standard Wavelets $\{\Psi_{m,k_m}(x)\}$ as Basic Wavelets FIG. 8 shows an inverse wavelet transform system 160 that implements a corresponding 1-D inverse IWT to the 1-D IWT implemented by the wavelet transform system 140 of FIG. 5. Like the 1-D inverse IWT performed by the inverse wavelet transform system 120 of FIG. 3, the 1-D inverse IWT implemented by the inverse wavelet transform system 160 uses the standard scaling functions $\{\phi_{m,k_m}(x)\}$ and the semi-orthogonal standard wavelets $\{\Psi_{m,k_m}(x)\}$ as the basic scaling functions and wavelets in the 1-D inverse IWT.

In order to implement the 1-D inverse IWT, the inverse wavelet transform system 160 includes a reconstruction filter 162. The reconstruction filter 162 reconstructs the sets of dual scaling function and wavelet coefficients $\bar{c}_N$ and $\bar{d}_{M-1}$ to $\bar{d}_N$ into the set of standard scaling function coefficients $C_M$. In order to do so, the reconstruction filter 162 includes a corresponding reconstruction filter stage 163 for the first resolution level m=N at which a reconstruction is made and a corresponding reconstruction filter stage 164 for every other resolution level m=N+1 to M−1 at which a reconstruction is made. The reconstruction filter stage 163 has the transfer functions $Q(z)\beta(z)^{-1}$ and $P(z)\alpha(z)^{-1}$ while each reconstruction filter stage 164 has the transfer functions $Q(z)\beta(z)^{-1}$ and P(z).

Referring to FIG. 9, the reconstruction filter stage 163 includes a mapping filter substage 166 which has the transfer function $\alpha(z)^{-1}$. The mapping filter substage 166 uses the transfer function $\alpha(z)^{-1}$ to map the set of dual scaling function coefficients $\bar{c}_N$ to the set of standard scaling function coefficients $c_N$ at the resolution level N. Furthermore, referring to FIGS. 9 and 10, each reconstruction filter 163 and 164 includes a mapping filter substage 168 that has a transfer function $\beta(z)^{-1}$ for mapping the set of dual wavelet coefficients $\bar{d}_m$ to the set of standard wavelet coefficients $d_m$ at the corresponding resolution level m. In this way, a change of bases is made so that the standard scaling functions $\{\phi_{m,k_m}(x)\}$ and the semi-orthogonal standard wavelets $\{\Psi_{m,k_m}(x)\}$ are used as the basic scaling functions and wavelets in the 1-D inverse IWT rather than the dual scaling functions and wavelets $\{\bar{\phi}_{m,k_m}(x)\}$ and $\{\bar{\Psi}_{m,k_m}(x)\}$.

Referring back to FIG. 9, the transfer function $\alpha(z)^{-1}$ of the mapping filter substage 166 is the inverse of the transfer function $\alpha(z)$ described earlier. Thus, the transfer function $\alpha(z)^{-1}$ is a rational function which has a sequence of mapping coefficients $\{\Delta_n\}$ as its poles. Thus, the mapping filter substage 166 is an IIR filter that applies the sequence of mapping coefficients $\{\Delta_n\}$ to the set of dual scaling function coefficients $\bar{c}_N$ to generate the set of standard scaling function coefficients $c_N$.

Moreover, turning again to FIGS. 9 and 10, the transfer function $\beta(z)^{-1}$ for each mapping filter substage 168 is determined in view of the following relationship at the corresponding resolution level m:

$$\sum_{k_m} d_{m,k_m} \psi_{m,k_m}(x) = \sum_{k_m} \tilde{d}_{m,k_m} \tilde{\psi}_{m,k_m}(x). \tag{12}$$

Furthermore, at this resolution level m−1, there exists a sequence of mapping coefficients $\{\beta_n\}$ such that:

$$\tilde{d}_{m,k_m}(x) = \sum_n \beta_n d_{m,k_m - n}(x) \tag{13}$$

where each mapping coefficient $\beta_n$ is given by:

$$\beta_n = \int_{-\infty}^{\infty} \psi_{m,0}(x)\psi_{m,n}(x)dx. \tag{14}$$

The transfer function $\beta(z)^{-1}$ is the inverse of a transfer function $\beta(z)$. The transfer function $\beta(z)$ is a polynomial that has the sequence of mapping coefficients $\{\beta_n\}$ as its coefficients. Thus, the transfer function $\beta(z)^{-1}$ is a rational function which has a corresponding sequence of mapping coefficients $\{\delta_n\}$ as its poles. As result, the mapping filter substage 168 is an IIR filter and applies the sequence of mapping coefficients $\{\delta_n\}$ to the set of dual wavelet coefficients $\bar{d}_m$ to generate the set of standard wavelet coefficients $d_m$.

Referring to FIGS. 9 and 10, each reconstruction filter stage 163 and 164 includes a reconstruction filter stage 124 for the corresponding resolution level m. In accordance with the present invention, this reconstruction filter stage 124 is the same as the reconstruction filter stage 124 shown in FIG. 4 for the inverse wavelet transform system 120 of FIG. 3. Thus, this reconstruction filter stage 124 has the transfer functions P(z) and Q(z) for reconstructing the sets of standard scaling function and wavelet coefficients $c_m$ and $d_m$ at the lower resolution level m into the set of standard scaling function coefficients $c_{m+1}$ at the next higher resolution level m+1.

Referring back to FIG. 8, the inverse wavelet transform system 160 further includes the same post-reconstruction filter 136 as that shown in FIG. 4 for the inverse wavelet transform system 120 of FIG. 3. Thus, as described earlier, the post-reconstruction filter 136 maps the set of standard scaling function coefficients $c_M$ into the set of reconstructed data samples $f_M$.

As those skilled in the art will recognize, the concepts just described may be extended to a 2-D IWT and a corresponding 2-D inverse IWT. This extension is straight forward and therefore will not be described at this point. However, it must be noted here that the sequence of mapping coefficients $\{\delta_n\}$ is large. Thus, unfortunately, the transfer function $\beta(z)^{-1}$ is computationally complex and difficult to implement. For example, in the 2-D inverse IWT described in U.S. Pat. No. 5,600,373, the sequence of mapping coefficients $\{\delta_n\}$ are provided as a banded matrix with many non-zero bands. This results in the 2-D inverse IWT being slow and inefficient when used to decompress 2-D image data.

SUMMARY OF THE INVENTION

In summary, the present invention comprises a wavelet transform system that implements a wavelet transform. Semi-orthogonal standard wavelets are used as the basic wavelets in the wavelet transform and related standard scaling functions are used as the basic scaling functions in the inverse wavelet transform. The standard scaling functions at a lower resolution level m are related to the standard scaling functions at a next higher resolution level m+1 by a first finite sequence of coefficients in a first two-scale relation. Similarly, the semi-orthogonal standard wavelets at the lower resolution level m are related to the standard scaling functions at the next higher resolution level m+1 by a second finite sequence of coefficients in a second two-scale relation.

The wavelet transform system includes a pre-decomposition filter. The pre-decomposition filter maps a set of original data samples into a set of dual scaling function coefficients at a resolution level m=M. The set of original data samples are given by a first function $f_m(x)$ that approximates a second function $f(x)$ at the resolution level m=M.

The wavelet transform system further includes a decomposition filter that decomposes the set of dual scaling function coefficients at the resolution level M into a set of dual scaling function coefficients at a resolution level m=N and sets of dual wavelet coefficients at respective resolution levels m=M−1 to N. The decomposition filter includes a corresponding decomposition filter stage for each resolution level m=M to N+1 at which a decomposition is made.

The decomposition filter stage at each resolution level m decomposes a set of dual scaling function coefficients at the higher resolution level m into a set of dual scaling function coefficients and a set of dual wavelet coefficients at the next lower resolution level m−1. In doing so, the first finite sequence of coefficients is applied to the set of standard scaling function coefficients at the higher resolution level m to generate the set of dual scaling function coefficients at the resolution level m−1. Similarly, the second finite sequence of coefficients is applied to the set of standard scaling function coefficients at the higher resolution level m to generate the set of dual wavelet coefficients at the resolution level m−1.

The present invention also comprises an inverse wavelet transform system that implements an inverse wavelet transform. The inverse wavelet transform corresponds to the wavelet transform implemented by the wavelet transform system just described. As in the wavelet transform, the semi-orthogonal standard wavelets are used as the basic wavelets in the inverse wavelet transform and the related standard scaling functions are used as the basic scaling functions in the inverse wavelet transform.

The inverse wavelet transform system includes a reconstruction filter that reconstructs a set of dual scaling function coefficients at a resolution level m=N and sets of dual wavelet coefficients at respective resolution levels m=N to M−1 into a set of dual scaling function coefficients at a resolution level M. The reconstruction filter includes a corresponding reconstruction filter stage for each resolution level m=N to M−1 at which a reconstruction is made.

The reconstruction filter stage for each resolution level m reconstructs a set of dual scaling function coefficients and a set of dual wavelet coefficients at the lower resolution level m into a set of dual scaling function coefficients at the next higher resolution level m+1. The reconstruction filter stage comprises a first mapping filter substage to apply a sequence of mapping coefficients to the set of dual scaling function coefficients at the resolution level m to generate a set of standard scaling function coefficients at the resolution level m. The reconstruction filter stage further includes a second mapping filter substage to apply the sequence of mapping coefficients to the set of dual wavelet coefficients at the lower resolution level m to generate a set of formatted wavelet coefficients at the resolution level m. Finally, the reconstruction filter stage includes a reconstruction filter substage to reconstruct the sets of standard scaling function and formatted wavelet coefficients at the lower resolution level m into the set of dual scaling function coefficients at the next higher resolution level m+1. This is done by applying a third finite sequence of reconstruction coefficients to the set of standard scaling function coefficients at the lower resolution level m and a fourth finite sequence of reconstruction coefficients to the set of formatted wavelet coefficients at the resolution level m. The third finite sequence of reconstruction coefficients is derived from the second finite sequence of reconstruction coefficients and the fourth finite sequence of reconstruction coefficients is derived from the first finite sequence of reconstruction coefficients.

The inverse wavelet transform system further includes a post-reconstruction filter. The post-reconstruction filter maps the set of dual scaling function coefficients at the resolution level M into a set of reconstructed data samples. The set of reconstructed data samples are also given by the first function $f_m(x)$, for the resolution level m=M.

As indicated previously, semi-orthogonal standard wavelets are used as the basic wavelets in the wavelet transform and the inverse wavelet transforms. Thus, the first and second finite sequences of reconstruction coefficients are not infinite sequences of coefficients that have been truncated.

Furthermore, in one embodiment of each decomposition filter stage of the wavelet transform system, downsampling is not used. Similarly, in one embodiment of each reconstruction filter stage of the inverse wavelet transform, upsampling is not used.

Additionally, in one embodiment of the pre-decomposition filter of the wavelet transform system, the pre-decomposition filter has a transfer function that is the sum of an all-zeros polynomial and an all-poles rational function. In this case, the pre-decomposition filter comprises parallel FIR and IIR filters. In another embodiment of the pre-decomposition filter, the pre-decomposition filter has a transfer function that is obtained from the orthogonal projection of the second function $f(x)$ to the first function $f_m(x)$, for the resolution level m=M. In the case where this embodiment of the pre-decomposition filter is used in the wavelet transform system, a corresponding embodiment of the post-reconstruction filter is used in the inverse wavelet transform.

DETAILED DESCRIPTION OF THE INVENTION

Figure 11:
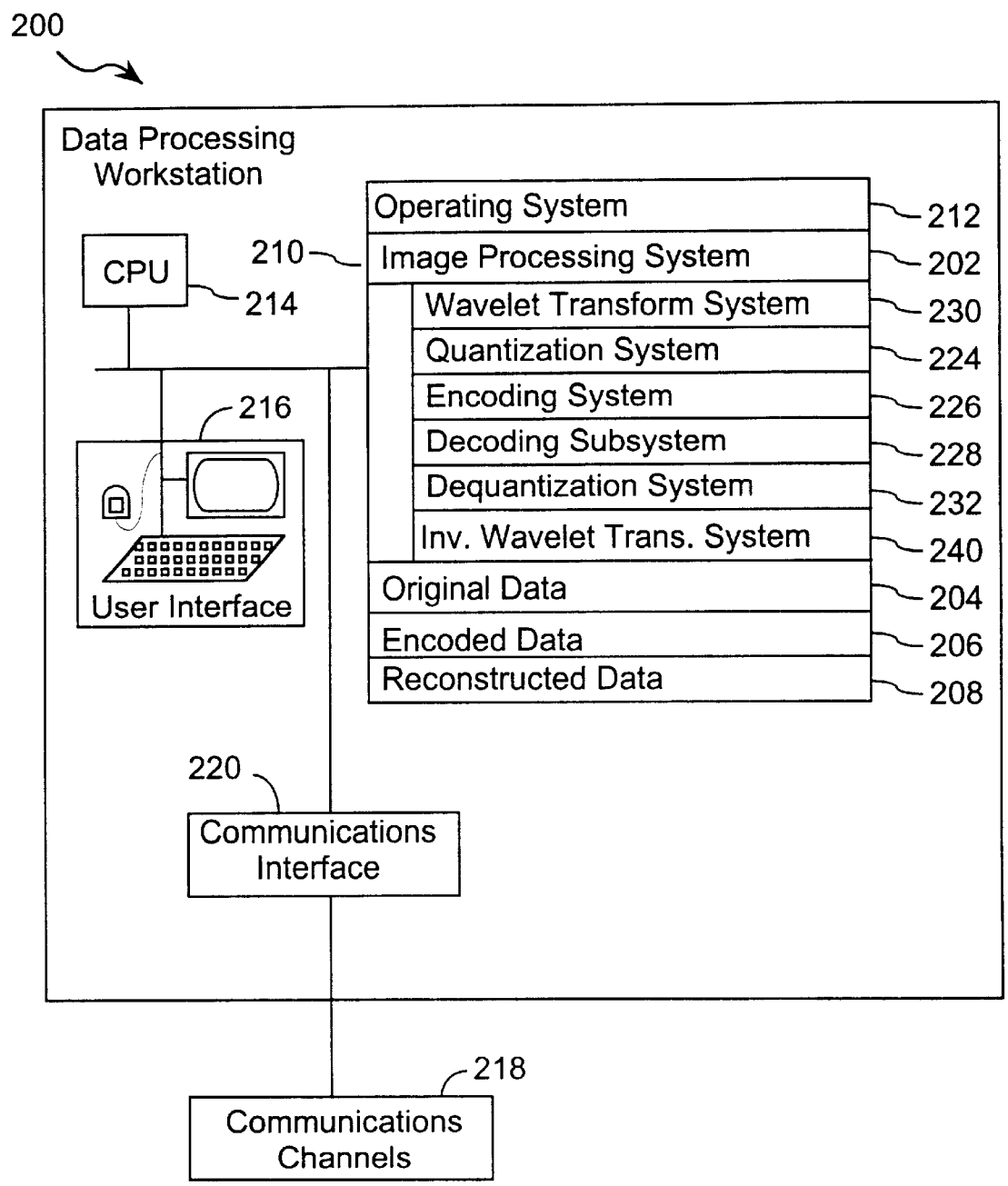
FIG. 11 shows a block diagram of a data processing workstation according to the present invention.

Referring to FIG. 11, there is shown a data processing workstation 200 with a software embodiment of a data processing system 202. The data processing workstation 200 includes a memory 210. The memory stores 210 an operating system 212 and the data processing system 202. The operating system 212 and the data processing system 202 are run on the CPU 214 of the workstation 200. The operating system 212 controls and coordinates running of the data processing system 202 in response to commands issued by a user with the user interface 216 of the workstation 200.

Original data and encoded (i.e., compressed) data generated externally is received by the data processing workstation 200 from an external source (not shown) over external communications channels 218 via the communications interface 220. This data is then stored in the memory locations 204 and 206, respectively, by the operating system 212. Similarly, encoded data that is generated by the data processing system 202 is stored in the memory location 206 and may be retrieved by the operating system 212 and transmitted to external destinations (not shown). This is done over the communications channels 218 via the communications interface 220. These operations are all done in response to commands issued by the user with the user interface 216.

When the user wishes to compress original data, the user issues appropriate commands with the user interface 216 to invoke the data processing system 202 and select the data. This original data may by 1-D data, such as audio signals, and/or 2-D data, such as image data. The data is then compressed by the data processing system 202 in the manner discussed next.

Figure 12:
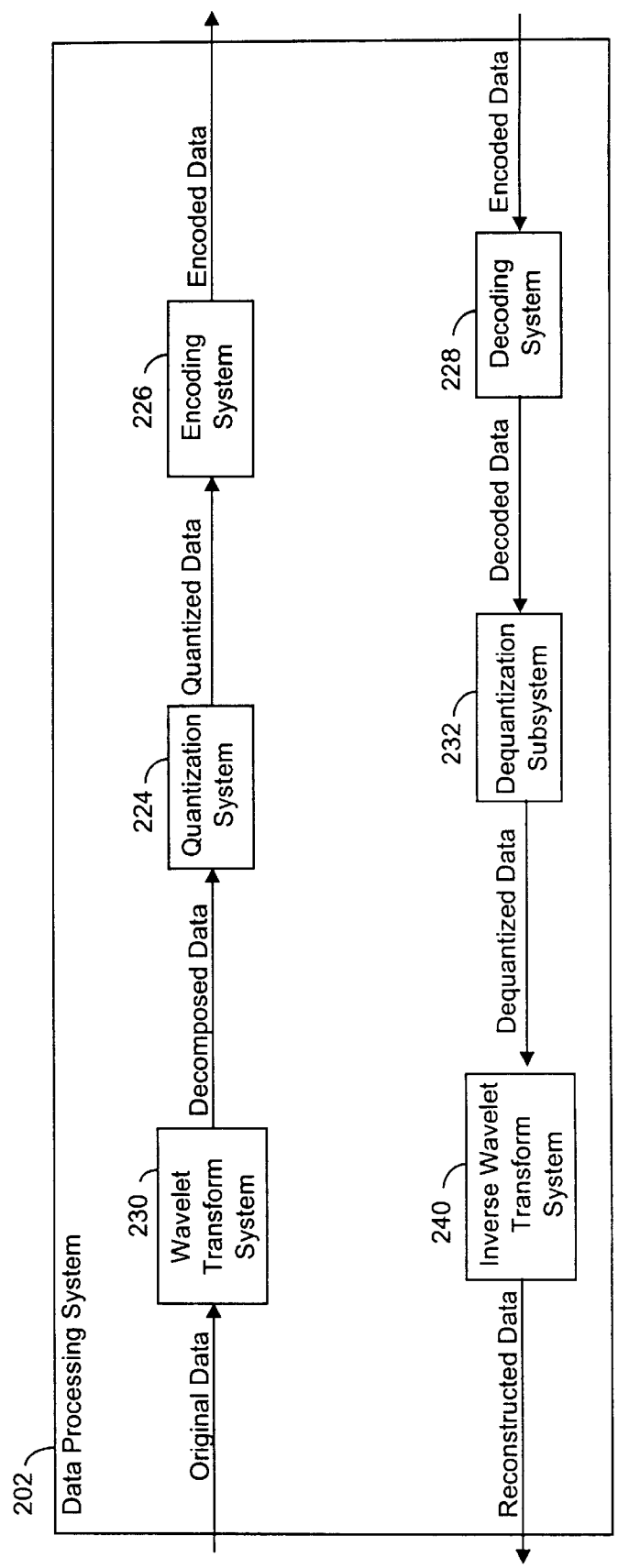
FIG. 12 shows a block diagram of the operation of the data processing system of the data processing workstation of FIG. 11.

Referring to FIG. 12, the data processing system 202 includes a wavelet transform system 230. The wavelet transform system 230 retrieves the original data from the memory location 206 and decomposes it to form decomposed data. As will be discussed shortly, the wavelet transform system 230 uses a novel implementation of 1-D and 2-D IWTs in order to do this.

Then, the decomposed data is quantized by the quantization system 224 of the data processing system 202 to generate quantized data. In doing so, the quantization system 224 quantizes the decomposed data by quantizing its data samples to predefined allowable integer values.

The encoding system 226 of the data processing system 202 then encodes the quantized data to generate encoded data that it is compressed. This may be done by encoding the quantized data samples of the quantized data based on their quantized integer values using well known lossless and highly compact encoding techniques. The encoding subsystem then stores the encoded data in the memory location 206.

Referring back to FIG. 11, conversely when the user wishes to decompress encoded data, the user issues appropriate commands with the user interface 216 to invoke the data processing system 202 and select the encoded data. The data processing system 202 then decompresses the encoded data in the manner discussed next.

The decoding system 228 of the data processing system 202 retrieves the encoded data from the memory location 206 and decodes it to generate decoded data that is also quantized. The decoding system 228 does this by decoding the encoded data samples of the encoded data using a decoding technique corresponding to the encoding technique described earlier.

Then, the decoded data is dequantized by the dequantization system 232 of the data processing system 202 to generate dequantized data that was decomposed by the wavelet transform system 230. This is done by dequantizing the quantized data samples of the decoded data from their predefined allowable integer values to dequantized values. In doing so, the dequantization system 232 uses a dequantization technique corresponding to the quantization technique mentioned earlier.

The inverse wavelet transform system 240 of the data processing system 202 reconstructs the dequantized data to generate reconstructed data. As will be described shortly, this is done using a novel implementation of the 1-D and 2-D inverse IWTs that correspond to the 1-D and 2-D IWTs implemented by the wavelet transform system 230. The reconstructed data is then stored in the memory location 208 by the inverse wavelet transform system 240.

1-D Wavelet Transform Using S.O. Standard Wavelets $\{\Psi_{m,k_m}(x)\}$ as Basic Wavelets Referring to FIG. 13, the wavelet transform system 230 is used to decompose original 1-D data that comprises a 1-D set of original data samples $f_M$ at the original resolution level M. The set of original data samples $f_M$ is decomposed by the wavelet transform system 230 into a set of dual scaling function coefficients $\bar{c}_N$ in an L frequency band at the resolution level M and sets of dual wavelet coefficients $\bar{d}_{M-1}$ to $\bar{d}_N$ in H frequency bands at respectively the resolution levels M−1 to N. This is done by using standard scaling functions $\{\varphi_{m,k_m}(x)\}$ and s.o. standard wavelets $\{\Psi_{m,k_m}(x)\}$ as the basic scaling functions and wavelets in the 1-D IWT in the same manner as discussed earlier for the wavelet transform system 140.

Figure 5:
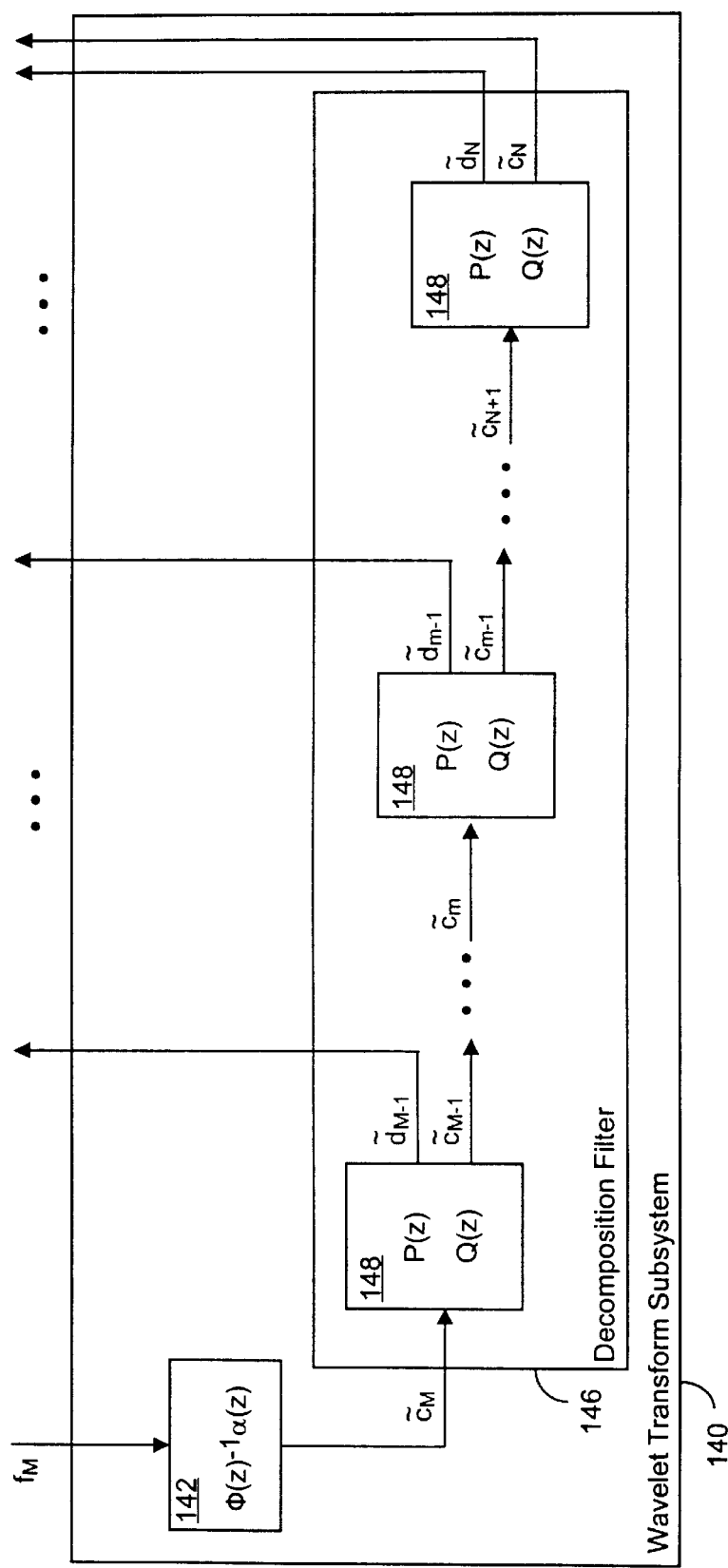
FIG. 5 shows a block diagram of another embodiment of a wavelet transform system in accordance with the present invention.
Figure 10:
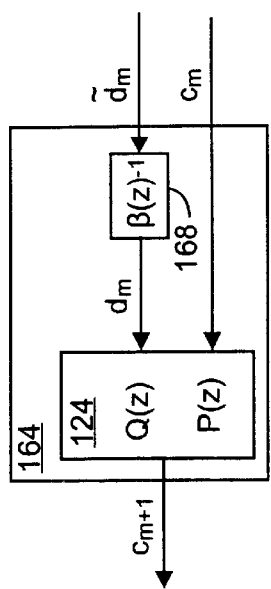
FIG. 10 shows a block diagram of every other reconstruction filter stage of the inverse wavelet transform system of FIG. 8.

In order to do this, the wavelet transform system 230 includes the same pre-decomposition filter 142 as does the wavelet transform system 140 of FIG. 5. Moreover, the wavelet transform system 230 includes a decomposition filter 234. The decomposition filter 234 has a corresponding decomposition filter stage 236 for the last resolution level m=N+1 at which a decomposition is made and a corresponding decomposition filter stage 238 for every other resolution level m=M to N+2 at which a decomposition is made. Each decomposition filter stage 236 and 238 includes a decomposition filter substage 148 for the corresponding resolution level m which is the same as the decomposition filter stage 148 shown in FIG. 7 for the wavelet transform system 140. However, in the wavelet transform system 230, alternative embodiments for the pre-decomposition filter 142 and each decomposition filter substage 148 may be used, as will be discussed later.

1-D Inverse Wavelet Transform Using S.O. Standard Wavelets $\{\Psi_{m,k_m}(x)\}$ as Basic Wavelets Turning to FIG. 14, the inverse wavelet transform system 240 is used to reconstruct a set of dual scaling function and wavelet coefficients $\bar{c}_N$ and $\bar{d}_{M-1}$ to $\bar{d}_N$ that were generated in the manner just described into a set of reconstructed data samples $f_M$. As mentioned earlier, the inverse wavelet transform system 240 uses a novel implementation of the 1-D inverse IWT that corresponds to the 1-D IWT implemented by the wavelet transform system 230. Like the 1-D inverse IWT performed by the inverse wavelet transform system 160 of FIG. 8, the 1-D inverse IWT implemented by the inverse wavelet transform system 240 uses the standard scaling functions $\{\varphi_{m,k_m}(x)\}$ and the s.o. standard wavelets $\{\Psi_{m,k_m}(x)\}$ as the basic scaling functions and wavelets in the 1-D inverse IWT.

In order to implement the 1-D inverse IWT, the inverse wavelet transform system 240 includes a reconstruction filter 242. The reconstruction filter 242 reconstructs the sets of dual scaling function and wavelet coefficients $\bar{c}_N$ and $\bar{d}_{M-1}$ to $\bar{d}_N$ into the set of dual scaling function coefficients $\bar{c}_M$. The reconstruction filter 242 includes a corresponding reconstruction filter stage 243 for the first resolution level m=N at which a reconstruction is made and a corresponding reconstruction filter stage 245 for every other resolution level m=N+1 to M−1 at which a reconstruction is made. Each reconstruction filter stage 243 and 245 includes a reconstruction filter substage 244 for the corresponding resolution level m. The reconstruction filter substage 244 has the transfer functions $P^*(z)\alpha(z)^{-1}$ and $Q^*(z)\alpha(z)^{-1}$ to reconstruct the sets of dual wavelet and scaling function coefficients $\bar{c}_m$ and $\bar{d}_m$ in the L and H frequency bands at the lower resolution level m into the set of dual scaling function coefficients $\bar{c}_{m+1}$ in the L frequency band at the next higher resolution level m+1.

Figure 15:
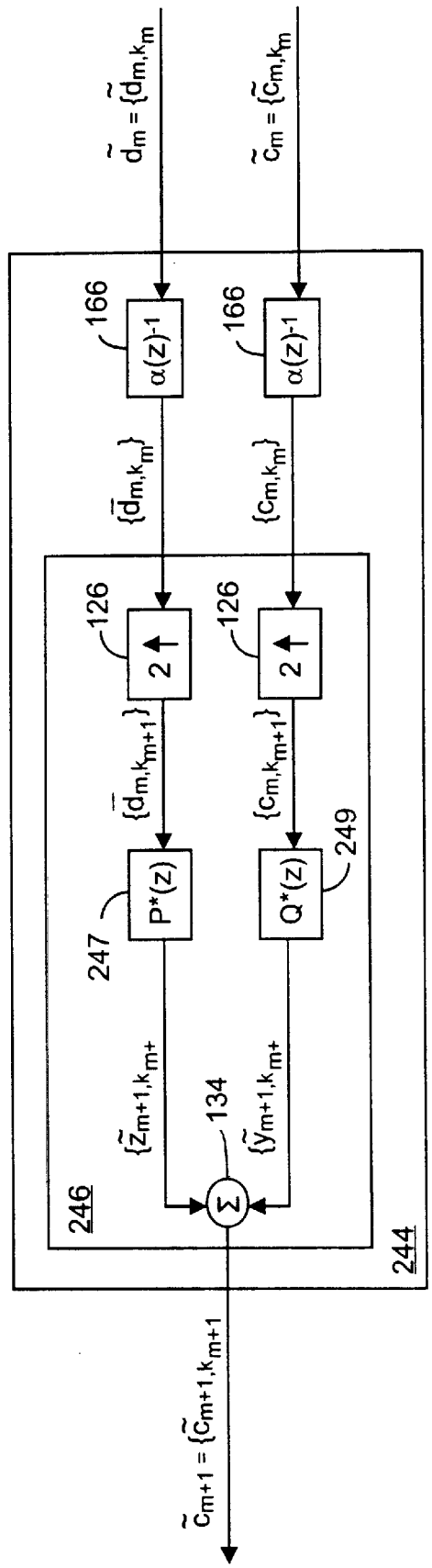
FIG. 15 shows a block diagram of each reconstruction filter stage of the inverse wavelet transform system of FIG. 14.

In order to do so, the reconstruction filter substage 244 for each resolution level m includes two mapping filter substages 166 with the transfer function $\alpha(z)^{-1}$, as shown in FIG. 15. Each mapping filter substage 166 is the same as the mapping filter stage 166 shown in FIG. 8. One mapping filter substage 166 maps the set of dual scaling function coefficients $\bar{c}_m = \{\bar{c}_{m,k_m}\}$ to the set of standard scaling function coefficients $\{c_{m,k_m}\}$ according to Eq. (10) for the resolution level m. However, the other mapping filter substage 166 maps the set of dual wavelet coefficients $\bar{d}_m = \{\bar{d}_{m,k_m}\}$ to a set of formatted wavelet coefficients $\{\tilde{d}_{m,k_m}\}$ at the resolution level m according to:

$$\tilde{d}_{m,k_m} = \sum_n \alpha_n \bar{d}_{m,k_m-n}. \quad (15)$$

In performing these mappings, the sequence of mapping coefficients $\{\Delta_n\}$ described earlier are applied by the mapping filter substages 166 to the sets of dual scaling function and wavelet coefficients $\{\bar{c}_{m,k_m}\}$ and $\{\bar{d}_{m,k_m}\}$ to respectively generate the sets of standard scaling function and formatted wavelet coefficients $\{c_{m,k_m}\}$ and $\{\tilde{d}_{m,k_m}\}$.

The reconstruction filter substage 244 for each resolution level m also includes a reconstruction filter substage 246. The reconstruction filter substage 246 reconstructs the sets of standard scaling function and formatted wavelet coefficients $\{c_{m,k_m}\}$ and $\{\tilde{d}_{m,k_m}\}$ in the L and H frequency bands at the lower resolution level m into the set of dual scaling function coefficients $\bar{c}_{m+1} = \{\bar{c}_{m+1,k_{m+1}}\}$ in the L frequency band at the next higher resolution level m+1. In order to do so, the transfer functions $P^*(z)$ and $Q^*(z)$ are used by the reconstruction filter substage 246.

The transfer functions $P^*(z)$ and $Q^*(z)$ are obtained in view of the fact that the sets of standard scaling function and formatted wavelet coefficients $\{c_{m,k_m}\}$ and $\{\tilde{d}_{m,k_m}\}$ are related to two sequences of reconstruction coefficients $\{p_n^*\}$ and $\{q_n^*\}$ and the set of dual scaling function coefficients $\{\bar{c}_{m+1,k_{m+1}}\}$ according to:

$$\tilde{c}_{m+1,k_{m+1}} = \sum_{k_m} \left( p^*_{k_{m+1}-2k_m} \overline{d}_{m,k_m} + q^*_{k_{m+1}-2k_m} c_{m,k_m} \right). \tag{16}$$

Furthermore, the sequences of reconstruction coefficients $\{p_n^*\}$ and $\{q_n^*\}$ are derived from the corresponding sequences of reconstruction coefficients $\{p_n\}$ and $\{q_n\}$ according to:

$$p_n^* = (-1)^n p_{n+1} \tag{17}$$
$$q_n^* = (-1)^{n-1} q_{n-1}.$$

Thus, the transfer functions $P^*(z)$ and $Q^*(z)$ of the reconstruction filter substage 246 are polynomials that respectively have the sequences of reconstruction coefficients $\{p_n^*\}$ and $\{q_n^*\}$ as their coefficients.

In view of this, the reconstruction filter substage 246 at each resolution level m has upsamplers 126, like the reconstruction filter stage 124. In this case, the upsamplers 126 respectively upsample the sets of scaling function and formatted wavelet coefficients $\{c_{m,k_m}\}$ and $\{\overline{d}_{m,k_m}\}$ to respectively generate the sets of intermediate coefficients $\{c_{m,k_{m+1}}\}$ and $\{\overline{d}_{m,k_{m+1}}\}$.

Figure 4:
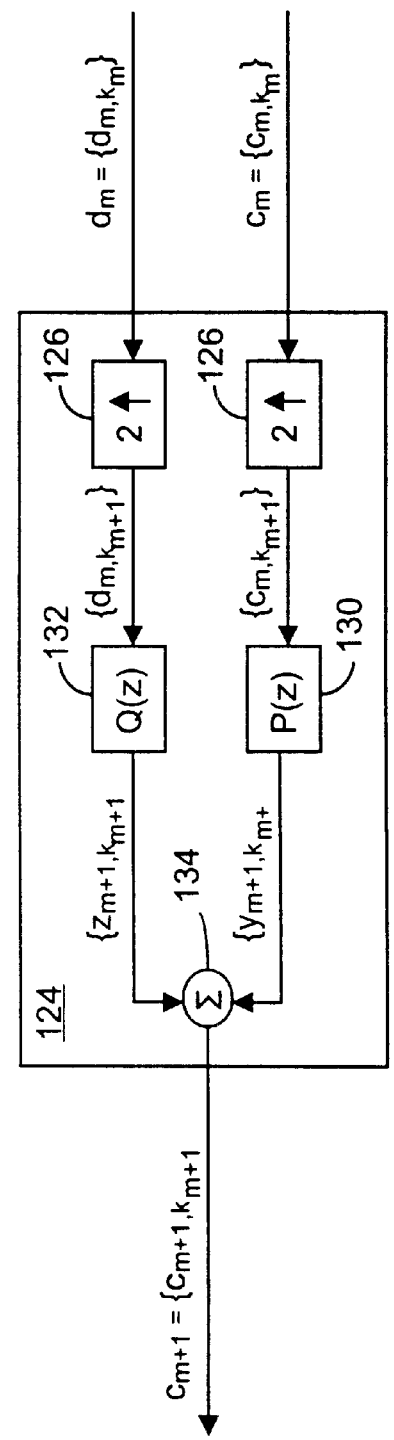
FIG. 4 shows a block diagram of each reconstruction filter stage of the inverse wavelet transform system of FIG. 3.
Figure 9:
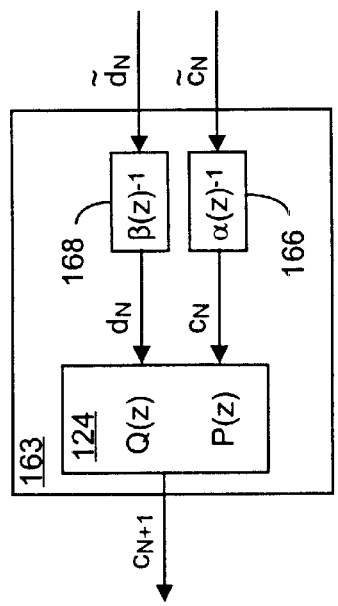
FIG. 9 shows a block diagram of the first reconstruction filter stage of the inverse wavelet transform system of FIG. 8.

Furthermore, similar to the reconstruction filter stage 124 of FIGS. 4 and 9, the reconstruction filter substage 246 at each resolution level m has FIR filters 247 and 249. The filters 247 and 249 respectively perform the transfer functions $P^*(z)$ and $Q^*(z)$ by respectively applying the sequences of decomposition coefficients $\{p_n^*\}$ and $\{q_n^*\}$ to the sets of formatted wavelet and scaling function coefficients $\{\overline{d}_{m,k_{m+1}}\}$ and $\{c_{m,k_{m+1}}\}$ to respectively generate the sets of intermediate coefficients $\{\overline{z}_{m+1,k_{m+1}}\}$ and $\{\overline{y}_{m+1,k_{m+1}}\}$. The sets of intermediate coefficients $\{\overline{z}_{m+1,k_{m+1}}\}$ and $\{\overline{y}_{m+1,k_{m+1}}\}$ are then component-wise summed by the summer 134 of the reconstruction filter substage 246 to generate the set of dual scaling function coefficients $\overline{c}_{m+1} = \{\overline{c}_{m+1,k_{m+1}}\}$. The summer 134 is the same as that in the reconstruction filter stage 124 of FIGS. 4 and 9.

Referring back to FIG. 14, the post-reconstruction filter 248 of the inverse wavelet transform system 240 has the transfer function $\alpha(z)^{-1}\phi(z)$. This transfer function $\alpha(z)^{-1}\phi(z)$ is used by the post-reconstruction filter 248 to map the set of dual scaling function coefficients $\overline{c}_M$ into the set of reconstructed data samples $f_M$.

Figure 3:
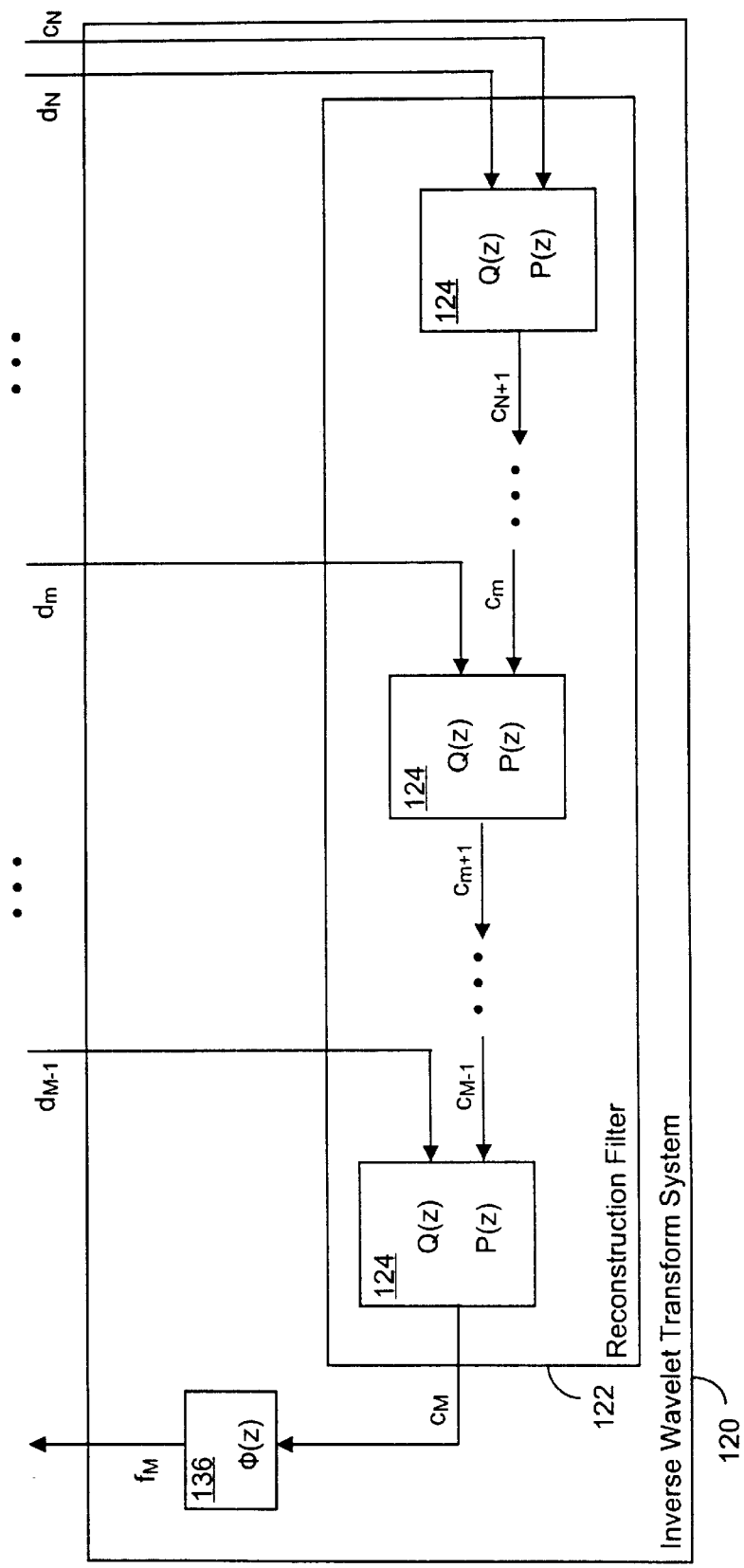
FIG. 3 shows a block diagram of an embodiment of an inverse wavelet transform system in accordance with the present invention.
Figure 8:
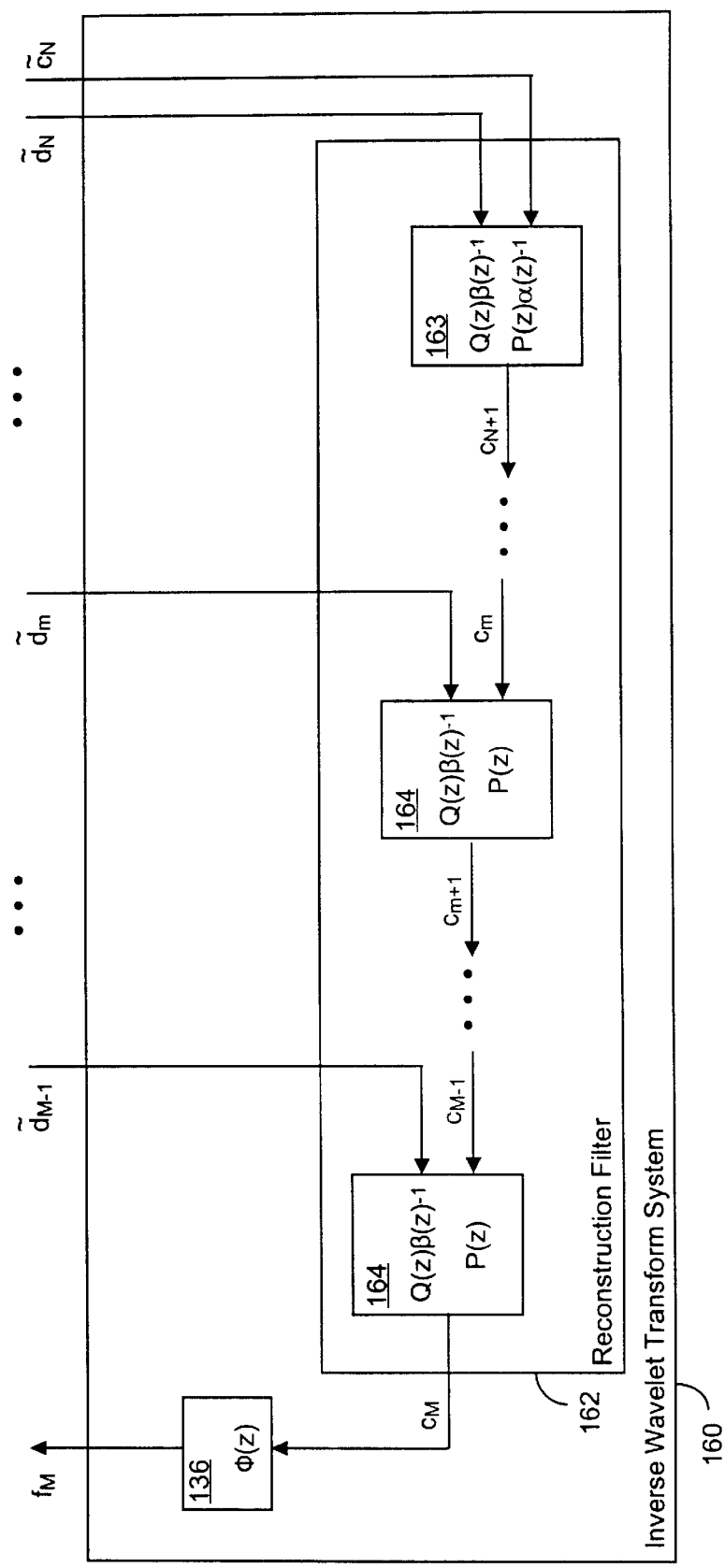
FIG. 8 shows a block diagram of another embodiment of an inverse wavelet transform system in accordance with the present invention.
Figure 16:
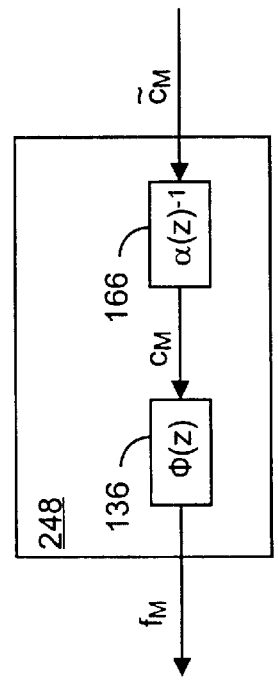
FIG. 16 shows a block diagram of a post-reconstruction filter of the inverse wavelet transform system of FIG. 14.

As shown in FIG. 16, the post-reconstruction filter 248 includes a mapping filter stage 166 that is the same as the mapping filter stage 166 shown in FIG. 8 for the inverse wavelet transform system 160. Here, the mapping filter stage 166 performs the transfer function $\alpha(z)^{-1}$ by applying the sequence of coefficients $\{\Delta_n\}$ to the set of dual scaling function coefficients $\overline{c}_M$ to generate the set of standard scaling function coefficients $c_M$. The post-reconstruction filter 248 also includes as a mapping filter stage 136 the same post-reconstruction filter 136 as in the inverse wavelet transform system 120 of FIG. 3. This mapping filter stage 136 uses the transfer function $\phi(z)$ to map the set of standard scaling function coefficients $c_M$ into the set of reconstructed data samples $f_M$ by applying the sequence of mapping coefficients $\{\phi_n\}$ to the set of standard scaling function coefficients $c_M$.

Figure 1:
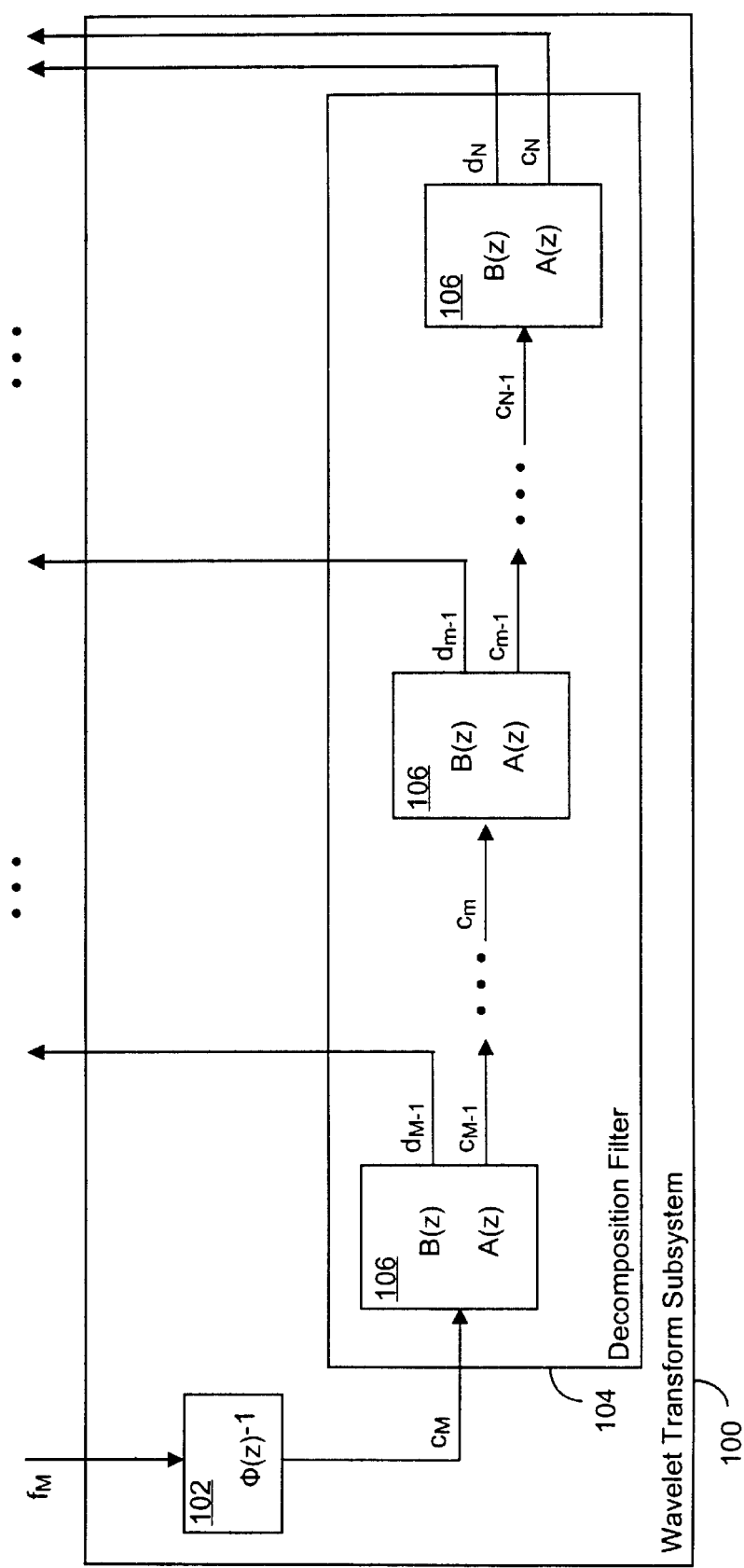
FIG. 1 shows a block diagram of an embodiment of a wavelet transform system in accordance with the present invention.
Figure 2:
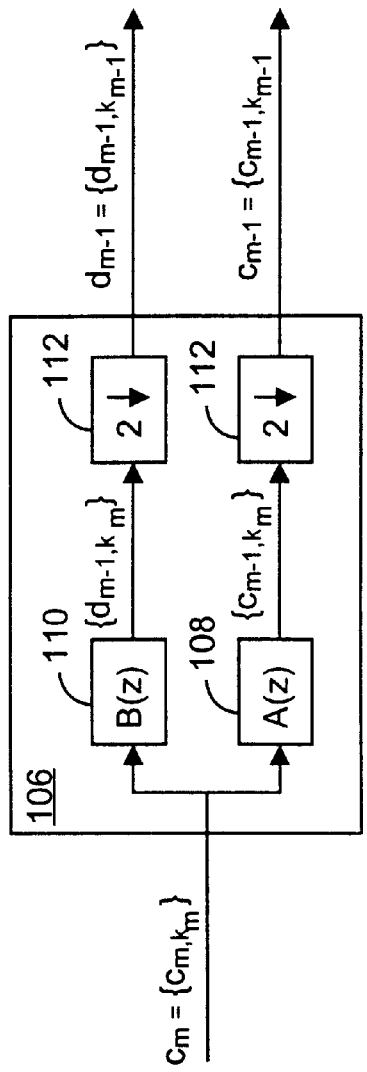
FIG. 2 shows a block diagram of each decomposition filter stage of the wavelet transform system of FIG. 1.

Referring back to FIG. 15, in each reconstruction filter substage 244, the use of the two mapping filter substages 166 and the switching of the filters 130 and 132 in the reconstruction filter substage 246 provides several benefits to the inverse wavelet transform system 240. First, this avoids having to change basis using the same complex mapping filter substage 168 as in each reconstruction filter stage 164 shown in FIG. 9 for the inverse wavelet transform system 160 of FIG. 8. Second, this avoids having to use the truncated infinite sequences of coefficients $\{a_n\}$ and $\{b_n\}$ applied with the complex filters 108 and 110 shown in FIG. 2 for each decomposition filter stage 106 of the wavelet transform system 100 of FIG. 1.

2-D Wavelet Transform Using Standard Wavelets $\{\Psi_{m,k_m}(x)\}$ and $\{\Psi_{m,j_m}(y)\}$ as Basic Wavelets In a typical 2-D IWT, the dual scaling functions and wavelets $\{\overline{\phi}_{m,k_m}(x)\}$, $\{\overline{\phi}_{m,j_m}(y)\}$, $\{\overline{\Psi}_{m,k_m}(x)\}$ and $\{\overline{\Psi}_{m,j_m}(y)\}$ to the standard wavelets $\{\phi_{m,k_m}(x)\}$, $\{\phi_{m,j_m}(y)\}$, $\{\Psi_{m,k_m}(x)\}$, and $\{\Psi_{m,j_m}(y)\}$ are used as the basic scaling functions and wavelets in the 2-D IWT, where the indexes $k_m$ and $j_m$ correspond to the resolution level m. For each resolution level m=M to N+1 at which a decomposition is made in this 2-D IWT, there exists the following relationship between the 2-D set of standard scaling function coefficients $c_m = \{c_{m,k_m,j_m}\}$ at the higher resolution level m and the 2-D sets of standard scaling function and wavelet coefficients $c_{m-1} = \{c_{m-1,k_{m-1},j_{m-1}}\}$, $d_{m-1}^1 = \{d_{m-1,k_{m-1},j_{m-1}}^1\}$, $d_{m-1}^2 = \{d_{m-1,k_{m-1},j_{m-1}}^2\}$, $d_{m-1}^3 = \{d_{m-1,k_{m-1},j_{m-1}}^3\}$, at the next lower resolution level m-1:

$$\sum_{k_m,j} c_{m,k_m,j_m} \phi_{m,k}(x) \phi_{m,j}(y) = \tag{18}$$

$$\sum_{k_{m-1},j_{m-1}} \left( d^1_{m-1,k_{m-1},j_{m-1}} \phi_{m-1,k_{m-1}}(x) \phi_{m-1,j_{m-1}}(y) + \right.$$

$$d^2_{m-1,k_{m-1},j_{m-1}} \psi_{m-1,k_{m-1}}(x) \phi_{m-1,j_{m-1}}(y) +$$

$$d^3_{m-1,k_{m-1},j_{m-1}} \psi_{m-1,k_{m-1}}(x) \psi_{m-1,j_{m-1}}(y) +$$

$$\left. c_{m-1,k_{m-1},j_{m-1}} \phi_{m-1,k_{m-1}}(x) \phi_{m-1,j_{m-1}}(y) \right).$$

In view of Eq. (18), the standard scaling function and wavelet coefficients $c_{m-1,k_{m-1},j_{m-1}}$, $d_{m-1,k_{m-1},j_{m-1}}^1$, $d_{m-1,k_{m-1},j_{m-1}}^2$, $d_{m-1,k_{m-1},j_{m-1}}^3$, at each resolution level m-1 may be obtained according to the decomposition sequences:

$$c_{m-1,k_{m-1},j_{m-1}} = \sum_{k_m,j_m} a_{k_m-2k_{m-1}} a_{j_m-2j_{m-1}} c_{m,k_m,j_m} \tag{19}$$

$$d^1_{m-1,k_{m-1},j_{m-1}} = \sum_{k_m,j_m} a_{k_m-2k_{m-1}} b_{j_m-2j_{m-1}} c_{m,k_m,j_m}$$

$$d^2_{m-1,k_{m-1},j_{m-1}} = \sum_{k_m,j_m} b_{k_m-2k_{m-1}} a_{j_m-2j_{m-1}} c_{m,k_m,j_m}$$

$$d^3_{m-1,k_{m-1},j_{m-1}} = \sum_{k_m,j_m} b_{k_m-2k_{m-1}} b_{j_m-2j_{m-1}} c_{m,k_m,j_m}.$$

This is further described in U.S. Pat. No. 5,262,958 referenced earlier. From Eq. (19), it is clear that the dual scaling functions and wavelets $\{\overline{\phi}_{m,k_m}(x)\}$, $\{\overline{\phi}_{m,j_m}(y)\}$, $\{\overline{\Psi}_{m,k_m}(x)\}$, and $\{\overline{\Psi}_{m,j_m}(y)\}$ are used as the basic wavelets in this other 2-D IWT since it is defined by:

$$c_{m,k,j} = \int_{-\infty}^{\infty} f(x,y) \overline{\phi}_{m,k_m}(x) \overline{\phi}_{m,j_m}(y) dx dy \tag{20}$$

$$d^1_{m,k,j} = \int_{-\infty}^{\infty} f(x,y) \overline{\phi}_{m,k_m}(x) \overline{\psi}_{m,j_m}(y) dx dy$$

$$d^2_{m,k,j} = \int_{-\infty}^{\infty} f(x,y) \overline{\psi}_{m,k_m}(x) \overline{\phi}_{m,j_m}(y) dx dy$$

-continued $$d_{m,k,j}^3 = \int_{-\infty}^{\infty} f(x, y) \tilde{\psi}_{m,k_m}(x) \tilde{\psi}_{m,j_m}(y) dx dy.$$

Conversely, in the 2-D inverse IWT that corresponds to the 2-D IWT just described, each standard scaling function coefficient $c_{m,k_m j_m}$ is given by:

$$c_{m,k_m j_m} = \sum_{k_{m-1} j_{m-1}} (p_{k_m - 2k_{m-1}} p_{j_m - 2j_{m-1}} c_{m-1,k_{m-1} j_{m-1}} + \quad (21)$$

$$p_{k_m - 2k_{m-1}} q_{j_m - 2j_{m-1}} d_{m-1,k_{m-1} j_{m-1}}^1 +$$

$$q_{k_m - 2k_{m-1}} p_{j_m - 2j_{m-1}} d_{m-1,k_{m-1} j_{m-1}}^2 +$$

$$q_{k_m - 2k_{m-1}} q_{j_m - 2j_{m-1}} d_{m-1,k_{m-1} j_{m-1}}^3).$$

This is also described in U.S. Pat. No. 5,262,958 referenced earlier. Here, the standard scaling functions and wavelets $\{\phi_{m,k_m}(x)\}$, $\{\phi_{m,j_m}(y)\}$, $\{\Psi_{m,k_m}(x)\}$, and $\{\Psi_{m,j_m}(y)\}$ are used as the basic scaling functions and wavelets in the 2-D inverse IWT, as can be seen by combining Eqs. (18) and (21).

But, similar to the 1-D IWT discussed earlier, a change of bases may be made so that the standard scaling functions and wavelets $\{\phi_{m,k_m}(x)\}$, $\{\phi_{m,j_m}(y)\}$, $\{\Psi_{m,k_m}(x)\}$, and $\{\Psi_{m,j_m}(y)\}$ are used also as the basic scaling functions and wavelets in the 2-D IWT. In this case, the relationships in Eqs. (18) to (21) are switched with those for when the dual scaling functions and wavelets $\{\bar{\phi}_{m,k_m}(x)\}$, $\{\bar{\phi}_{m,j_m}(y)$, $\{\bar{\Psi}_{m,k_m}(x)\}$, and $\{\bar{\Psi}_{m,j_m}(y)\}$ are the basic wavelets in the 2-D IWT. As a result, at each resolution level m, the standard scaling functions and wavelets $\{\phi_{m,k_m}(x)\}$, $\{\phi_{m,j_m}(y)\}$, $\{\Psi_{m,k_m}(x)\}$, and $\{\Psi_{m,j_m}(y)\}$ are respectively switched with the corresponding dual scaling functions and wavelets $\{\bar{\phi}_{m,k_m}(x)\}$, $\{\bar{\phi}_{m,j_m}(y)\}$, $\{\bar{\Psi}_{m,k_m}(x)\}$, and $\{\bar{\Psi}_{m,j_m}(y)\}$, the sets of standard scaling function and wavelet coefficients $c_{m-1}$, $d_{m-1}^1$, $d_{m-1}^2$, and $d_{m-1}^3$ are switched with the corresponding sets of dual scaling function and wavelet coefficients $\bar{c}_{m-1}$, $\bar{d}_{m-1}^1$, $\bar{c}_{m-1}^2$, and $\bar{d}_{m-1}^3$, and the sequences of coefficients $\{a_n\}$ and $\{b_n\}$ are respectively switched with the sequences of coefficients $\{p_n\}$ and $\{q_n\}$. Furthermore, if the standard wavelets $\{\Psi_{m,k_m}(x)\}$, and $\{\Psi_{m,j_m}(y)\}$ are s.o. wavelets in this case, then the sequences of coefficients $\{p_n\}$ and $\{q_n\}$ are finite and can be used in both decomposition and reconstruction, as in the 1-D IWT discussed earlier.

Figure 17:
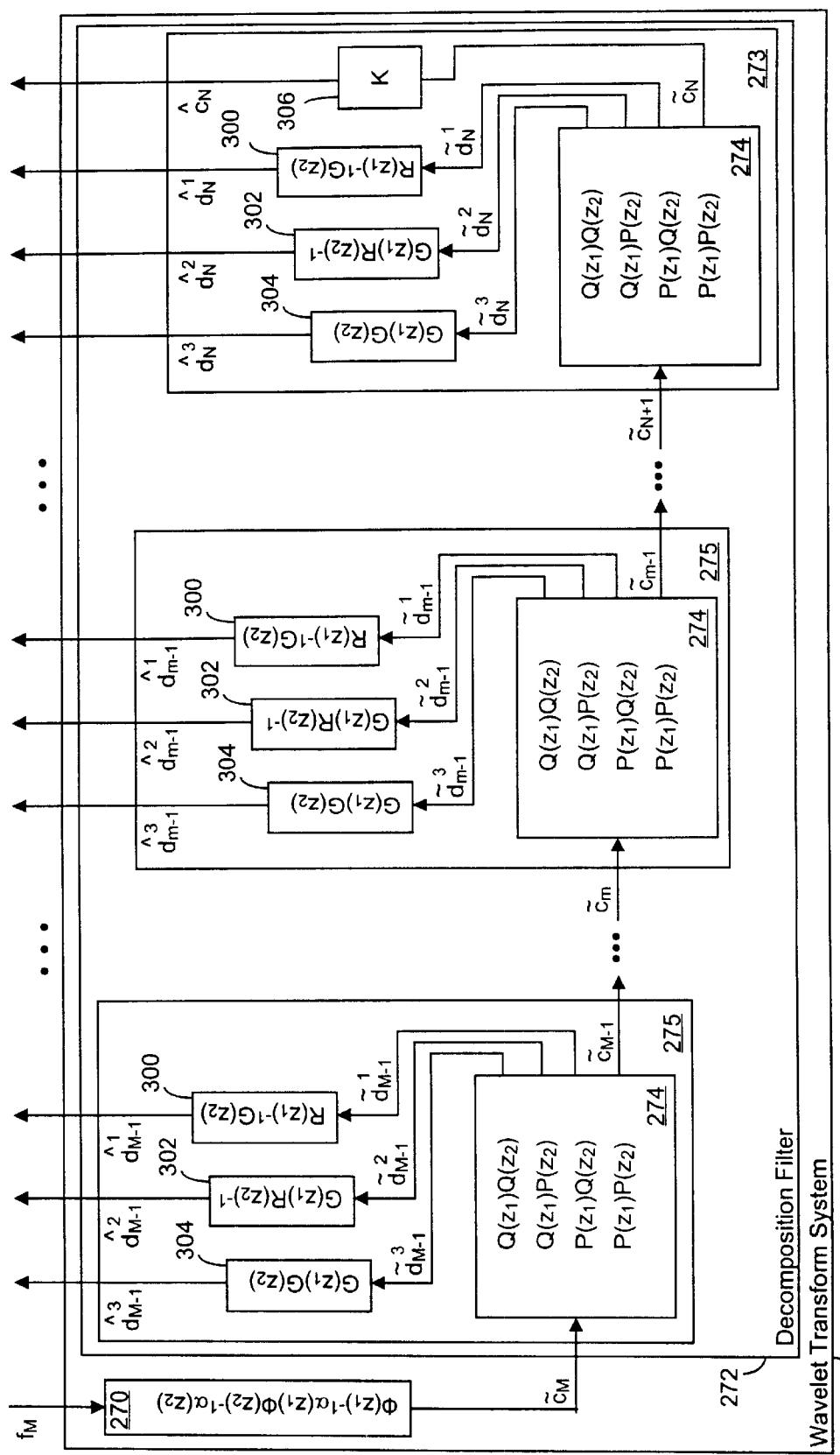
FIG. 17 shows a block diagram of an embodiment of a wavelet transform system for implementing a 2-D IWT according to present invention.

Referring to FIG. 17, the wavelet transform system 230 implements such a 2-D IWT with s.o. standard wavelets $\{\Psi_{m,k_m}(x)\}$, and $\{\Psi_{m,j_m}(y)\}$ as the basic wavelets. Like the 1-D original data discussed earlier, the original 2-D data comprises a 2-D set of original data samples $f_M$ at the original resolution level M. The set of original data samples $f_M = \{f_{M,n,i}\} = f_M(2^{-M}n, 2^{-M}i)$ is given by a 2-D function $f_M(x, y)$, where $x = 2^{-M}n$ and $y = 2^{-M}i$. Similar to the 1-D function $f_M(x)$, the 2-D function $f_M(x,y)$ approximates another 2-D function f(x,y) at the original resolution level M. But, in this case, the set of original data samples $f_M$ extends in two spatial dimensions, the x and y directions.

The set of original data samples $f_M$ is decomposed by the wavelet transform system 230 into a 2-D set of dual scaling function coefficients $\bar{c}_N$ in an LL (vertical and horizontal direction low) frequency band at the resolution level N, 2-D sets of dual wavelet coefficients $\bar{d}_{M-1}^1$ to $\bar{d}_N^1$ in LH (horizontal direction low and vertical direction high) frequency bands at respectively the resolution levels m=M−1 to N, 2-D sets of dual wavelet coefficients $\bar{d}^{2M-1}$ to $\bar{d}_N^2$ in HL (horizontal direction high and vertical direction low) frequency bands at respectively the resolution levels m=M−1 to N, and 2-D sets of dual wavelet coefficients $\bar{d}_{M-1}^3$ to $\bar{d}_N^3$ in HH (horizontal and vertical direction high) frequency bands at respectively the resolution levels m=M−1 to N. This is done in a similar manner to that in the 1-D IWT implemented by the wavelet transform system 230.

Figure 18:
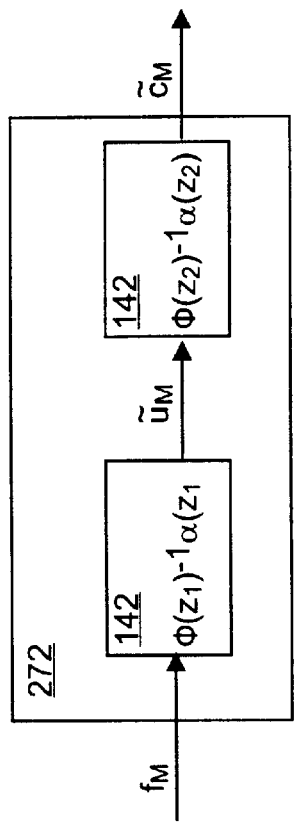
FIG. 18 shows a block diagram of a pre-decomposition filter of the wavelet transform system of FIG. 17.

Specifically, the pre-decomposition filter 270 of the wavelet transform system 230 has the transfer function $\phi(z_1)^{-1}\alpha(z_1)\phi(z_2)^{-1}\alpha(z_2)$ for mapping the set of original data samples $f_M$ into the set of dual scaling function coefficients $\bar{c}_M$ in an LL frequency band at the resolution level m=M. In order to do this, the pre-decomposition filter 270 includes two pre-decomposition filter stages 142, as shown in FIG. 18. Each pre-decomposition filter stage 142 is the same pre-decomposition filter 142 as that shown in FIG. 6 for the 1-D IWT.

The first pre-decomposition filter stage 142 has the transfer function $\phi(z_1)^{-1}\alpha(z_1)$ for mapping in the horizontal direction each row i of the 2-D set of original data samples $f_M = \{f_{M,n,i}\}$ into a corresponding row i of a 2-D set of intermediate coefficients $\bar{u}_M = \{\bar{u}_{m,k_{M,i}}\}$. Similarly, the second pre-decomposition filter stage 142 has the transfer function $\phi(z_2)^{-1}\alpha(z_2)$ for mapping in the vertical direction each column $k_M$ of the 2-D set of intermediate coefficients $\bar{u}_M = \{\bar{u}_{M,k_M,i}\}$ into a corresponding column $k_M$ of the 2-D set of dual scaling function coefficients $\bar{c}_M = \{\bar{c}_{M,k_M/M}\}$. This is done by these two pre-decomposition filter stages 142 in the manner described earlier for the 1-D IWT.

Referring back to FIG. 17, the wavelet transform system 230 further includes a decomposition filter 272 to implement the 2-D IWT. The decomposition filter 272 decomposes the set of dual scaling function coefficients $\bar{c}_M$ into the sets of dual scaling function and wavelet coefficients $\bar{c}_N$, $\bar{d}_{M-1}^1$ to $\bar{d}_N^1$, $\bar{d}_{M-1}^2$ to $\bar{d}_N^2$, and $\bar{d}_{M-1}^3$ to $\bar{d}_N^3$. In order to do so, the decomposition filter 272 includes a corresponding decomposition filter stage 273 for the last resolution level m=N+1 at which a decomposition is made and a decomposition filter stage 275 for every other resolution level m=M to N+2 at which a decomposition is made.

Each decomposition filter stage 273 and 275 includes a decomposition filter substage 274 for the corresponding resolution level m which has the transfer functions $P(z_1)P(z_2)$, $P(z_1)Q(z_2)$, $Q(z_1)P(z_2)$, and $Q(z_1)Q(z_2)$. This enables the decomposition filter substage 274 to decompose the set of dual scaling function coefficients $\bar{c}_m$ in the LL frequency band at the higher resolution level m into the sets of dual wavelet and scaling function coefficients $\bar{c}_{m-1}$, $\bar{d}_{m-1}^1$, $\bar{d}_{m-1}^2$, and $\bar{d}_{m-1}^3$ in the LL, LH, HL, and HH frequency bands at the next lower resolution level m−1.

Figure 19:
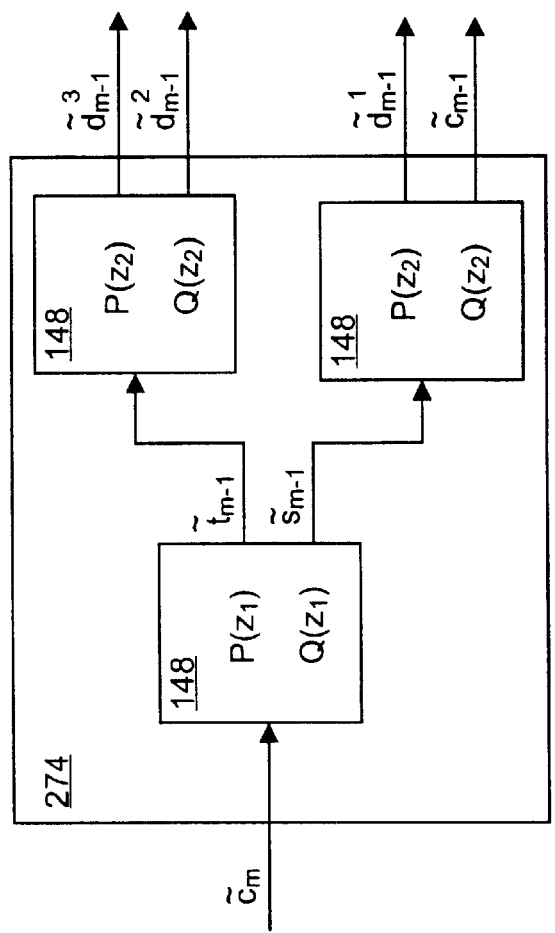
FIG. 19 shows a block diagram of each decomposition filter substage of the wavelet transform system of FIG. 17.

More specifically, as shown in FIG. 19, the decomposition filter substage 274 for each resolution level m includes three decomposition filter substages 148. Each decomposition filter substage 148 is the same decomposition filter stage 148 as that shown in FIG. 7 for the 1-D IWT.

The first decomposition filter substage 148 has the transfer functions $P(z_1)$ and $Q(z_1)$. This allows this decomposition filter substage 148 to decompose in the horizontal direction each row $j_m$ of the 2-D set of dual scaling function coefficients $\bar{c}_m = \{\bar{c}_{m,k_m j_m}\}$ into a corresponding row $j_m$ of the 2-D set of intermediate coefficients $\bar{s}_{m-1} = \{\bar{s}_{m-1,k_{m-1} j_m}\}$ and a corresponding row $j_m$ of the 2-D set of intermediate coefficients $\bar{t}_{m-1} = \{\bar{t}_{m-1,k_{m-1} j_m}\}$. This is done in the manner described earlier for the 1-D IWT.

The second and third decomposition filter substages 148 each have the transfer functions $P(z_2)$ and $Q(z_2)$. Using the transfer functions $P(z_2)$ and $Q(z_2)$, the second decomposi tion filter substage 148 decomposes in the vertical direction each column $k_{m-1}$ of the 2-D set of intermediate coefficients $\bar{s}_{m-1}=\{\bar{s}_{m-1,k_{m-1}^{j_m}}\}$ into a corresponding column $k_{m-1}$ of the 2-D set of dual scaling function coefficients $\bar{c}_{m-1}=\{\bar{c}_{m-1,k_{m-1}^{j_{m-1}}}\}$ and a corresponding column $k_{m-1}$ of the 2-D set of dual wavelets coefficients $\bar{d}_{m-1}^{1}=\{\bar{d}_{m-1,k_{m-1}^{j_{m-1}}}\}$. Similarly, the third decomposition filter substage 148 uses the transfer functions $P(z_2)$ and $Q(z_2)$ to decompose in the vertical direction each column $k_{m-1}$ of the 2-D set of intermediate coefficients $\bar{t}_{m-1}=\{\bar{t}_{m-1,k_{m-1}^{j_m}}\}$ into a corresponding column $k_{m-1}$ of the 2-D set of dual wavelet coefficients $\bar{d}_{m-1}^{1}=\{\bar{d}_{m-1,k_{m-1}^{j_{m-1}}}\}$ and a corresponding column $k_{m-1}$ of the 2-D set of dual wavelets coefficients $\bar{d}_{m-1}^{3}=\{\bar{d}_{m-1,k_{m-1}^{j_{m-1}}}\}$. This is done by these two decomposition filter substages 148 in the manner described earlier for the 1-D IWT.

2-D Inverse Wavelet Transform Using S.O. Standard Wavelets $\{\Psi_{m,k_m}(x)\}$ and $\{\Psi_{m,j_m}(y)\}$ as Basic Wavelets Turning to FIG. 20, the inverse wavelet transform system 240 uses a 2-D inverse IWT that corresponds to the 2-D IWT implemented by the wavelet transform system 230 of FIG. 17. Here, the standard scaling functions $\{\phi_{m,k_m}(x)\}$ and $\{\phi_{m,j_m}(y)\}$ and the s.o. standard wavelets $\{\Psi_{m,k_m}(x)\}$ and $\{\Psi_{m,j_m}(y)\}$ that were used as the basic wavelets in the 2-D IWT are also used as the basic scaling functions and wavelets in the 2-D inverse IWT. Thus, the inverse wavelet transform system 240 is used to reconstruct sets of dual scaling function and wavelet coefficients $\bar{c}_N$, $\bar{d}_{M-1}^{1}$ to $\bar{d}_N^{1}$, $\bar{d}_{M-1}^{2}$ to $\bar{d}_N^{2}$, and $\bar{d}_{M-1}^{3}$ to $\bar{d}_N^{3}$ into a set of reconstructed data samples $f_M$.

In order to implement the 2-D inverse IWT, the inverse wavelet transform system 240 includes a reconstruction filter 250. The reconstruction filter 250 reconstructs the sets of dual scaling function and wavelet coefficients $\bar{c}_N$, $\bar{d}_{M-1}^{1}$ to $\bar{d}_N^{1}$, $\bar{d}_{M-1}^{2}$ to $\bar{d}_N^{2}$, and $\bar{d}_{M-1}^{3}$ to $\bar{d}_N^{3}$ into the set of dual scaling function coefficients $\bar{c}_M$. To do so, the reconstruction filter 250 includes a corresponding reconstruction filter stage 253 for the first resolution level m=N at which a reconstruction is made and a corresponding reconstruction filter stage 252 for every other resolution level m=N to M−1 at which a reconstruction is made.

Each reconstruction filter stage 252 and 253 includes a reconstruction filter substage 254 for the corresponding resolution level m. This reconstruction filter substage 254 has the transfer functions $Q^*(z_1)\alpha(z_1)Q^*(z_2)\alpha(z_2)$, $Q^*(z_1)\alpha(z_1)P^*(z_2)\alpha(z_2)$, $P^*(z_1)\alpha(z_1)Q^*(z_2)\alpha(z_2)$, and $P^*(z_1)\alpha(z_1)P^*(z_2)\alpha(z_2)$. As a result, the reconstruction filter substage 254 reconstructs the sets of dual wavelet and scaling function coefficients $\bar{c}_m$, $\bar{d}_m^{1}$, $\bar{d}_m^{2}$, and $\bar{d}_m^{3}$ in the LL, LH, HL, and HH frequency bands at the lower resolution level m into the set of dual scaling function coefficients $\bar{c}_{m+1}$ in the LL frequency band at the next higher resolution level m+1.

Figure 21:
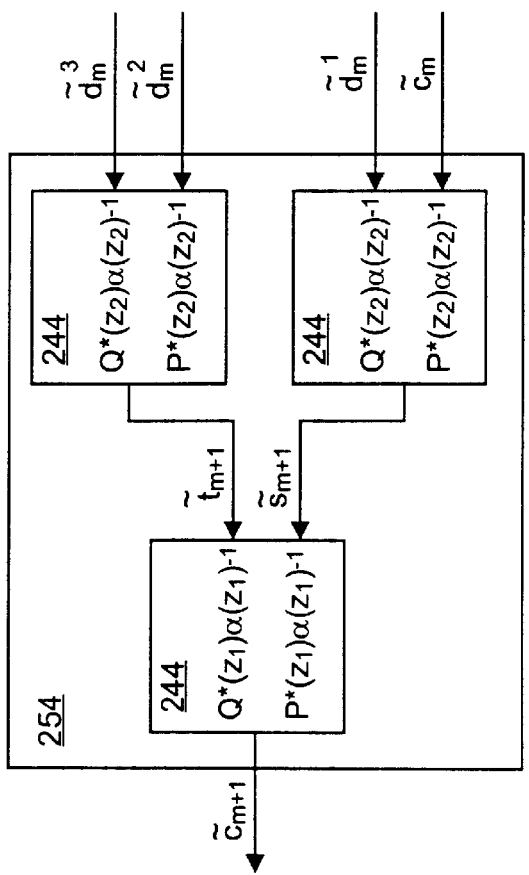
FIG. 21 shows a block diagram of each reconstruction filter substage of the inverse wavelet transform system of FIG. 20.

For doing so, the reconstruction filter substage 254 includes three reconstruction filter substages 246, as shown in FIG. 21. Each reconstruction filter substage 246 is the same reconstruction filter substage 246 as that shown in FIG. 15 for the 1-D inverse IWT.

The first and second reconstruction filter substages 246 each have the transfer functions $Q^*(z_2)\alpha(z_2)$ and $P^*(z_2)\alpha(z_2)$. Using the transfer functions $Q^*(z_2)\alpha(z_2)$ and $P^*(z_2)\alpha(z_2)$, the first reconstruction filter substage 246 reconstructs in the vertical direction each column $k_m$ of a 2-D set of intermediate coefficients $\bar{s}_{m+1}=\{\bar{s}_{m+1,k_m^{j_{m+1}}}\}$ from a corresponding column $k_m$ of the 2-D set of dual scaling function coefficients $\bar{c}_m=\{\bar{c}_{m,k_m^{j_m}}\}$ and a corresponding column $k_m$ of the 2-D set of dual wavelet coefficients $\bar{d}_m^{1}=\{\bar{d}_{m,k_m^{j_m}}\}$. Similarly, the second reconstruction filter substage 246 uses the transfer functions $Q^*(z_2)\alpha(z_2)$ and $P^*(z_2)\alpha(z_2)$ to reconstruct in the vertical direction each column $k_m$ of a 2-D set of intermediate coefficients $\bar{t}_m=\{\bar{t}_{m+1,k_m^{j_{m+1}}}\}$ from a corresponding column $k_m$ of the 2-D set of dual wavelet coefficients $\bar{d}_m^{2}=\{\bar{d}_{m,k_m^{j_m}}\}$ and a corresponding column $k_m$ of the set of dual wavelet coefficients $\bar{d}_m^{3}=\{\bar{d}_{m,k_m^{j_m}}\}$. This is done by these reconstruction filter substages 246 in the same manner as described earlier for the 1-D inverse IWT.

Furthermore, with the transfer functions $Q^*(z_1)\alpha(z_1)$ and $P^*(z_1)\alpha(z_1)$, the third reconstruction filter substage 246 reconstructs in the horizontal direction each row $j_{m+1}$ of the 2-D set of dual scaling function coefficients $\bar{c}_{m+1}=\{\bar{c}_{m+1,k_{m+1}^{j_{m+1}}}\}$ from a corresponding row $j_{m+1}$ of the 2-D set of intermediate coefficients $\bar{s}_{m+1}=\{\bar{s}_{m+1,k_m^{j_{m+1}}}\}$ and a corresponding row $j_{m+1}$ of the 2-D set of intermediate coefficients $\bar{t}_{m+1}=\{\bar{t}_{m+1,k_m^{j_{m+1}}}\}$. This is also done in the same manner as described earlier for the 1-D inverse IWT.

Figure 22:
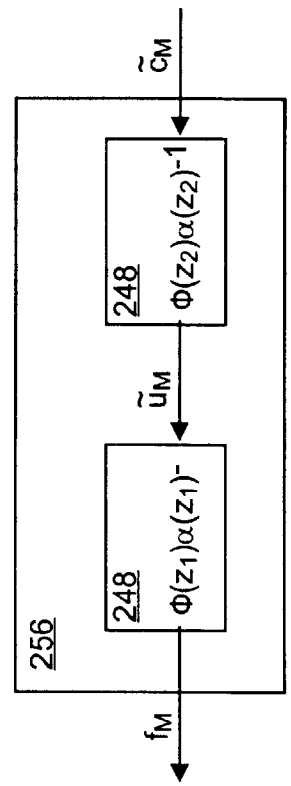
FIG. 22 shows a block diagram of a post-reconstruction filter of the inverse wavelet transform system of FIG. 22.

Referring back to FIG. 20, the post-reconstruction filter 256 of the inverse wavelet transform system 240 has the transfer function $\phi(z_1)\alpha(z_1)^{-1}(\phi(z_2)\alpha(z_2)^{-1}$ for mapping the set of dual scaling function coefficients $\bar{c}_M$ into the set of reconstructed data samples $f_M$. In order to do this, the post-reconstruction filter 256 includes two post-reconstruction filter stages 248, as shown in FIG. 22. Each post-reconstruction filter stage 248 is the same post-reconstruction filter 248 as that shown in FIG. 16 for the 1-D inverse IWT.

The first post-reconstruction filter stage 248 has the transfer function $\phi(z_2)\alpha(z_2)^{-1}$ for mapping in the vertical direction each column $k_M$ of the 2-D set of dual scaling function coefficients $\bar{c}_M=\{\bar{c}_{M,k_M^{j_M}}\}$ into a corresponding column $k_M$ of the 2-D set of intermediate coefficients $\bar{u}_M=\{\bar{u}_{M,k_M}^{i}\}$. Similarly, the second post-reconstruction filter stage 248 uses the transfer function $\phi(z_1)\alpha(z_1)^{-1}$ to map in the horizontal direction each row i of the 2-D set of intermediate coefficients $\bar{u}_M=\{\bar{u}_{M,k_M}^{i}\}$ into a corresponding row i of the 2-D set of reconstructed data samples $f_M=\{f_{M,n,i}\}$. This is done by these two post-reconstruction filter stages 248 in the same manner as described earlier for the 1-D inverse IWT.

Specific Implementation of Wavelet and Inverse Wavelet Transform Systems

Figure 13:
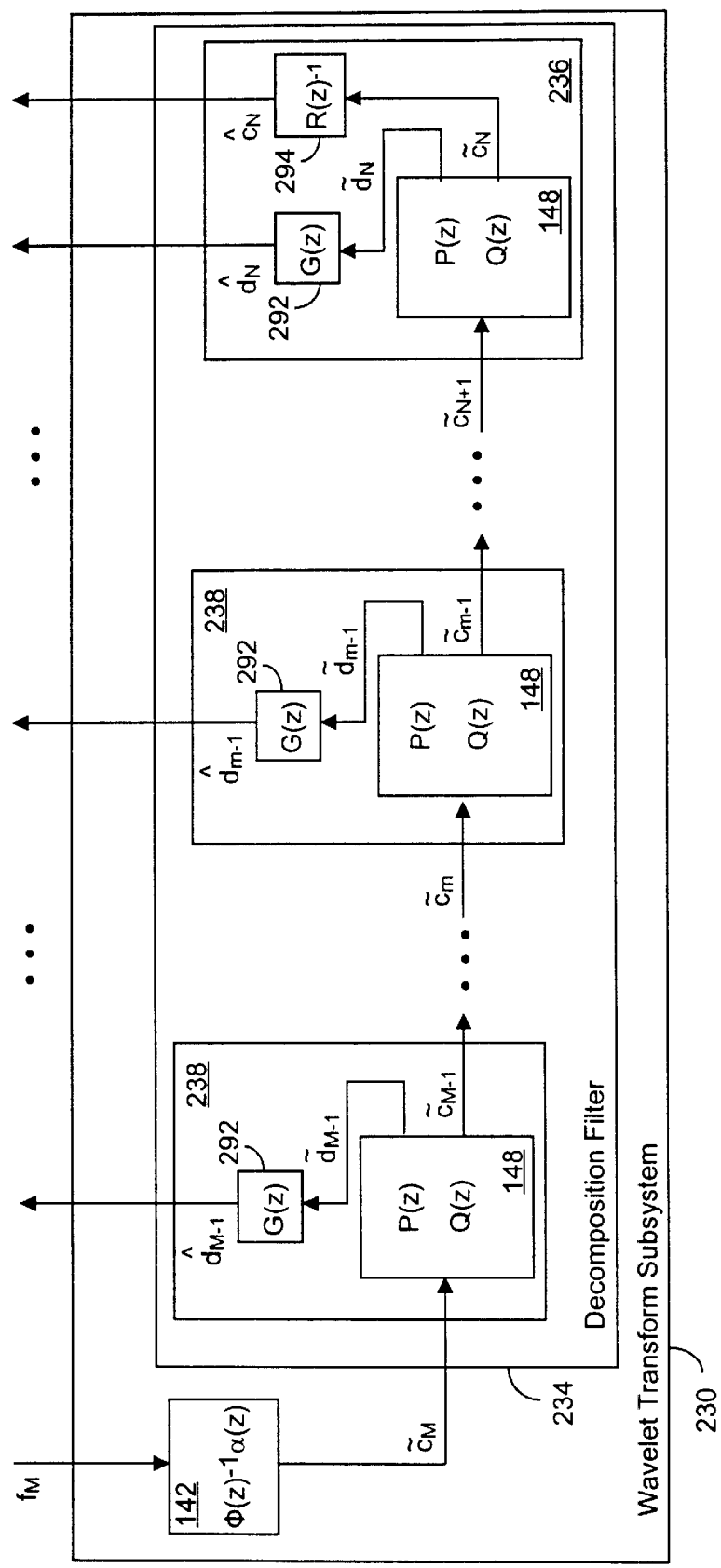
FIG. 13 shows a block diagram of an embodiment of a wavelet transform system for implementing a 1-D IWT according to present invention.
Figure 14:
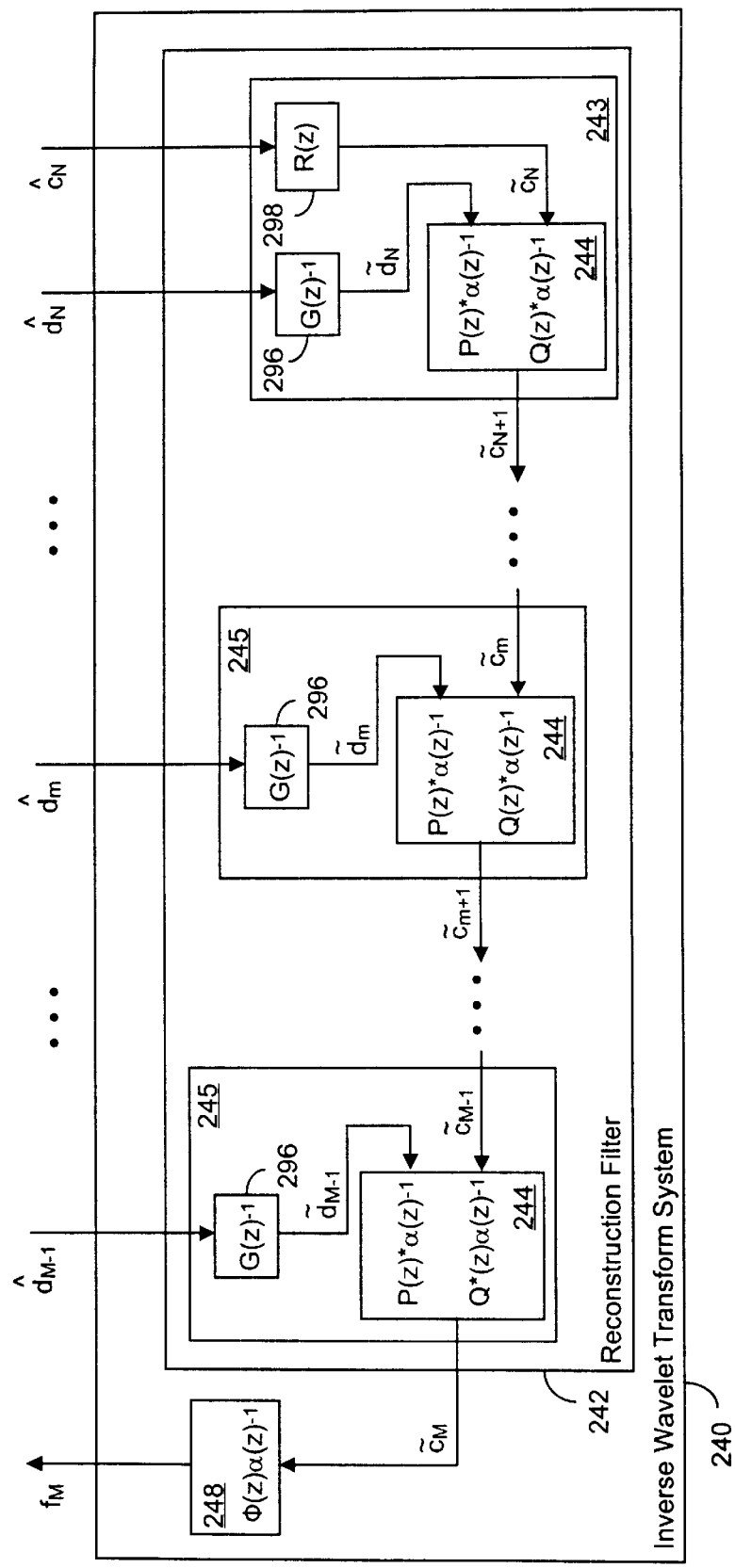
FIG. 14 shows a block diagram of an embodiment of an inverse wavelet transform system for implementing a 1-D inverse IWT according to present invention.
Figure 20:
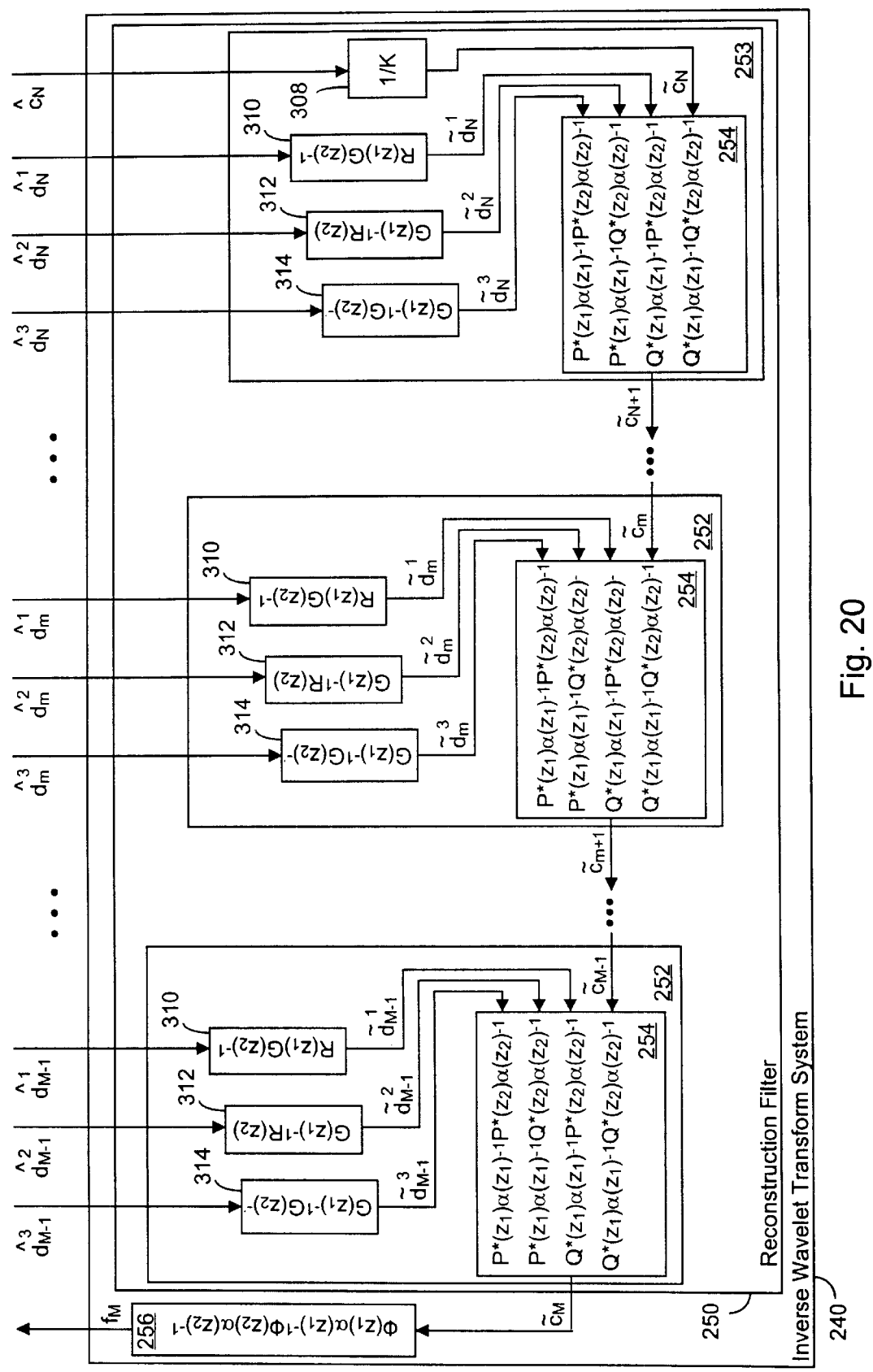
FIG. 20 shows a block diagram of an embodiment of an inverse wavelet transform system for implementing a 2-D inverse IWT according to present invention.

In a specific implementation of the wavelet transform system 230 of FIGS. 13 and 17 and the inverse wavelet transform system 240 of FIGS. 14 and 20, the scaling function $\phi_{0,0}(x)$ may be a cubic spline. In this case, the sequence of mapping coefficients $\{\phi_n\}$ is given by:

$$\phi_n = 0, \text{ for } n \leq -2 \text{ and } n \geq 2 \quad (22)$$
$$\phi_{-1} = 1/6$$
$$\phi_0 = 4/6$$
$$\phi_{-1} = 1/6$$

Thus, the mapping filter stage 136 of FIG. 15 performs a moving average operation according to:

$$y_k = \ldots + \epsilon_{-1}x_{k+1} + \epsilon_0 x_k + \epsilon_1 x_{k-1} + \ldots \quad (23)$$

where the set of inputs $\{X_k\}$, the set of outputs $\{y_k\}$, and the sequence of taps $\{\epsilon_k\}$ are respectively the set of standard scaling function coefficients $\{c_{M,k_M}\}$, the set of original data samples $\{f_{M,k_M}\}$, and the sequence of mapping coefficients $\{\phi_{k_M}\}$.

Conversely, the sequence of mapping coefficients $\{\phi_n\}$ corresponding to the sequence of mapping coefficients $\{\phi_n\}$ is given by:

$$\theta_n = 0, \text{ for } n \leq -2 \text{ and } n \geq 2 \quad (24)$$
$$\theta_0 = 1/6(2+\sqrt{3})$$
$$\theta_1 = \theta_{-1} = 2-\sqrt{3}$$

In this case, the mapping filter stage 102 of FIG. 6 performs a recursive two-stage feedback differencing operation as follows:

$$y_k = x_k - \mu_1 y_{k-1} - \cdots \quad (25)$$
$$w_k = y_k - \mu_{-1} w_{k+1} - \cdots, \quad z_k = \frac{w_k}{\mu_0}$$

where the set of inputs $\{x_k\}$, the set of outputs $\{z_k\}$, and the sequence of taps $\{\mu_k\}$ are respectively the set of original data samples $\{f_{M,k_M}\}$, the set of standard scaling function coefficients $\{c_{M,k_M}\}$, and the sequence of mapping coefficients $\{\Theta_{k_M}\}$.

Furthermore, in this specific implementation, the sequence of mapping coefficients $\{\alpha_n\}$ is given by:

$$\alpha_n = 0, \text{ for } n \leq 5 \text{ and } n \geq 5 \quad (26)$$
$$\alpha_{-4} = \alpha_4 = 1/5040$$
$$\alpha_{-3} = \alpha_3 = 12/5040$$
$$\alpha_{-2} = \alpha_2 = 1191/5040$$
$$\alpha_{-1} = \alpha_1 = 2416/5040$$

Figure 6:
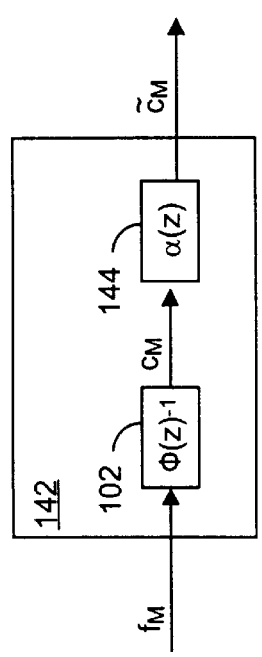
FIG. 6 shows a block diagram of a pre-decomposition filter of the wavelet transform system of FIG. 5.

Thus, the mapping filter stage 144 of FIG. 6 performs a moving average operation according to Eq. (23) where the set of inputs $\{x_k\}$, the set of outputs $\{y_k\}$, and the sequence of taps $\{\epsilon_k\}$ are respectively the set of standard scaling function coefficients $\{c_{m,k_m}\}$, the set of dual scaling function coefficients $\{\bar{c}_{m,k_m}\}$, and the sequence of mapping coefficients $\{\alpha_{k_m}\}$.

Similarly, the sequence of mapping coefficients $\{\Delta_n\}$ corresponding to the sequence of mapping coefficients $\{\alpha_{k_m}\}$ is given by:

$$\Delta_n = 0, \text{ for } n \leq 4 \text{ and } n \geq 4 \quad (27)$$
$$\Delta_0 = 5.289556603818$$
$$\Delta_1 = \Delta_{-1} = 0.666983740798$$
$$\Delta_2 = \Delta_{-2} = 0.071619419287$$
$$\Delta_3 = \Delta_{-3} = 0.000600164327$$

The mapping filter substages 166 shown in FIG. 15 and the mapping filter stage 166 shown in FIG. 16 each perform a recursive two-stage feedback differencing operation according to Eq. (25). Thus, for the mapping filter substages 166 of FIG. 15, the sets of inputs $\{x_k\}$ are respectively the sets of dual scaling function and wavelet coefficients $\{\bar{c}_{m,k_m}\}$ and $\{\bar{d}_{m,k_m}\}$, the sets of outputs $\{z_k\}$ are respectively the sets of standard scaling function and formatted wavelet coefficients $\{c_{m,k_m}\}$ and $\{\bar{d}_{m,k_m}\}$, and the sequence of taps $\{\mu_k\}$ is the sequence of mapping coefficients $\{\Delta_{k_m}\}$. Finally, for the mapping filter stage 166 of FIG. 16, the set of inputs $\{x_k\}$ is the set of dual scaling function coefficients $\{\bar{c}_{M,k_M}\}$ the set of outputs $\{z_k\}$ is the set of standard scaling function coefficients $\{c_{M,k_M}\}$, and the sequence of taps $\{\mu_k\}$ is the sequence of mapping coefficients $\{\Delta_{k_M}\}$.

Additionally, the sequence of decomposition coefficients $\{p_n\}$ is given by:

$$p_n = 0, \text{ for } n \leq -3 \text{ and } n \geq 3 \quad (28)$$
$$p_{-2} = p_2 = 1/(8+\sqrt{2})$$
$$p_{-1} = p_1 = 4/(8+\sqrt{2})$$
$$p_0 = 6/(8+\sqrt{2})$$

Figure 7:
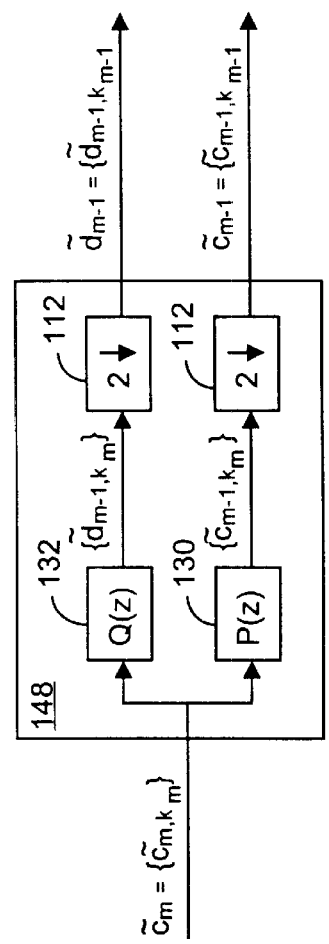
FIG. 7 shows a block diagram of each decomposition filter stage of the wavelet transform system of FIG. 5.

As a result, the filter 130 shown in FIG. 7 performs a moving average operation according to Eq. (23) where the set of inputs $\{x_k\}$, the set of outputs $\{y_k\}$, and the sequence of taps $\{\epsilon_k\}$ are respectively the set of dual scaling function coefficients $\{\bar{c}_{m,k_m}\}$ the set of intermediate coefficients $\{\bar{c}_{m-1,k_m}\}$, and the sequence of decomposition coefficients $\{p_{k_m}\}$. But, the sequence of reconstruction coefficients $\{p_n^*\}$ is obtained from Eq. (28) using Eq. (17). Thus, the filter 247 shown in FIG. 15 also performs a moving average operation according to Eq. (23) but where the set of inputs $\{x_k\}$, the set of outputs $\{y_k\}$, and the sequence of taps $\{\epsilon_k\}$ are respectively the set of formatted wavelet coefficients $\{\bar{d}_{m,k_{m-1}}\}$, the set of intermediate coefficients $\{\bar{z}_{m,k_{m+1}}\}$, and the sequence of reconstruction coefficients $\{p_{k_{m+1}}^*\}$.

Finally, the sequence of decomposition coefficients $\{q_n\}$ is given by:

$$q_n = 0, \text{ for } n \leq -5 \text{ and } n \geq 7 \quad (29)$$
$$q_{-4} = q_6 = 1/(5040\sqrt{2})$$
$$q_{-3} = q_5 = -124/(5040\sqrt{2})$$
$$q_{-2} = q_4 = 1677/(5040\sqrt{2})$$
$$q_{-1} = q_3 = -7904/(5040\sqrt{2})$$
$$q_0 = q_2 = 18482/(5040\sqrt{2})$$
$$q_1 = -242646/(5040+\sqrt{2})$$

The filter 132 of FIG. 7 performs a moving average operation according to Eq. (23) where the set of inputs $\{x_k\}$, the set of outputs $\{y_k\}$, and the sequence of taps $\{\epsilon_k\}$ are respectively the set of dual wavelet coefficients $\{\bar{d}_{m,k_m}\}$, the set of intermediate coefficients $\{\bar{d}_{m-1,k_m}\}$, and the sequence of decomposition coefficients $\{q_{k_m}\}$. Similarly, the filter 249 of FIG. 15 also performs a moving average operation according to Eq. (23) but with the sequence of reconstruction coefficients $\{q_n^*\}$ obtained from Eq. (29) using Eq. (17). In this case, the set of inputs $\{x_k\}$, the set of outputs $\{y_k\}$, and the sequence of taps $\{\epsilon_k\}$ are respectively the set of standard scaling function coefficients $\{c_{m,k_{m+1}}\}$, the set of intermediate coefficients $\{\bar{y}_{m,k_{m+1}}\}$, and the sequence of reconstruction coefficients $\{q_{k_{m-1}}^*\}$.

First Alternative Embodiment for Pre-Decomposition Filter

Figure 23:
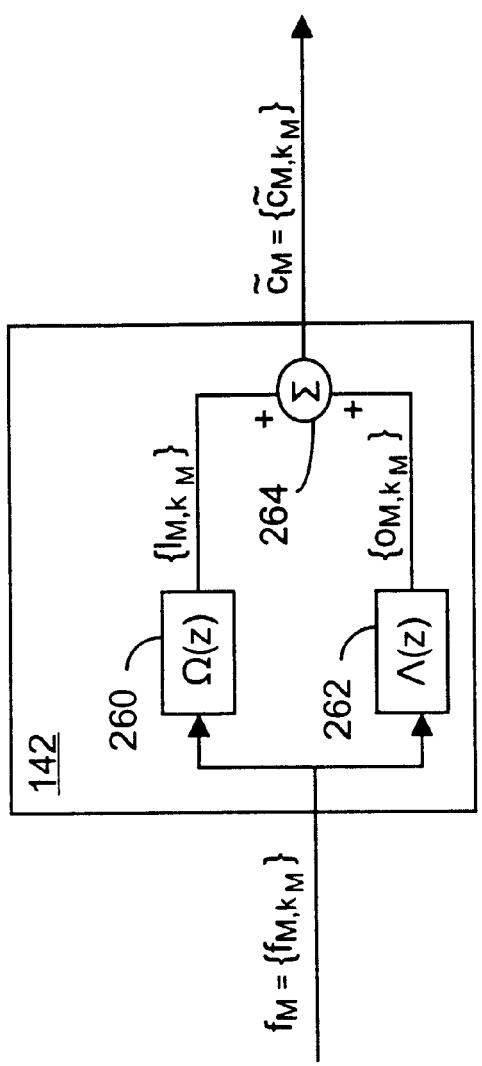
FIG. 23 shows a block diagram of another embodiment of a pre-decomposition filter of the wavelet transform system of FIG. 13.

Turning now to FIG. 23, there is shown an alternative embodiment for the pre-decomposition filter 142 of FIG. 6. In this case, the pre-decomposition filter 142 has the transfer function $\Omega(z)+\Lambda(z)$ which is equivalent to the transfer function $\phi(z)^{-1}\alpha(z)$ for the embodiment in FIG. 6.

In the embodiment of FIG. 23, the pre-decomposition filter 142 includes a mapping filter stage 260 and an mapping filter stage 262 that operate in parallel to each other on the set of original data samples $f_M$. The mapping filter stages 260 and 262 are respectively FIR and IIR filters. The transfer function Ω(z) of the mapping filter stage 260 is an all-zeros polynomial (i.e., it has no poles) with a sequence of mapping coefficients $\{\Omega_n\}$ as its coefficients. The transfer function Λ(z) of the mapping filter stage 262 is an all-poles rational function (i.e., it has no zeros) that has a sequence of mapping coefficients $\{\Lambda_n\}$ as its poles. The sequences of mapping coefficients $\{\Omega_n\}$ and $\{\Lambda_n\}$ are obtained in the manner described shortly.

The mapping filters stages 260 and 262 respectively perform the transfer functions Ω(z) and Λ(z) by respectively applying the sequences of mapping coefficients $\{\Omega_n\}$ and $\{\Lambda_n\}$ to the set of original data samples $f_M = \{f_{M,n}\}$ to respectively generate 1-D sets of intermediate coefficients $\{I_{M,k_M}\}$ and $\{o_{M,k_M}\}$. The sets of intermediate coefficients $\{I_{M,k_M}\}$ and $\{o_{M,k_M}\}$ are then component-wise summed by a summing stage 264 to obtain the 1-D set of dual scaling function coefficients $\bar{c}_M = \{\bar{c}_{M,k_M}\}$.

In the pre-decomposition filter 142 of the embodiment of FIG. 6, the IIR mapping filter stage 102 with transfer function $\phi(z)^{-1}$ and the FIR mapping filter stage 144 with transfer function α(z) are cascaded and used for the same purpose as just described. More specifically, the combined transfer function $\alpha(z)^{-1}\alpha(z)$ of the mapping filter stages 102 and 142 and the combined transfer function Ω(z)+Λ(z) of the mapping filter stages 260 and 262 and the summer 264 are equal and have the same effect. This effect includes obtaining the set of standard scaling function coefficients $\{c_{M,k_M}\}$ by ensuring that the function $f_M(x)$ goes through the set of original data samples $\{f_{M,n}\}$. Furthermore, this effect includes mapping the set of standard scaling function coefficients $\{c_{M,k_M}\}$ to the set of dual scaling function coefficients $\{\bar{c}_{M,k_M}\}$ so that a change of bases is made with the standard scaling functions $\{\phi_{m,k_m}(x)\}$ and s.o. standard wavelets $\{\Psi_{m,k_m}(x)\}$ being used as the basic scaling functions and wavelets instead of the dual scaling functions and wavelets $\{\bar{\phi}_{m,k_m}(x)\}$ and $\{\bar{\Psi}_{m,k_m}(x)\}$.

However, by using the transfer functions Λ(z) and Ω(z) rather than the transfer functions $\phi(z)^{-1}$ and α(z), the complexity of the pre-decomposition filter 142 is much less. Specifically, the transfer function Λ(z) has only poles and is of the same degree and proportional to the transfer function $\phi(z)^{-1}$. The transfer function Ω(z) has only zeros and has a degree less than the degree of the transfer function α(z). Thus, the pre-decomposition filter 142 of the embodiment of FIG. 23 is easier to implement and more efficient than that of the embodiment of FIG. 6.

For example, since the combined transfer function Ω(z)+Λ(z) is equal to the combined transfer function $\phi(z)^{-1}\alpha(z)$, the sequences of coefficients $\{\Omega_n\}$ and $\{\Lambda_n\}$ may be obtained using the sequences of mapping coefficients $\{\Theta_n\}$ and $\{\alpha_n\}$. Thus, for the specific implementation of the wavelet transform system 230 and the inverse wavelets transform system 240 discussed earlier, the sequences of mapping coefficients $\{\Theta_n\}$ and $\{\alpha_n\}$ given by Eqs. (23) and (25) are used to obtain the sequences of coefficients $\{\Omega_n\}$ and $\{\Lambda_n\}$ such that:

$$\Omega_n = 0, \text{ for } n \leq -3 \text{ and } n \geq 3 \quad (30)$$
$$\Omega_{-2} = \Omega_2 = 1/840$$
$$\Omega_{-1} = \Omega_1 = 116/840$$
$$\Omega_0 = 726/840$$
$$\Lambda_n = 0, \text{ for } n \leq -2 \text{ and } n \geq 2$$

-continued
$$\Lambda_0 = -(8 + 7\sqrt{3})/6$$
$$\Lambda_{-1} = \Lambda_1 = -2 + \sqrt{3}$$

In this case, the complete transfer function Ω(z)+Λ(z) is the simple sum of a polynomial with five coefficients in the numerator and no poles and a rational function with 3 poles in the denominator and no zeros. However, with the sequences of mapping coefficients $\{\Theta_n\}$ and $\{\alpha_n\}$ given by Eqs. (23) and (25), the complete transfer function $\phi(z)^{-1}\alpha(z)$ of the pre-decomposition filter 142 of the embodiment of FIG. 6 is a much more complex rational function with seven coefficients in the numerator and three poles in the denominator.

Finally, the transfer function Ω(z) is performed by the mapping filter stage 260 with a moving average operation according to Eq. (23) where the set of inputs $\{x_k\}$, the set of outputs $\{y_k\}$, and the sequence of taps $\{\epsilon_k\}$ are respectively the set of original data samples $\{f_{M,k_M}\}$, the set of intermediate coefficients $\{1_{M,k_M}\}$, and the sequence of mapping coefficients $\{\Omega_{k_M}\}$. Similarly, the transfer function Λ(z) is performed by the mapping filter stage 260 with a recursive two stage feedback differencing operation according to Eq. (25) where the set of inputs $\{x_k\}$, the set of outputs $\{z_k\}$, and the sequence of taps $\{\mu_k\}$ are respectively the set of original data samples $\{f_{M,k_M}\}$, the set of intermediate coefficients $\{o_{M,k_M}\}$, and the sequence of mapping coefficients $\{\Lambda_{k_M}\}$.

Second Alternative Embodiment for Pre-Decomposition Filter

Figure 24:
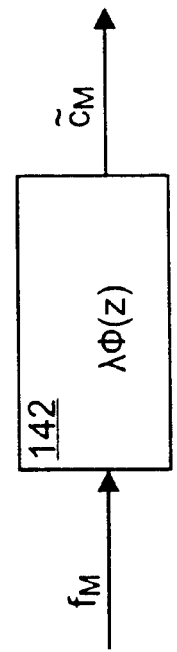
FIG. 24 shows a block diagram of still another embodiment of a pre-decomposition filter of the wavelet transform system of FIG. 13.

FIG. 24 shows another embodiment of the pre-decomposition filter 142. In this embodiment, the pre-decomposition filter 142 is an FIR filter and has the transfer function λφ(z) for mapping the set of original data samples $f_M = \{f_{M,n}\}$ into the set of dual scaling function coefficients $\bar{c}_M = \{\bar{c}_{M,k_M}\}$. In doing so, the transfer function λφ(z) provides an orthogonal projection of the function f(x) to the function $f_M(x)$ and a change of bases. As indicated earlier, this change of bases results in the standard scaling functions $\{\phi_{m,k_m}(x)\}$ and the s.o. standard wavelets $\{\Psi_{m,k_m}(x)\}$ being used as the basic scaling functions and wavelets rather than the dual scaling functions and wavelets $\{\bar{\phi}_{m,k_m}(x)\}$ and $\{\bar{\Psi}_{m,k_m}(x)\}$.

More specifically, the orthogonal projection of the function f(x) to a function $f_m(x)$ that approximates the function f(x) at the resolution level m is defined as:

$$\int_{-\infty}^{\infty} f(x)\phi_{m,k_m}(x)dx = \int_{-\infty}^{\infty} f_m d(x)\phi_{m,k_m}(x)dx \quad (31)$$

Using the strategy of optimal polynomial exactness, Eq. (31) can be re-written as follows:

$$\int_{-\infty}^{\infty} f(x)\phi_{m,k_m}(x)dx = \sum_n \lambda_n \phi_n f_{m,k_m - n} \quad (32)$$

Here, the 1-D sequence of weighting coefficients $\{\lambda_n\}$ selected for the highest degree that the function f(x) can have for which Eq. (32) will be exact.

As alluded to earlier, when the standard scaling functions $\{\phi_{m,k_m}(x)\}$ are used as the basic scaling functions in the 1-D IWT, the set of standard scaling function coefficients $\{c_{m,k_m}\}$ is switched with the set of dual scaling function coefficients $\{\bar{c}_{m,k_m}\}$ and the dual scaling functions $\{\bar{\phi}_{m,k_m}(x)\}$ are switched with the standard scaling functions $\{\phi_{m,k_m}(x)\}$ in Eq. (6). Thus, in view of Eqs. (6) and (32) for this case, each dual scaling function coefficient $\bar{c}_{m,k_m}$ is given by:

$$\lambda_n = 0, \text{ for } n \leq -2 \text{ and } n \geq 2 \tag{34}$$

$$\lambda_{-1} = \lambda_0 = \lambda_1 = 1$$

Thus, for m=M, the set of dual scaling function coefficients $\bar{c}_M = \{\bar{c}_{M,k_M}\}$ can be obtained according to Eq. (33).

In order to do so, the z-transform of Eq. (33), for m=M, is taken so that the pre-decomposition filter 142 has the transfer function $\lambda\phi(z)$. Here, the transfer function $\lambda\phi(z)$ is a polynomial that has the sequence of mapping coefficients $\{\lambda_n\phi_n\}$ as its coefficients. Thus, the pre-decomposition filter 142 performs the transfer function $\lambda\phi(z)$ by applying the sequence of mapping coefficients $\{\lambda_n\phi_n\}$ to the set of original data samples $f_M = \{f_{M,n}\}$ to generate the set of dual scaling function coefficients $\bar{c}_M = \{\bar{c}_{M,k_M}\}$.

Furthermore, in the specific implementation of the wavelet transform system 230 and inverse wavelet transform system 240 discussed earlier, the scaling function $\phi_{0,0}(x)$ is a cubic spline and the sequence of mapping coefficients $\{\phi_n\}$ are given by Eq. (22). In this case, the sequence of weighting coefficients $\{\lambda_n\}$ is given by:

$$\bar{c}_{m,k_m} = \sum_n \lambda_n \phi_n f_{m,k_m-n} \tag{33}$$

and is selected so that Eq. (32) is exact for when the function f(x) has a degree that is not greater than four. Here, the pre-decomposition filter 142 performs a moving average operation according to Eq. (23) where the set of inputs $\{x_k\}$, the set of outputs $\{y_k\}$, and the sequence of taps $\{\epsilon_k\}$ are respectively the set of original data samples $\{f_{M,k_M}\}$, the set of dual scaling function coefficients $\{\bar{c}_{M,k_M}\}$, and the sequence of mapping coefficients $\{\lambda_{K_M}\phi_{k_M}\}$.

Alternative Embodiment for Post-Reconstruction Filter

Figure 25:
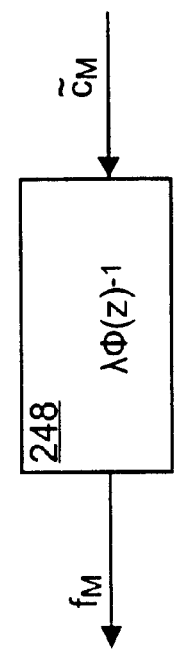
FIG. 25 shows a block diagram of another embodiment of a post-reconstruction filter of the inverse wavelet transform system of FIG. 14.

FIG. 25 shows another embodiment of the post-reconstruction filter 248. In this embodiment, the post-reconstruction filter 248 is an IIR filter and has the transfer function $\lambda\phi((z)^{-1})$. The transfer function $\lambda\phi(z)^{-1}$ is the inverse of the transfer function $\lambda\phi(z)$ of the pre-decomposition filter 142 in the embodiment of FIG. 24. Thus, the post-reconstruction filter 248 is used in the inverse wavelet transform system 240 when the pre-decomposition filter 142 of the embodiment of FIG. 24 is used in the wavelet transform system 230.

Here, the transfer function $\lambda\phi(z)^{-1}$ is used to map the set of dual scaling function coefficients $\bar{c}_M = \{\bar{c}_{M,k_M}\}$ into the set of original data samples $f_M = \{f_{M,n}\}$. The transfer function $\lambda\phi(z)^{-1}$ is a rational function that has a sequence of mapping coefficients $\{\omega_n\}$ as its poles. Thus, the post-reconstruction filter 248 performs the transfer function $\lambda\phi(z)^{-1}$ by applying the sequence of mapping coefficients $\{\omega_n\}$ to the set of original dual scaling function coefficients $\bar{c}_M = \{\bar{c}_{M,k_M}\}$ to generate the set of original data samples $f_M = \{f_{M,n}\}$.

Additionally, in the specific implementation of the wavelet transform system 230 and inverse wavelet transform system 240 discussed earlier where the sequences of mapping and weighting coefficients $\{\phi_n\}$ and $\{\lambda_n\}$ are given in Eqs. (21) and (33), the sequence of mapping coefficients $\{\omega_n\}$ is the same as the sequence of mapping coefficients $\{\Theta_n\}$ given in Eq. (24). Thus, the post-reconstruction filter 248 performs a recursive two-stage feedback differencing operation according to Eq. (25) where the set of inputs $\{x_k\}$, the set of outputs $\{z_k\}$, and the sequence of taps $\{\mu_k\}$ are respectively the set of dual scaling function coefficients $\{\bar{c}_{M,k_M}\}$, the set of original data samples $\{f_{M,k_M}\}$ and the sequence of mapping coefficients $\{\omega_{k_M}\}$.

Alternative Embodiment for Decomposition Filter Substage

Figure 26:
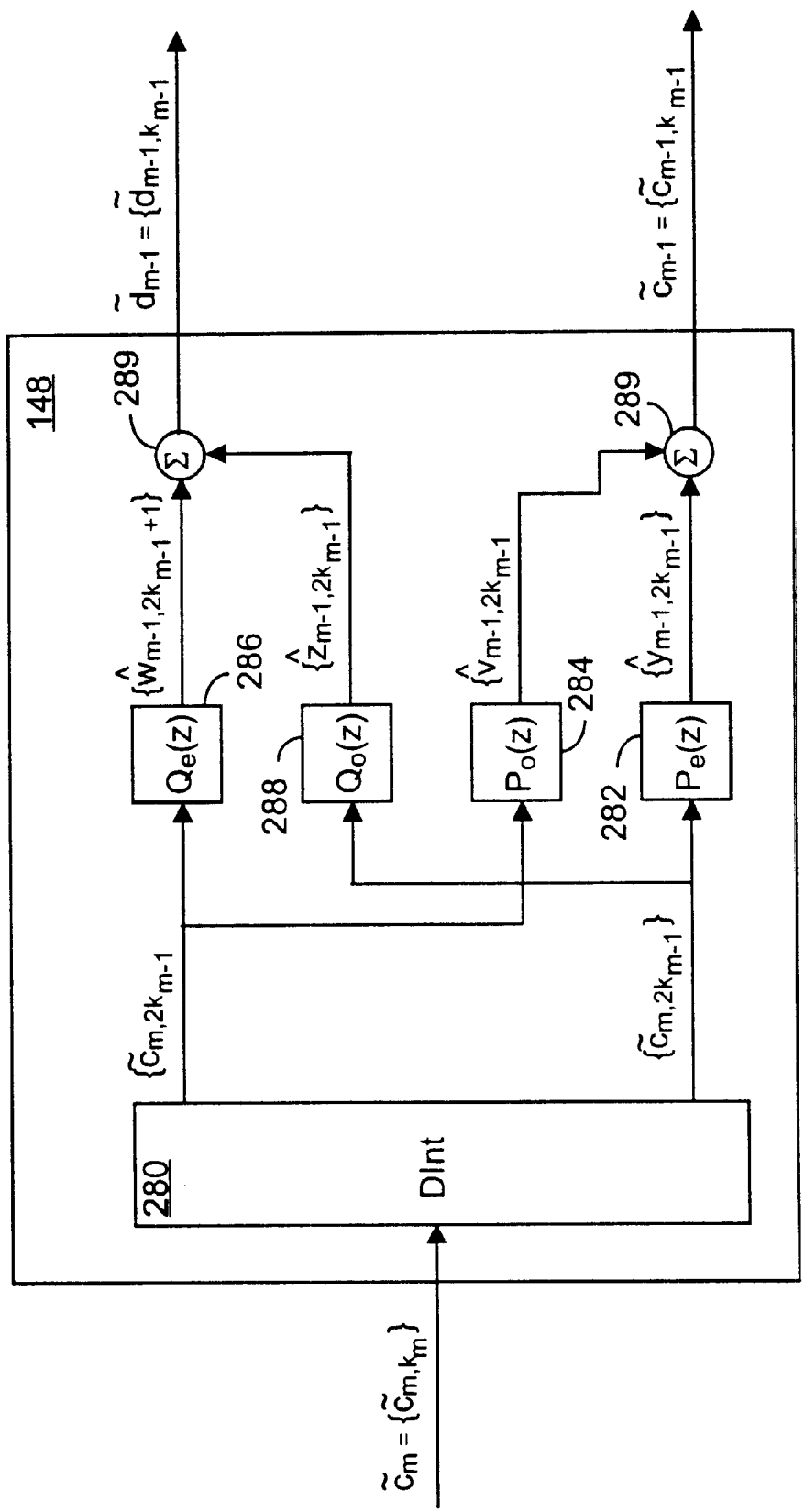
FIG. 26 shows a block diagram of another embodiment of each decomposition filter stage of the wavelet transform system of FIG. 13.

Turning now to FIG. 26, there is shown another embodiment for the decomposition filter substage 148 for each resolution level m in the wavelet transform system 230. Like the embodiment of the decomposition filter substage 148 of FIG. 7, the decomposition filter substage 148 in this embodiment has the transfer functions P(z) and Q(z) for decomposing the set of dual scaling function coefficients $\bar{c}_m$ at the higher resolution level m into the sets of dual scaling function and wavelet coefficients $\bar{c}_{m-1}$ and $\bar{d}_{m-1}$ at the next lower resolution level m-1. However, as will be described next, these transfer functions P(z) and Q(z) are implemented in a different and novel manner.

Specifically, the decomposition filter substage 148 has a deinterleaver 280. The deinterleaver 280 deinterleaves the 1-D set of dual scaling function coefficients $\bar{c} = (\bar{c}_{m,k_m})$ into a 1-D subset of dual scaling function coefficients $\{\bar{c}_{m,2k_{m-1}}\}$ with even indexes $k_m = 2k_{m-1}$ and a 1-D subset of dual scaling function coefficients $\{\bar{c}_{m,2k_{m-1}-1}\}$ with odd indexes $k_m = 2k_{m-1}1$. The deinterleaver may be a demultiplexer or hardwired connections.

The decomposition filter substage 148 also has FIR filters 282 and 284 that respectively have the transfer functions $P_e(z)$ and $P_o(z)$. The transfer functions $P_e(z)$ and $P_o(z)$ are polynomials that respectively have the subsequences of decomposition coefficients $\{p_{2i}\}$ and $\{p_{2i+1}\}$ as coefficients. Here, the subsequences of decomposition coefficients $\{p_{2i}\}$ and $\{p_{2i+1}\}$ are subsequences of the sequence of decomposition coefficients $\{p_n\}$ that respectively have even indexes n=2i and odd indexes n=2i+1. Thus, the transfer functions $P_e(z)$ and $P_o(z)$ are performed by respectively applying the subsequences of decomposition coefficients $\{p_{2i}\}$ and $\{p_{2i+1}\}$ to the subsets of dual scaling function coefficients $\{\bar{c}_{m,2k_{m-1}}\}$ and $\{\bar{c}_{m,2k_{m-1}+1}\}$ to respectively generate the sets of intermediate coefficients $\{\hat{y}_{m-1,2k_{m-1}}\}$ and $\{\hat{v}_{m-1,2k_{m-1}+1}\}$.

Similarly, the decomposition filter substage 148 also includes FIR filter stages 286 and 288 that respectively have the transfer functions $Q_e(z)$ and $Q_o(z)$. Like the sequence of decomposition coefficients $\{p_n\}$ the sequence of decomposition coefficients $\{q_n\}$ has subsequences of decomposition coefficients $\{q_{2i}\}$ and $\{q_{2i+1}i+i\}$ that respectively have even indexes n=2i and odd indexes n=2i+1. Thus, the transfer functions $Q_e(z)$ and $Q_o(z)$ are polynomials that respectively have the subsequences of decomposition coefficients $\{q_{2i}\}$ and $\{q_{2i+1}\}$ as coefficients. In order to perform the transfer functions $Q_e(z)$ and $Q_o(z)$, the subsequences of decomposition coefficients $\{q_{2i}\}$ and $\{q_{2i+1}\}$ are respectively applied to the subsets of dual scaling function coefficients $(\bar{c}_{m,2k_{m-1}+1})$ and $\{\bar{c}_{m,2k_{m-1}}\}$ to respectively generate the sets of intermediate coefficients $\{\hat{W}_{m-1,2k_{m-1}-1}\}$ and $\{\hat{Z}_{m-1,2k_{m-1}}\}$.

The decomposition filter stage 148 further includes two summers 290. The sets of intermediate coefficients $\{\hat{y}_{m-1,2k_{m-1}}\}$ and $\{\hat{v}_{m-1,2k_{m-1}+1}\}$ are then component-wise summed together by one summer 289 to obtain the set of dual scaling function coefficients $\bar{c}_{m-1} = \{\bar{c}_{m-1,k_{m-1}}\}$. The sets of intermediate coefficients $\{\hat{w}_{m-1,2k_{m-1}+1}\}$ and $\{\hat{z}_{m-1,2k_{m-1}}\}$ are then component-wise summed together by the other summer 289 to obtain the set of dual wavelet coefficients $\bar{d}_{m-1} = \{\bar{d}_{m-1,k_{m-1}}\}$.

It should be noted here that, in the embodiment of FIG. 7 of the decomposition filter substage 148, the transfer functions P(z) and Q(z) are performed by operating the entire sequences of decomposition coefficients $\{p_n\}$ and $\{q_n\}$ on the entire set of dual scaling function coefficients $\{\bar{c}_{m,k_m}\}$ to generate the resulting sets of intermediate coefficients $\{\bar{c}_{m-1,k_m}\}$ and $\{\bar{d}_{m-1,k_m}\}$. Only then are the resulting sets of intermediate coefficients $\{\bar{c}_{m-1,k_m}\}$ and $\{\bar{d}_{m-1,k_m}\}$ downsampled to generate the sets of dual scaling function and wavelet coefficients $\{\bar{c}_{m-1,k_m}\}$ and $\{\bar{d}_{m-1,k_m}\}$ This may be done so that those of the intermediate coefficients $\{\bar{c}_{m-1,k_m}\}$ with even indexes $\{k_m\}$ are discarded and those of the intermediate coefficients $\{\bar{c}_{m-1,k_m}\}$ with odd indexes $\{k_m\}$ are the set of dual scaling function coefficients $\{\bar{c}_{m-1,k_m}\}$. And those of the intermediate coefficients $\{\bar{d}_{m-1,k_m}\}$ with odd indexes $\{k_m\}$ would be discarded so that those of the intermediate coefficients $\{\bar{d}_{m-1,k_m}\}$ with even indexes $\{k_m\}$ are the set of dual wavelet coefficients $\{\bar{d}_{m-1,k_m}\}$ As a result, the operation of the even indexed decomposition coefficients $\{p_{2i}\}$ and the odd indexed decomposition coefficients $\{q_{2i+1}\}$ on the odd indexed dual scaling function coefficients $\{\bar{c}_{m,2k_{m-1}+1}\}$ is wasteful and timing consuming. Furthermore, the operation of the odd indexed decomposition coefficients $\{p_{2i+1}\}$ and the even indexed decomposition coefficients $\{q_{2i}\}$ on the even indexed dual scaling function coefficients $\{\bar{c}_{m,2k_{m-1}}\}$ is similarly wasteful and timing consuming.

But, in the embodiment of FIG. 26 of the decomposition filter substage 148, only the subsequence of even indexed decomposition coefficients $\{p_{2i}\}$ and the subsequence of odd indexed decomposition coefficients $\{q_{2i+1}\}$ are operated on the subset of even indexed dual scaling function coefficients $\{\bar{c}_{m,2k_{m-1}}\}$. Similarly, only the subsequence of odd indexed decomposition coefficients $\{p_{2i+1}\}$ and the subsequence of even indexed decomposition coefficients $\{q_{2i}\}$ are operated on the subset of odd indexed dual scaling function coefficients $\{\bar{c}m,2k_{m-1}+s\}$ Thus, the embodiment of FIG. 26 of the decomposition filter substage 148 is more efficient than that of the embodiment of FIG. 7.

Additionally, in the specific implementation of the wavelet transform system 230 and inverse wavelet transform system 240 discussed earlier, the sequences of decomposition coefficients $\{p_n\}$ and $\{q_n\}$ are given in Eqs. (27) and (28). Thus, the FIR filters 282, 284, 286, and 288 perform respective moving average operations according to Eq. (23). The filters 282 and 284 have sets of inputs $\{x_k\}$ that are respectively the subsets of dual scaling function coefficients $\{\bar{c}m,2k_{m-1}\}$ and $\{\bar{c}_{m,2k_{m-1}+s}\}$, sets of outputs $\{y_k\}$ that are respectively the sets of intermediate coefficients $\{\hat{y}_{m-1,2k_{m-1}}\}$ and $\{\hat{v}_{m-1,2k_{m-1}+1}\}$, and sequences of taps $\{c\}$ that are respectively the subsequences of decomposition coefficients $\{p_{2k_{m-1}}\}$ and $\{p_{2k_{m-1}+1}\}$. Similarly, for the filters 288 and 286, the sets of inputs $\{x_k\}$ are respectively the subsets of dual scaling function coefficients $\{\bar{c}_{m,2k_{m-1}}\}$ and $\{\bar{c}_{m,2k_{m-1}+1}\}$, the sets of outputs $\{y_k\}$ are respectively the sets of intermediate coefficients $\{\hat{z}_{m-1,2k_{m-1}}\}$ and $\{\hat{w}_{m-1,2k_{m-1}+1}\}$, and the sequences of taps $\{\epsilon_k\}$ are respectively the subsequences of decomposition coefficients $\{q_{2k_{m-1}+1}\}$ and $\{q_{2k_{m-1}}\}$.

As those skilled in the art will recognize, the concepts developed for the embodiment of FIG. 26 for the decomposition filter substage 148 are not limited to that just described. They may be applied to any decomposition filter stage that uses two parallel transfer functions to decompose a 1-D set of input coefficients in an L frequency band at a higher resolution level into two 1-D sets of output coefficients in respective H and L frequency bands at a next lower resolution level. For example, these concepts may be applied to the decomposition filter 104 shown in FIG. 2. Thus, in FIG. 26 for this example, the set of dual scaling function coefficients $\{\bar{c}_{m,k_m}\}$ would be replaced by the set of standard scaling function coefficients $\{c_{m,k_m}\}$, the subsets of even and odd indexed dual scaling function coefficients $\{\bar{c}_{m,2k_{m-1}}\}$ and $\{\bar{c}_{m,2k_{m-1}+1}\}$ would be respectively replaced by the subsets of even and odd indexed standard scaling function coefficients $\{c_{m,2k_{m-1}}\}$ and $\{c_{m,2k_{m-1}+1}\}$, the transfer functions $P_e(z)$, $P_o(z)$, $Q_e(Z)$, and $Q_o(z)$ would be respectively replaced by the transfer functions $A_e(z)$, $A_o(z)$, $B_e(Z)$, and $B_o(z)$, and the sets of dual scaling function and wavelet coefficients $\{\bar{c}_{m-1,k_{m-1}}\}$ and $\{\bar{d}_{m-1,k_{m-1}}\}$ would be replaced by the sets of standard scaling function and wavelet coefficients $\{c_{m-1,k_{m-1}}\}$ and $\{d_{m-1,k_{m-1}}\}$.

Alternative Embodiment for Reconstruction Filter Stage

Figure 27:
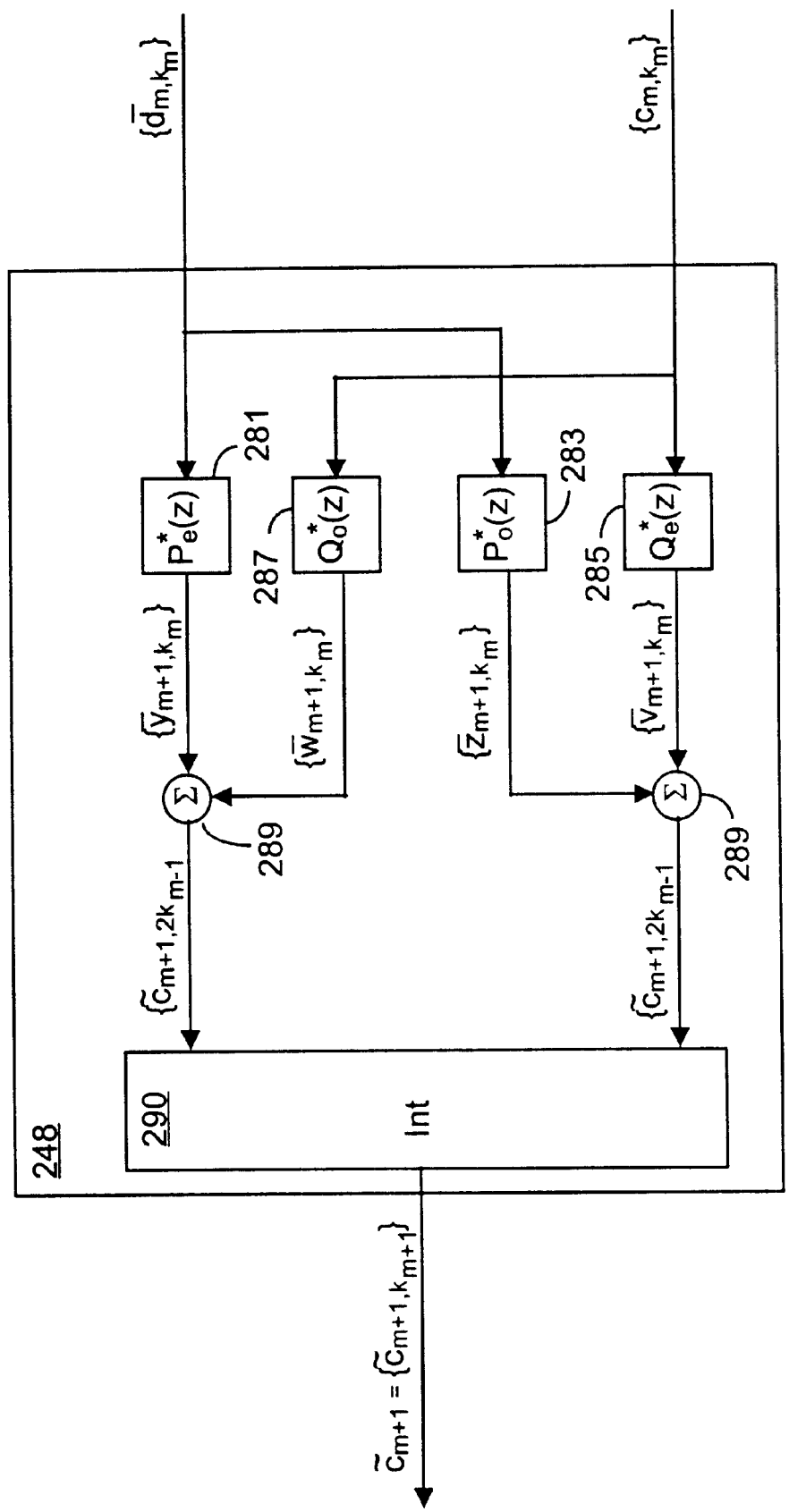
FIG. 27 shows a block diagram of another embodiment of each reconstruction filter substage of the inverse wavelet transform system of FIG. 14.

Turning now to FIG. 27, there is shown another embodiment for the reconstruction filter substage 246 for each resolution level m in the inverse wavelet transform system 240. As described earlier for the reconstruction filter substage 246 of FIG. 15, the reconstruction filter substage 246 has the transfer functions $P^*(z)$ and $Q^*(z)$ for reconstructing the sets of formatted wavelet and standard scaling function coefficients $\{\bar{c}_{m,k_m}\}$ and $\{c_{m,k_m}\}$ at the lower resolution level m into the set of dual scaling function coefficients $\{\bar{c}_{m+1}\}=\{\bar{c}_{m+1,k_{m+1}}\}$ at the next higher resolution level m+1. These transfer functions $P^*(z)$ and $Q^*(z)$ are implemented in a different and novel manner that is similar to the way in which these transfer functions were implemented in the decomposition filter substage 148 of FIG. 26.

Similar to the decomposition filter substage 148 of FIG. 26, the reconstruction filter substage 246 has FIR filters 281, 283, 285, and 287 and summers 289. The respective transfer functions $P_e^*(z)$ and $P_o^*(z)$ of the filters 281 and 283 are performed by respectively applying the subsequences of reconstruction coefficients $\{p_{2i}^*\}$ and $\{p_{2i+1}^*\}$ to the set of formatted wavelet coefficients $\{\bar{d}_{m,k_m}\}$ to respectively generate the sets of intermediate coefficients $\{\bar{y}_{m+1,k_m}\}$ and $\{\bar{z}_{m+1,k_m}\}$. Similarly, the respective transfer functions $Q_e^*(z)$ and $Q_o^*(z)$ of the filters 285 and 287 are performed by respectively applying the subsequences of reconstruction coefficients $\{q_{2i}^*\}$ and $\{q_{2i+1}^*\}$ to the set of standard scaling function coefficients $\{c_{m,k_m}\}$ to respectively generate the sets of intermediate coefficients $\{\bar{v}_{m+1,k_m}\}$ and $\{\bar{w}_{m+1,k_m}\}$.

The sets of intermediate coefficients $\{\bar{y}_{m+1,k_m}\}$ and $\{\bar{w}_{m+1,k_m}\}$ are summed by the first summer 289 to generate the set of intermediate coefficients $\{\bar{c}_{m+1,2k_m}\}$ with even indexes $2k_m$. Similarly, the sets of intermediate coefficients $\{\bar{v}_{m+1,k_m}\}$ and $\{\bar{z}_{m+1,k_m}\}$ are summed by the second summer 289 to generate the set of intermediate coefficients $\{\bar{c}_{m+1,2k_m}\}$ with odd indexes $2k_m+1$.

The reconstruction filter substage 248 also includes an interleaver 290. The interleaver 290 interleaves the 1-D set of intermediate coefficients $\{\bar{c}_{m+1,2k_m}\}$ with even indexes $k_{m+1}=2k_m$ and the 1-D set of intermediate coefficients $\{\bar{c}_{m+1,2k_m+1}\}$ with odd indexes $k_{m+1}=2k_m+1$ into the 1-D set of dual scaling function coefficients $\bar{c}_{m+1}=\{\bar{c}_{m+1,k_{m+1}}\}$. The interleaver may be a multiplexer or hardwired connections.

However, in the embodiment of FIG. 15 of the reconstruction filter substage 246, the sets of formatted wavelet and standard scaling function coefficients $\{\bar{d}_{m,k_m}\}$ and $\{c_{m,k_m}\}$ are respectively upsampled into the sets of intermediate coefficients $\{\bar{d}_{m,k_{m+1}}\}$ and $\{c_{m,k_{m+1}}\}$. This may be done so that those of the intermediate coefficients $\{c_{m,k_{m+1}}\}$ with odd indexes $\{k_{m+1}\}$ have zero values and those of the intermediate coefficients $\{c_{m,k_{m+1}}\}$ with even indexes $\{k_{m+1}\}$ are the set of standard scaling function coefficients $\{c_{m,k_m}\}$. Similarly, those of the intermediate coefficients $\{\bar{d}_{m,k_{m+1}}\}$ with even indexes $\{k_{m+1}\}$ would have zero values and those of the intermediate coefficients $\{\bar{d}_{m,k_{m+1}}\}$ with odd indexes $\{k_{m+1}\}$ would be the set of formatted wavelet coefficients $\{\bar{d}_{m,k_{m+1}}\}$. Only then are the transfer functions $P^*(z)$ and $Q^*(z)$ respectively performed by applying the entire sequences of decomposition coefficients $\{p_n^*\}$ and $\{q_n^*\}$ to respectively the entire sets of intermediate coefficients $\{\bar{d}_{m,k_{m+1}}\}$ and $\{c_{m,k_{m+1}}\}$ to respectively generate the sets of intermediate coefficients $\{\bar{z}_{m+1,k_{m+1}}\}$ and $\{\bar{y}_{m+1,k_{m+1}}\}$. The sets of sets of intermediate coefficients $\{\bar{z}_{m+1,k_{m+1}}\}$ and $\{\bar{y}_{m+1,k_{m+1}}\}$ are then component-wise summed together to generate the set of dual scaling function coefficients $\{\bar{c}_{m+1,k_{m+1}}\}$. As a result, the operation of the entire sequence of decomposition coefficients $\{p_n^*\}$ on the even indexed intermediate coefficients $\{\bar{d}_{m,k_m}\}$ and the operation of the entire sequence of decomposition coefficients $\{q_n^*\}$ on the odd indexed intermediate coefficients $\{\bar{c}_{m,k_{m+1}}\}$ is wasted.

But, in the embodiment of FIG. 27 of the reconstruction filter substage 246, the subsequences of even and odd indexed decomposition coefficients $\{p_{2i}^*\}$ and $\{p_{2i+}\}$ are operated only on the set of formatted wavelet coefficients $\{\bar{d}_{m,k_n}\}$. Similarly, the subsequences of even and odd indexed decomposition coefficients $\{q_{2i}^*\}$ and $\{q_{2i+1}^*\}$ are operated only on the set of standard scaling function coefficients $\{\bar{c}_{m,k_m}\}$. Thus, the embodiment of FIG. 27 of the reconstruction filter substage 246 is more efficient than that of the embodiment of FIG. 15.

For the specific implementation of the wavelet transform system 230 and inverse wavelet transform system 240 discussed earlier, the FIR filters 281, 283, 285, and 287 perform respective moving average operations according to Eq. (23) using the sequences of decomposition coefficients $\{p_n^*\}$ and $\{q_n^*\}$ given in Eqs. (28) and (29). In this case, the filters 281 and 283 have each the set of formatted wavelet coefficients $\{\bar{d}_{m,k_m}\}$ as a set of inputs $\{x_k\}$, the sets of intermediate coefficients $\{\bar{y}_{m+1,k_m}\}$ and $\{\bar{z}_{m+1,k_m}\}$ and as respective sets of outputs $\{y_k\}$, and the subsequences of reconstruction coefficients $\{p_{2k_m}^*\}$ and $\{p_{2k_m+1}^*\}$ as respective sequences of taps $\{\epsilon_k\}$. Similarly, the filters 285 and 287 have each the set of standard scaling function coefficients $\{c_{m,k_m}\}$ as a set of inputs $\{x_k\}$, the sets of intermediate coefficients $\{\bar{v}_{m+1,k_m}\}$ and $\{\bar{w}_{m+1,k_m}\}$ as respective sets of outputs $\{y_k\}$, and the subsequences of reconstruction coefficients $\{q_{2k_m}^*\}$ and $\{q_{2k_m+1}^*\}$ as respective sequences of taps $\{\epsilon_k\}$.

As with the embodiment of FIG. 26 for the decomposition filter substage 148, the concepts developed here for the embodiment of FIG. 27 for the reconstruction filter substage 246 are not limited to that just described. They may be applied to any reconstruction filter stage that uses two transfer functions to reconstruct two 1-D sets of input coefficients in respective H and L frequency bands at a lower resolution level into a 1-D set of output coefficients in an L frequency band at a next higher resolution level. For example, these concepts may be applied to the reconstruction filter stage 124 shown in FIG. 4. Thus, in FIG. 27 for this example, the sets of formatted wavelet and standard scaling function coefficients $\{\bar{d}_{m,k_m}\}$ and $\{c_{m,k_m}\}$ would be respectively replaced by the sets of standard scaling function and wavelet coefficients $\{c_{m,k_m}\}$ and $\{d_{m,k_m}\}$ and the set of dual scaling function coefficients $\{\bar{c}_{m+1,k_{m+1}}\}$ would be replaced by the set of standard scaling function coefficients $\{c_{m+1,k_{m+1}}\}$.

Preparation for Uniform Quantization in 1-D Wavelet Transform

Turning back to FIG. 13, for the 1-D IWT implemented by the wavelet transform system 230, the decomposition filter 234 also maps the sets of dual scaling function and wavelet coefficients $\bar{c}_N$ and $\bar{d}_{M-1}$ to $\bar{d}_N$ respectively into the sets of pre-quantized scaling function and wavelet coefficients $\hat{c}_N$ and $\hat{d}_{M-1}$ to $\hat{d}_N$. This is done so that the sets of pre-quantized scaling function and wavelet coefficients $\hat{c}_N$ and $\hat{d}_{M-1}$ to $\hat{d}_N$ are prepared for uniform quantization by the quantization system 224.

In order to do so, each decomposition filter stage 238 and 236 of the decomposition filter 234 includes a pre-quantization filter substage 292. Thus, there is a corresponding pre-quantization filter substage 292 for each resolution level m=M to N+1 at which a decomposition is made. The pre-quantization filter substage 292 for each resolution level m has the transfer function G(z) for mapping the set of dual wavelet coefficients $\bar{d}_{m-1}$ that was generated from the decomposition at the resolution level m into the set of pre-quantized wavelet coefficients $\hat{d}_{m-1}$. Furthermore, the decomposition filter stage 236 includes a second pre-quantization filter substage 294. This pre-quantization filter substage 294 has the transfer function $R(z)^{-1}$ for mapping the set of dual scaling function coefficients $\hat{c}_N$ that was generated from the decomposition at the resolution level N+1 into the set of pre-quantized scaling function coefficients $\hat{c}_N$.

The transfer function G(z) is a polynomial that has a sequence of mapping coefficients $\{g_n\}$ as its coefficients. Thus, the pre-quantization filter substage 292 for each resolution level m=M to N+1 at which a decomposition is made is an FIR filter. This pre-quantization filter substage 292 performs the transfer function G(z) by applying the sequence of mapping coefficients $\{g_n\}$ to the set of dual wavelet coefficients $\bar{d}_{m-1}$ to generate the set of pre-quantized wavelet coefficients $\hat{d}_{m-1}$. In the specific implementation of the wavelet transform system 230 and the inverse wavelet transform system 240 discussed earlier, the set of mapping coefficients $\{g_n\}$ is given by:

$$g_n = 0, \text{ for } n \leq -3 \text{ and } n \geq 3 \quad (35)$$

$$g_{-2} = g_2 = .030933$$

$$g_{-1} = g_1 = -.0488054$$

$$g_0 = .6874$$

Thus, the pre-quantization filter substage 292 for each resolution level m performs a moving average according to Eq. (23) where the set of inputs $\{X_k\}$, the set of outputs $\{y_k\}$, and the sequence of taps $\{\epsilon_k\}$ are respectively the set of dual wavelet coefficients $\bar{d}_{m-1} = \{\bar{d}_{m-1,k_{m-1}}\}$, the set of pre-quantized wavelet coefficients $\hat{d}_{m-1} = \{\hat{d}_{m-1,k_{m-1}}\}$, and the sequence of mapping coefficients $\{g_{k_{m-1}}\}$.

However, the transfer function $R(z)^{-1}$ is a rational function that has a sequence of mapping coefficients $\{e_n\}$ as its poles. Thus, the pre-quantization filter substage 294 for the last resolution level N+1 at which a reconstruction is made is an IIR filter. The pre-quantization filter substage 294 performs the transfer function $R(z)^{-1}$ by applying the sequence of mapping coefficients $\{e_n\}$ to the set of dual scaling function coefficients $\bar{c}_N$ to generate the set of pre-quantized wavelet coefficients $\hat{c}_N$. In the specific implementation of the wavelet transform system 230 and the inverse wavelet transform system 240 discussed earlier, the set of mapping coefficients $\{e_n\}$ is given by:

$$e_n = 0, \text{ for } n \leq -3 \text{ and } n \geq 3 \quad (36)$$

$$e_{-2} = e_2 = .009486309340$$

$$e_{-1} = e_1 = -.340509034999$$

$$e_0 = .573751762833$$

Thus, the pre-quantization filter substage 294 performs a recursive two stage feedback differencing operation according to Eq. (25) where the set of inputs $\{X_k\}$, the set of outputs $\{z_k\}$, and the sequence of taps $\{\mu_k\}$ are respectively the set of dual scaling function coefficients $\bar{c}_N = \{\bar{c}_{N,k_N}\}$, the set of pre-quantized scaling function coefficients $\hat{c}_N=\{\hat{c}_{N,k_N}\}$, and the sequence of mapping coefficients $\{e_{k_N}\}$.

Post Dequantization in 1-D Inverse Wavelet Transform

Turning again to FIG. 14, in the 1-D-inverse IWT implemented by the inverse wavelet transform system 240, the dequantization system 232 first performs a uniform dequantization to generate the sets of dequantized scaling function and wavelet coefficients $\hat{c}_N$ and $\hat{d}_{M-1}$ to $\hat{d}_N$. The reconstruction filter 242 then maps the sets of dequantized scaling function and wavelet coefficients $\hat{c}_N$ and $\hat{d}_{M-1}$ to $\hat{d}_N$ respectively into the sets of dual scaling function and wavelet coefficients $\bar{c}_N$ and $\bar{d}_{M-1}$ to $\bar{d}_N$ for reconstruction in the manner described earlier.

In order to do so, the reconstruction filter stage 243 of the reconstruction filter 242 includes a post-dequantization filter substage 298. This post-dequantization filter substage 298 has the transfer function $R(z)$ for mapping the set of dequantized scaling function coefficients $\hat{c}_N$ into the set of dual scaling function coefficients $\bar{c}_N$ at the first resolution level m=N at which a reconstruction is made. However, the transfer function $R(z)$ is the inverse of the transfer function $R(z)^{-1}$ and is a polynomial that has a sequence of mapping coefficients $\{r_n\}$ as its coefficients. Thus, the post-dequantization filter substage 298 is an FIR filter that performs the transfer function $R(z)$ by applying the sequence of mapping coefficients $\{r_n\}$ to the set of dequantized wavelet coefficients $\hat{c}_N$ to generate the set of dual scaling function coefficients $\bar{c}_N$.

In the specific implementation of the wavelet transform system 230 and the inverse wavelet transform system 240 discussed earlier, the set of mapping coefficients $\{r_n\}$ is given by:

$$r_n = 0, \text{ for } n \leq -3 \text{ and } n \geq 3 \quad (37)$$
$$r_{-2} = r_2 = .005442786707$$
$$r_{-1} = r_1 = -.197220977140$$
$$r_0 = .640327847858$$

Here, the post-dequantization filter substage 298 performs a moving average according to Eq. (23) where the set of inputs $\{x_k\}$, the set of outputs $\{y_k\}$, and the sequence of taps $\{\epsilon_k\}$ are respectively the set of dequantized scaling function coefficients $\hat{c}_N=\{\hat{c}_{N,k_N}\}$, the set of dual scaling function coefficients $\bar{c}_N=\{\bar{c}_{N,k_N}\}$, and the sequence of mapping coefficients $\{e_{k_N}\}$.

Furthermore, each reconstruction filter stage 243 and 244 of the reconstruction filter 242 includes a post-dequantization filter substage 296. Thus, for each resolution level m=N to M−1 at which a reconstruction is made, there is a corresponding post-dequantization filter substage 296. The post-dequantization filter substage 296 for each resolution level m is an IIR filter that has the transfer function $G(z)^{-1}$ for mapping the set of dequantized wavelet coefficients $\hat{d}_m$ into the set of dual wavelet coefficients $\bar{d}_m$. This is done by applying a sequence of mapping coefficients $\{h_n\}$ to the set of dequantized wavelet coefficients $\hat{d}_m$ to generate the set of dual wavelet coefficients $\bar{d}_m$. The transfer function $G(z)^{-1}$ is the inverse of the transfer function $G(z)$ and is a rational function that has the sequence of mapping coefficients $\{h_n\}$ as its poles.

In the specific implementation of the wavelet transform system 230 and the inverse wavelet transform system 240 discussed earlier, the set of mapping coefficients $\{h_n\}$ is given by:

$$h_n = 0, \text{ for } n \leq -3 \text{ and } n \geq 3 \quad (38)$$
$$h_{-2} = h_2 = .045392766814$$
$$h_{-1} = h_1 = -.0.06837990082$$
$$h_0 = .682806105800$$

The post-dequantization filter substage 296 for each resolution level m therefore performs a recursive two stage feedback differencing operation according to Eq. (25) where the set of inputs $\{x_k\}$, the set of outputs $\{z_k\}$, and the sequence of taps $\{\mu_k\}$ are respectively the set of dequantized wavelet coefficients $\hat{d}_m=\{\hat{d}_{m,k_m}\}$, the set of dual wavelet coefficients $\bar{d}_m=\{\bar{d}_{m,k_m}\}$, and the sequence of mapping coefficients $\{h_{k_m}\}$.

Preparation for Uniform Quantization in 2-D Wavelet Transform

Turning back to FIG. 17, for the 2-D IWT implemented by the wavelet transform system 230, the sets of pre-quantized scaling function and wavelet coefficients $\hat{c}_N$, $\hat{d}_{M-1}^1$ to $\hat{d}_N^1$, $\hat{d}_{M-1}^2$ to $\hat{d}_N^2$, and $\hat{d}_{M-1}^2$ to $\hat{d}_N^3$ are generated in preparation for uniform quantization by the quantization system 224. This is done by the decomposition filter 272 which maps the sets of dual scaling function and wavelet coefficients $\bar{c}_N$, $\bar{d}_{M-1}^1$ to $\bar{d}_N^1$, $\bar{d}_{M-1}^2$ to $\bar{d}_N^2$, and $\bar{d}_{M-1}^3$ to $\bar{d}_N^3$ respectively into the sets of pre-quantized scaling function and wavelet coefficients $\hat{c}_N$, $\hat{d}_{M-1}^1$ to $\hat{d}_N^1$, $\hat{d}_{M-1}^2$ to $\hat{d}_N^2$, and $\hat{d}_{M-1}^3$ to $\hat{d}_N^3$.

In order to do so, each decomposition filter stage 273 and 275 of the decomposition filter 272 includes three pre-quantization filter substages 300, 302, and 304. Thus, there are three corresponding pre-quantization filter substages 300, 302, and 304 for each resolution level m=M to N+1 at which a decomposition is made.

Figure 28:
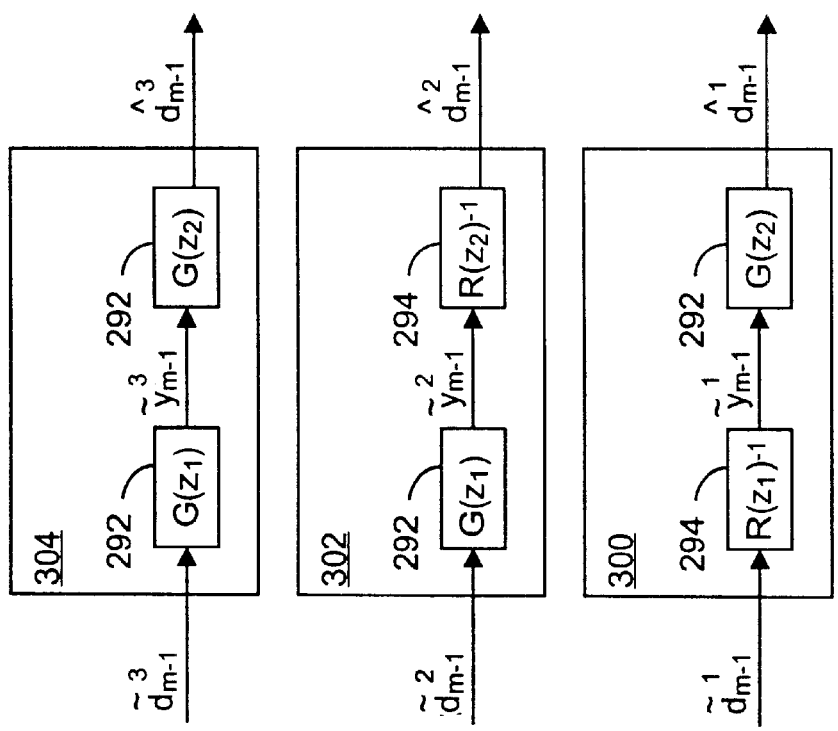
FIG. 28 shows a block diagram of pre-quantization filter substages of each decomposition filter stage of the wavelet transform system of FIG. 17.

The pre-quantization filter substage 300 for each resolution level m has the transfer function $R(z_1)^{-1}G(z_2)$ for mapping the set of dual wavelet coefficients $\bar{d}_{m-1}^2$ that was generated from the decomposition at the resolution level m into the set of pre-quantized wavelet coefficients $\hat{d}_{m-1}^1$. Referring to FIG. 28, in order to do so, the pre-quantization filter substage 300 includes the same filter substages 294 and 292 as that described earlier. Here, the filter substage 294 has the transfer function $R(z_1)^{-1}$ for mapping in the horizontal direction each row $j_{m-1}$ of the 2-D set of dual wavelet coefficients $\bar{d}_{m-1}^1=\{\bar{d}_{m-1,k_{m-1}}^{j_{m-1}}\}$ into a corresponding row $j_{m-1}$ of a 2-D set of intermediate coefficients $\bar{y}_{m-1}^1=\{\bar{y}_{m-1,k_{m-1}}^{j_{m-1}}\}$. The filter substage 292 then maps each column $k_{m-1}$ of the 2-D set of intermediate coefficients $\bar{y}_{m-1}^1=\{\bar{y}_{m-1,k_{m-1}}^{j_{m-1}}\}$ into a corresponding column $k_{m-1}$ of the 2-D set of pre-quantized wavelet coefficients $\hat{d}_{m-1}^1=\{\hat{d}_{m-1,k_{m-1}}^{j_{m-1}}\}$ in the vertical direction with the transfer function $G(z_2)$.

The pre-quantization filter substage 302 for each resolution level m maps the set of dual wavelet coefficients $\bar{d}_{m-1}^2$ that was generated from the decomposition at the resolution level m into the set of pre-quantized wavelet coefficients a $\bar{d}_{m-1}^2$ using the transfer function $G(z_1)R(z_2)^{-1}$. Turning again to FIG. 28, like the pre-quantization filter substage 300, the pre-quantization filter substage 302 includes the same filter substages 292 and 294 as that described earlier. However, in this case, the filter substage 292 has the transfer function $G(z_1)$ for mapping in the horizontal direction each row $j_{m-1}$ of the 2-D set of dual wavelet coefficients $\bar{d}_{m-1}^2=\{\bar{d}_{m-1,k_{m-1}}^{j_{m-1}^2}\}$ into a corresponding row $j_{m-1}$ of a 2-D set of intermediate coefficients $\bar{y}_{m-1}^2=\{\bar{y}_{m-1,k_{m-1}}^{j_{m-1}}\}$. The filter substage 294 then maps each column $k_{m-1}$ of the 2-D set of intermediate coefficients $\bar{y}_{m-1}^2=\{\bar{y}_{m-1,k_{m-1}}^{j_{m-1}}\}$ into a corresponding column $k_{m-1}$ of the 2-D set of pre-quantized wavelet coefficients $\hat{d}_{m-1}{}^2=\{\hat{d}_{m-1,k_{m-1}{}^j m-1}{}^2\}$ in the vertical direction with the transfer function $R(z_2)^{-1}$.

Similarly, the pre-quantization filter substage 304 for each resolution level m has the transfer function $G(z_1)G(z_2)$ for mapping the set of dual wavelet coefficients $\bar{d}_{m-1}{}^3$ that was generated from the decomposition at the resolution level m into the set of pre-quantized wavelet coefficients $\hat{d}_{m-1}{}^3$. Turning again to FIG. 28, in this case, the pre-quantization filter substage 304 includes two of the filter substages 292 that were described earlier. The first filter substage 292 has the transfer function $G(z_1)$ for mapping in the horizontal direction each row $j_{m-1}$ of the 2-D set of dual wavelet coefficients $\bar{d}_{m-1}=\{\bar{d}_{m-1,k_{m-1}{}^j m-1}\}$ into a corresponding row $j_{m-1}$ of a 2-D set of intermediate coefficients $\bar{y}_{m-1}{}^3=\{\bar{y}_{m-1,k_{m-1}{}^j m-1}\}$. The second filter substage 292 then maps each column $k_{m-1}$ of the 2-D set of intermediate coefficients $\bar{y}_{m-1}{}^3=\{\bar{y}_{m-1,k_{m-1}{}^j m-1}{}^3\}$ into a corresponding column $k_{m-1}$ of the 2-D set of pre-quantized wavelet coefficients $\hat{d}_{m-1}{}^3=\{\hat{d}_{m-1,k_{m-1}{}^j m-1}{}^3\}$ in the vertical direction with the transfer function $G(z_2)$.

Finally, the decomposition filter stage 273 includes a pre-quantization filter substage 306 for the last resolution level m=N+1 at which a decomposition is made. The pre-quantization filter substage 306 maps the 2-D set of dual scaling function coefficients $\bar{c}_N$ generated by the decomposition at the resolution level m=N+1 into the 2-D set of pre-quantized scaling function coefficients $\hat{c}_N$. In doing so, each dual scaling function coefficient $\bar{c}_{N,k_N{}^j N}$ in the 2-D set of dual scaling function coefficients $\bar{c}_N=\{\bar{c}_{N,k_N{}^j N}\}$ is multiplied by a constant K to generate a corresponding pre-quantized scaling function coefficient $\hat{c}_{N,k_N{}^j N}$ in the 2-D set of pre-quantized scaling function coefficients $\hat{c}_N=\{\hat{c}_{N,k_N{}^j N}\}$. In the specific implementation of the wavelet transform system 230 and the inverse wavelet transform system 240 discussed earlier, this constant K is equal to 4.965.

Post Dequantization in 2-D Inverse Wavelet Transform

Turning once more to FIG. 20, in the 2-D inverse IWT implemented by the inverse wavelet transform system 240, the sets of dequantized scaling function and wavelet coefficients and $\hat{c}_N$, $\hat{d}_{M-1}{}^1$ to $\hat{d}_N{}^1$, $\hat{d}_{M-1}{}^2$ to $\hat{d}_N{}^2$, and $\hat{d}_{M-1}{}^2$ to $\hat{d}_N{}^3$ are generated by the dequantization system 232 during uniform dequantization. The reconstruction filter 250 then maps the sets of dequantized scaling function and wavelet coefficients $\hat{c}_N$, $\hat{d}_{M-1}{}^1$ to $\hat{d}_N{}^1$, $\hat{d}_{M-1}{}^2$ to $\hat{d}_N{}^2$, and $\hat{d}_{M-1}{}^2$ to $\hat{d}_N{}^3$ respectively into the sets of dual scaling function and wavelet coefficients $\hat{c}_N$, $\bar{d}_{M-1}{}^1$ to $\bar{d}_N{}^1$, $\bar{d}_{M-1}{}^2$ to $\bar{d}_N{}^2$, and $\bar{d}_{M-1}{}^2$ to $\bar{d}_N{}^3$ for reconstruction in the manner described earlier.

To do so, the reconstruction filter stage 253 includes a post-dequantization filter substage 308 for the first resolution level m=N at which a reconstruction is made. The post-dequantization filter substage 308 maps the set of dequantized scaling function coefficients $\hat{c}_N$ into the set of dual scaling function coefficients $\bar{c}_N$. This is done by multiplying each dequantized scaling function coefficient $\hat{c}_{N,k_N{}^j N}$ in the set of dequantized scaling function coefficients $\hat{c}_N=\{\hat{c}_{N,k_N{}^j N}\}$ by a constant 1/K in order to generate a corresponding dual scaling function coefficient $\bar{c}_{N,k_N{}^j N}$ in the set of dual scaling function coefficients $\bar{c}_{N=\{\bar{c}N,k_N{}^j N\}}$. In the specific implementation of the wavelet transform system 230 and the inverse wavelet transform system 240 discussed earlier, this constant is the inverse of the constant K given earlier and is equal to 1/4.965.

Furthermore, each reconstruction filter stage 252 and 253 of the reconstruction filter 250 includes three post-dequantization filter substages 310, 312, and 314. Thus, there are three corresponding post-dequantization filter substages 310, 312, and 314 for each resolution level m=N to M−1 at which a reconstruction is made.

Figure 29:
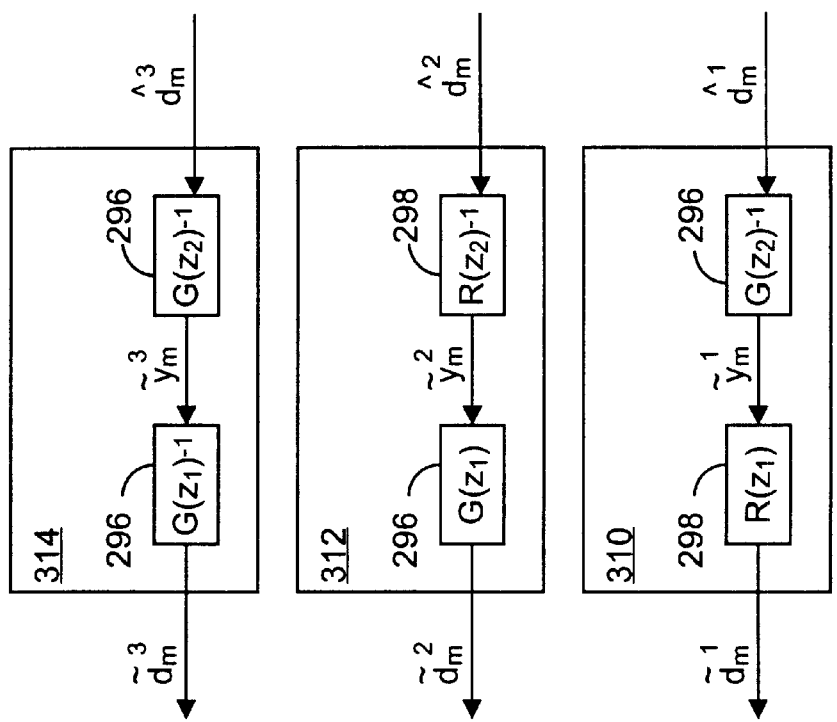
FIG. 29 shows a block diagram of post-dequantization filter substages of each reconstruction filter stage of the inverse wavelet transform system of FIG. 20.

The post-dequantization filter substage 310 for each resolution level m has the transfer function $R(z_1)G(z_2)^{-1}$ for mapping the set of dequantized wavelet coefficients $\hat{d}_m{}^1$ into the set of dual wavelet coefficients $\bar{d}_m{}^1$. Referring to FIG. 29, in order to do so, the pre-quantization filter substage 310 includes the same filter substages 296 and 298 as that described earlier. The filter substage 296 maps each column $k_m$ of the 2-D set of dequantized wavelet coefficients $\hat{d}_m{}^1=\{\hat{d}_{m,k_m{}^j m}\}$ into a corresponding column $k_m$ of the 2-D set of intermediate coefficients $\bar{y}_m{}^1=\{\bar{y}_{m,k_m{}^j m}\}$ in the vertical direction with the transfer function $G(z_2)^{-1}$. Then, the filter substage 298 uses the transfer function $R(z_1)$ to map in the horizontal direction each row $j_m$ of the 2-D set of intermediate coefficients $\bar{y}_m{}^1=\{\bar{y}_{m,k_m{}^j m}\}$ into a corresponding row $j_m$ of the 2-D set of dual wavelet coefficients $\bar{d}_m{}^1=\{\bar{d}m,k_m j_m\}$.

The post-dequantization filter substage 312 for each resolution level m maps the set of pre-quantized wavelet coefficients $\bar{d}_m{}^2$ into the set of dual wavelet coefficients $\bar{d}_m{}^2$ using the transfer function $G(z_1)^{-1}R(z_2)$. Turning again to FIG. 29, the post-dequantization filter substage 312 includes the same filter substages 298 and 296 as that described earlier. However, in this case, the filter substage 298 maps each column $k_m$ of the 2-D set of dequantized wavelet coefficients $\hat{d}_m{}^2=\{\hat{d}_{m,k_m{}^j m}{}^2\}$ into a corresponding column $k_m$ of the 2-D set of intermediate coefficients $\hat{y}_m{}^2=\{\hat{y}_{m,k_m{}^j m}{}^2\}$ in the vertical direction with the transfer function $R(z_2)$. Furthermore, the filter substage 296 uses the transfer function $G(z_1)^{-1}$ to map in the horizontal direction each row $j_m$ of the 2-D set of intermediate coefficients $\bar{y}_m{}^2=\{\bar{y}_{m,k_m{}^j m}{}^2\}$ into a corresponding row $j_m$ of the 2-D set of dual wavelet coefficients $\bar{d}_m{}^2=\{\bar{d}_{m,k_m{}^j m}{}^2\}$.

Finally, the post-dequantization filter substage 314 for each resolution level m has the transfer function $G(z_1)^{-1}G(z_2)^{-1}$ for mapping the set of pre-quantized wavelet coefficients $\hat{d}_m{}^3=\{\hat{d}_{m,k_m{}^j m}{}^3\}$ i into the set of dual wavelet coefficients $\bar{d}_m{}^3=\{\bar{d}_{m,k_m{}^j m}{}^3\}$. Turning once more to FIG. 29, the post-dequantization filter substage 314 includes two of the filter substages 296 that were described earlier. The first filter substage 296 maps each column $k_m$ of the set of pre-quantized wavelet coefficients $\hat{d}_m{}^3=\{\hat{d}_{m,k_m{}^j m}{}^3\}$ into a corresponding column $k_m$ of the set of intermediate coefficients $\bar{y}_m{}^3=\{\bar{y}_{m,k_m{}^j m}{}^3\}$ into in the vertical direction with the transfer function $G(z_2)^{-1}$. The second filter substage 296 has the transfer function $G(z_1)^{-1}$ for mapping in the horizontal direction each row $j_m$ of the 2-D set of intermediate coefficients $\bar{y}_m{}^3=\{\bar{y}_{m,k_m{}^j m}{}^3\}$ into a corresponding row $j_m$ of the 2-D set of dual wavelet coefficients $\bar{d}_m{}^3=\{\bar{d}_{m,k_m{}^j m}{}^3\}$.

Other Alternative Embodiments

Referring to FIG. 11, the wavelet transform system 230 has been described for use with an encoding system 226 and quantization system 224 for compression of original data. Similarly, the wavelet inverse transform system 240 has been described for use with a decoding system 228 and dequantization system 232 for decompression of encoded data. But, those skilled in the art will recognize that the 1-D and 2-D IWTs and inverse IWTs described herein and performed by the wavelet and inverse wavelet transform systems 230 and 240 may be used for other purposes. In such a case, a digital signal processor (DSP) could be used to post-process and/or pre-process the these 1-D and 2-D IWTs and inverse IWTs.

Moreover, in FIG. 11, the wavelet transform system 230 and the inverse wavelet transform system 240 are shown in a software implementation. However, a hardware implementation of the wavelet transform system 230 and the inverse wavelet transform system 240 would also take advantage of the benefits of the 1-D and 2-D IWTs and inverse IWTs just described.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A pre-decomposition filter of a wavelet transform system for mapping a set of original data samples into a set of dual scaling function coefficients for decomposition by the wavelet transform system, the sets of original data samples and dual scaling function coefficients being related to a set of scaling function coefficients, to scaling functions that correspond to the set of scaling function coefficients, and to dual scaling functions that are dual to the scaling functions and correspond to the set of dual scaling function coefficients, the pre-decomposition filter comprising:

a first filter stage that filters the set of original data samples to generate a first set of intermediate coefficients;

a second filter stage that is parallel to the first filter and filters the set of original data samples to generate a second set of intermediate coefficients; and a summing stage that sums the first and second sets of intermediate data samples to generate the set of dual scaling function coefficients.

2. The pre-decomposition filter of claim 1 wherein:

the first filter stage has a first transfer function for mapping the set of original data samples to the first set of intermediate coefficients;

the second filter stage has a second transfer function for mapping the set of original data samples to the second set of intermediate coefficients;

the set of original data samples is capable of being mapped to the set of scaling function coefficients by a third transfer function;

the set of scaling function coefficients is capable of being mapped to the set of dual scaling function coefficients by a fourth transfer function;

the combined transfer function of the first and second filter stages and the summing stage is the sum of the first and second transfer functions and is equivalent to the product of the third and fourth transfer functions.

3. The pre-decomposition filter of claim 2 wherein:

the second filter stage comprises an FIR filter and the fourth transfer function is capable of being performed with an FIR filter such that the degree of the second transfer function is less than the degree of the fourth transfer function; and the first filter stage comprises an IIR filter and the third transfer function is capable of being performed with an IIR filter such that the first and third transfer functions are proportional to each other.

4. A method in a wavelet transform system for mapping a set of original data samples into a set of dual scaling function coefficients for decomposition by the wavelet transform system, the sets of original data samples and dual scaling function coefficients being related to a set of scaling function coefficients, to scaling functions that correspond to the set of scaling function coefficients, and to dual scaling functions that are dual to the scaling functions and correspond to the set of dual scaling function coefficients, the method comprising the steps of:

filtering the set of original data samples to generate a first set of intermediate coefficients;

filtering the set of original data samples to generate a second set of intermediate coefficients; and summing the first and second sets of intermediate data samples to generate the set of dual scaling function coefficients.

5. The method of claim 4 wherein:

the first filtering step has a first transfer function for mapping the set of original data samples to the first set of intermediate coefficients;

the second filtering step has a second transfer function for mapping the set of original data samples to the second set of intermediate coefficients;

the set of original data samples is capable of being mapped to the set of scaling function coefficients with a third transfer function;

the set of scaling function coefficients is capable of being mapped to the set of dual scaling function coefficients with a fourth transfer function;

the combined transfer function of the first and second filtering steps and the summing step is the sum of the first and second transfer functions and is equivalent to the product of the third and fourth transfer functions.

6. The method of claim 5 wherein:

the second filter step is performed with an FIR filter and the fourth transfer function is capable of being performed with an FIR filter such that the degree of the second transfer function is less than the degree of the fourth transfer function; and the first filtering step is performed with an IIR filter and the third transfer function is capable of being performed with an IIR filter such that the first and third transfer functions are proportional to each other.

7. A pre-decomposition filter of a wavelet transform system for mapping a set of original data samples into a set of dual scaling function coefficients at an original resolution level for decomposition by the wavelet transform system, the set of original data samples being given by a first function that approximates a second function at the original resolution level, the pre-decomposition filter applying a set of mapping coefficients to the set of original data samples to map the set of original data samples to the set of dual scaling function coefficients, the set of mapping coefficients being selected by performing an orthogonal projection of the first function to the second function.

8. The pre-decomposition filter of claim 7 wherein:

the set of original data samples $\{f_{M,n}\}$ is given by the first function $f_M(x)$ and is related at the original resolution level M to a set of scaling function coefficients $\{c_{M,k_M}\}$, a set of scaling functions $\{\phi_{M,k_M}(x)\}$, the set of dual scaling functions $\{\bar{c}_{M,k_M}\}$, and a set of dual scaling functions $\{\bar{\phi}_{M,k_M}(x)\}$ that is dual to the set of scaling functions $\{\phi_{M,k_M}(x)\}$ according to:

$$f_m(x) = \sum_{k_m} c_{m,k_m} \phi_{m,k_m}(x) = \sum_{k_m} \bar{c}_{m,k_m} \bar{\phi}_{m,k_m}(x)$$

for m=M, $x=2^{-M}n$, and $\{f_{M,n}\}=\{f_M(2^{-M}n)\}$;

the orthogonal projection of the second function f(x) to the first function $f_M(x)$ is given by:

$$\int_{-\infty}^{\infty} f(x)\phi_{m,k_m}(x)dx = \int_{-\infty}^{\infty} f_m(x)\phi_{m,k_m}(x)dx$$

where:

$$\tilde{c}_{m,k_m} = \int_{-\infty}^{\infty} f(x)\phi_{m,k_m}(x)dx$$

for m=M;

the set of mapping coefficients $\{\lambda_n\phi_n\}$ are selected by obtaining the set of coefficients $\{\phi_n\}=\{\phi_{0,0}(n)\}$ given by the scaling function $\phi_{0,0}(x)$, where $x=2^{-M}n$, and by selecting the set of coefficients $\{\lambda_n\}$ for the highest degree that the second function f(x) can have for which:

$$\int_{-\infty}^{\infty} f(x)\phi_{m,k_m}(x)dx = \sum_n \lambda_n\phi_n f_{m,k_m-n}$$

is exact, form m=M.

9. The pre-decomposition filter of claim 7 wherein the pre-decomposition filter comprises an FIR filter that applies the set of mapping coefficients in a moving average operation.

10. A method for mapping a set of original data samples into a set of dual scaling function coefficients at an original resolution level for decomposition in wavelet transform system, the set of original data samples being given by a first function that approximates a second function at the original resolution level, the method comprising:

selecting a set of mapping coefficients by performing an orthogonal projection of the first function to the second function; and applying the set of mapping coefficients to the set of original data samples to map the set of original data samples to the set of dual scaling function coefficients.

11. The method of claim 10 wherein:

the set of original data samples $\{f_{M,n}\}$ is given by the first function $f_M(x)$ and is related at the original resolution level M to a set of scaling function coefficients $\{c_{M,k_M}\}$, a set of scaling functions $\{\phi_{M,k_M}(x)\}$, the set of dual scaling functions $\{\bar{c}_{M,k_M}\}$, and a set of dual scaling functions $\{\bar{\phi}_{M,k_M}(x)\}$ that is dual to the set of scaling functions $\{\phi_{M,k_M}(x)\}$ according to:

$$f_m(x) = \sum_{k_m} c_{m,k_m}\phi_{m,k_m}(x) = \sum_{k_m} \tilde{c}_{m,k_m}\tilde{\phi}_{m,k_m}(x)$$

for m=M, $x=2^{-M}n$, and $\{f_{M,n}\}=\{f_M(2^{-M}n)\}$;

the orthogonal projection of the second function f(x) to the first function $f_M(x)$ is given by:

$$\int_{-\infty}^{\infty} f(x)\phi_{m,k_m}(x)dx = \int_{-\infty}^{\infty} f_m(x)\phi_{m,k_m}(x)dx$$

where:

$$\tilde{c}_{m,k_m} = \int_{-\infty}^{\infty} f(x)\phi_{m,k_m}(x)dx$$

for m=M;

the set of mapping coefficients $\{\lambda_n\phi_n\}$ are selected by obtaining the set of coefficients $\{\phi_n\}=\{\phi_{0,0}(n)\}$ given by the scaling function $(\phi_{0,0}(x)$, where $x=2^{-M}n$, and by selecting the set of coefficients $\{\lambda_n\}$ for the highest degree that the second function f(x) can have for which:

$$\int_{-\infty}^{\infty} f(x)\phi_{m,k_m}(x)dx = \sum_n \lambda_n\phi_n f_{m,k_m-n}$$

is exact, for m=M.

12. The method of claim 10 wherein the applying step includes applying the set of mapping coefficients in a moving average operation.

* * * * *

UNITED STATES PATENT AND TRADEMARK OFFICE
CERTIFICATE OF CORRECTION

PATENT NO. : 6,600,838 B2
DATED : July 29, 2003
INVENTOR(S) : Charles K. Chui

It is certified that error appears in the above-identified patent and that said Letters Patent is hereby corrected as shown below:

Column 36,
Line 59, please delete "$\{\bar{c}_{M,k_M}\}$" and insert -- $\{\tilde{c}_{M,k_M}\}$ --.

Line 60, please delete "$\{\bar{\Phi}_{M,k_M}(x)\}$" and insert -- $\{\tilde{\Phi}_{M,k_M}(x)\}$ --.

Column 37,
Line 17, please delete "$\phi_{0,0}(x)$" and insert -- $\Phi_{0,0}(x)$ --.
Line 25, please delete "form" and insert -- for --.

Column 38,
Line 3, please delete "$\{\bar{c}_{M,k_M}\}$" and insert -- $\{\tilde{c}_{M,k_M}\}$ --.

Line 4, please delete "$\{\bar{\Phi}_{M,k_M}(x)\}$" and insert -- $\{\tilde{\Phi}_{M,k_M}(x)\}$ --.

Line 29, please delete "$\phi_{0,0}(x)$" and insert -- $\Phi_{0,0}(x)$ --.

Signed and Sealed this

Twenty-eighth Day of December, 2004

JON W. DUDAS
*Director of the United States Patent and Trademark Office*